CENTRAL DATA PROCESSOR

Filed Feb. 14, 1966 Sheet 1 of 8

INVENTORS
HANS B. MARS
EDWARD W. MOLL
BRUCE W. NUTTING
MEYER SCHILDER
BY Joseph P. Kates
ATTORNEY INVENTORS.
HANS B MARX
EDWARD W. MOLL
BRUCE W. NUTTING
MEYER SCHILDER
BY Joseph P. Kates
ATTORNEY Feb. 4, 1969 H. B. MARX ET AL 3,426,330

CENTRAL DATA PROCESSOR

Filed Feb. 14, 1966 Sheet 4 of 8

INVENTORS.
HANS B. MARX
EDWARD W. MOLL
BRUCE W. NUTTING
MEYER SCHILDER

BY Joseph P. Kates
ATTORNEY

Feb. 4, 1969 H. B. MARX ET AL 3,426,330

CENTRAL DATA PROCESSOR

Filed Feb. 14, 1966 Sheet 5 of 8

INVENTORS.
HANS B. MARX
EDWARD W. MOLL
BRUCE W. NUTTING
MEYER SCHILDER
BY
Joseph P. Kates
ATTORNEY

INVENTORS.
HANS B. MARX
EDWARD W. MOLL
BRUCE W. NUTTING
MEYER SCHILDER

BY Joseph P. Kates
ATTORNEY

INVENTORS.
HANS B. MARX
EDWARD W. MOLL
BRUCE W. NUTTING
MEYER SCHILDER

BY Joseph P. Kates
ATTORNEY

United States Patent Office 3,426,330

Patented Feb. 4, 1969

3,426,330

CENTRAL DATA PROCESSOR

Hans B. Marx, Broomall, Edward W. Moll, King of Prussia, Bruce W. Nutting, West Chester, and Meyer Schilder, Plymouth Meeting, Pa., assignors to Burroughs Corporation, Detroit, Mich., a corporation of Michigan Filed Feb. 14, 1966, Ser. No. 527,374

U.S. Cl. 340—172.5 43 Claims

Int. Cl. G11b *13/00;* G06f *1/00, 7/00*

ABSTRACT OF THE DISCLOSURE

A data processor for use in a computer system including a memory unit and an input-output unit and incorporating arithmetic and program execution units for synchronously performing parallel arithmetic operations and transfers and output data multiplex means for selectively transmitting data to said memory unit and for transferring information within the processor.

The present invention relates to a computer which may be the central data processor incorporated in a modular computer system. More particularly, the present invention relates to a synchronous computer which comprises the arithmetic and program execution unit of a modular computer system in which parallel arithmetic operations and parallel transfers are effected.

The data processor of the invention provides features enabling flexible indexing wherein the indexing is done near index registers which are stored in memory and are locatable by the program. It provides a memory block search feature. The computer of the invention is light in weight, rugged and otherwise suitable for incorporation in a system intended to be portable and to be transportable over rough or smooth terrain, in the atmosphere or in outer space.

Data processors in which the computing functions are more or less separately performed are incorporated as portions of computer systems, for example, the modular computers of the systems of the Burroughs Corporation, known popularly as the D825 and B5500 Burroughs computer systems, the computer portion of a system known as the S2000 Transac computer, and the so-called master and slave computer of a system known as the RW400 Polymorphic computer. However, these systems are essentially large scale, fixedly located systems and do not possess the features of the present invention which make it adaptable for portable use on land including use over rugged terrain, in the air and in space. These computers are not adaptable to communication selectability within and without the central data processor modules as provided by the present invention. The weight and cumbersome logic of such computers do not render them suitable to vehicular land, space or air portable use, and they do not incorporate the features of the present invention of high concentration of circuitry and of avoidance of redundant and unessential circuits. Thus, the central data processor of the present invention overcomes disadvantages of other computers and is adaptable to be made rugged, portable, and to employ reduced circuitry for the functions accomplished. The central data processor of the invention presents advantages in its incorporation of a data output multiplex unit within the central data processor and attendant interconnection and circuitry such that a substantial saving in intermodular wiring and communication circuits is effected. The invention provides further advantages in its dual use of the data output multiplex, first, in the sending out of data to the input-output control units and memory units of the complete system, and secondly, in that it forms an essential portion of the arithmetic unit within the computer itself. The invention advantageously employs selection registers to provide selection of one of a plurality of memory modules wherein only one bit of the instruction word is required by the programmer for that purpose. The data output multiplex circuitry of the present invention is auxiliary to the functions of indexing and of transfer of command control signals between modules. Further, the data output multiplex unit selects the area of the processor which is to be operated upon in all operations except memory addressing.

Accordingly, a principal object of the present invention is to provide a central data processor for a modular computer system which is reliably employable in space, on and under water, in air and on the ground in a movable vehicle on all sorts of terrain and other ambient conditions, which is suitable both for commercial and military use, which is lightweight and portable, which provides economy in the number of circuits utilized and which provides particular features of data output multiplexing.

Another object of the present invention is to provide a central data processor or computer module which incorporates circuitry wherein flexibility of indexing is accomplished and wherein the index registers themselves may be a portion of a memory module, and wherein indexing is automatically done as required by the computer hardware without any additional program steps by the programmer except his specifying that indexing should be accomplished and wherein the index registers can be relocated in memory under program control.

Another object of the data processor or computer module of the present invention is to provide circuitry such as subcommand logic circuitry which provides a subcommand look-ahead feature such that when at a certain timing period it is necessary to transfer the contents of a program counter into a data output multiplex unit for storage in memory at that time, and when timing is critical in this path and therefore the look-ahead feature is required, such a look-ahead feature will be provided. The conditions for the transfer at this timing period will be set up at a given previous timing period, and the look-ahead feature not only eliminates the timing delay which would otherwise be present because of the finite time required for enabling and providing outputs of certain gate circuits, but additionally, saves time for the gating necessary otherwise to generate certain subcommand and timing signals which normally take relatively long periods to generate.

Another object of the present invention is to provide a computer which, although adaptable to operate at a basic clock rate, for example, in one embodiment the clock rate may be one megacycle per second, nevertheless can be operated in synchronization with the rate of any clock external to the computer which may have a frequency which is up to the basic clock rate (in the case of the exemplified embodiment, one megacycle per second).

A further object of the present invention is to provide a computer which is operable within a system permitting real time operation and wherein the computer need not be responsive to successive counting of the clock but wherein, when the computer is not ready the clock is controlled to adapt to any memory cycle of two microseconds or greater by provision of structure whereby the computer is adaptable to work from a clock which is external to the computer.

Another object of the present invention is to provide a modular central data processor which is adaptable to operating with either separate memory modules or with a single memory comprising a total amount of memory addresses equal to the amount in the total number of modules which would be provided in a completely modular computer system, for example, 32,768 words either in one large memory or divided into eight separate memory modules.

Another object of the present invention is to provide a central data processor wherein there is provided a subcommand look-ahead feature to save time and to cause capability of transfer of commands without deleterious delay, which affords a reduction in the gating and other circuitry for the functions accomplished, which is adaptable to a wide range of differing frequencies of clock inputs and to be utilized with memories of differing fetch and store cycle times and characteristics and which provides circuitry such that a programmer can provide a maximum of commands and variations in commands with a minimum of circuitry.

While the novel and distinctive features of the invention are particularly pointed out in the appended claims, a more expository treatment of the invention, in principle and in detail, together with additional objects and advantages thereof, is afforded by the following description and accompanying drawings in which:

Figure 1:
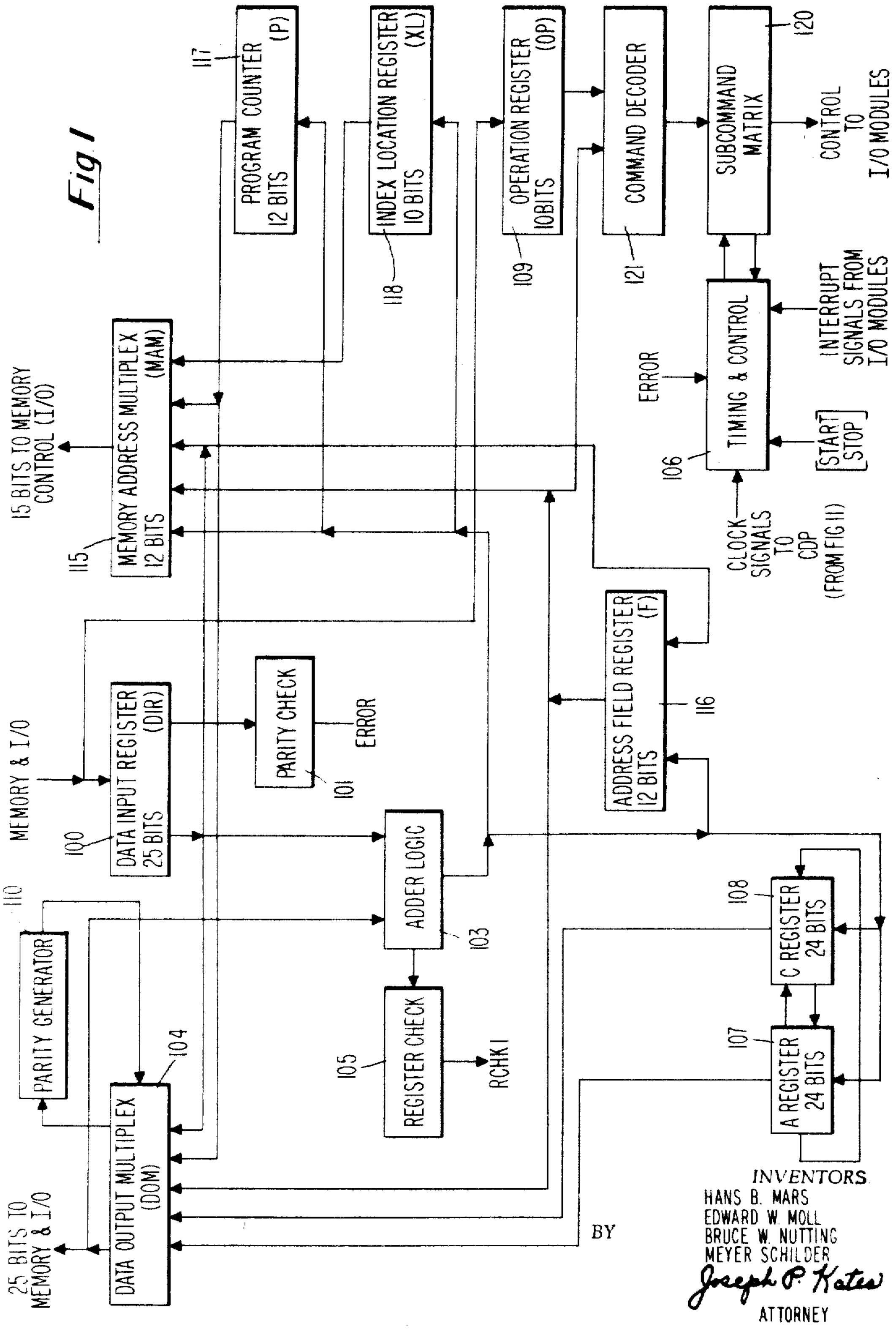
FIG. 1 is a block diagram of a first preferred illustrative embodiment of the central data processor of the present invention.
Figure 2A:
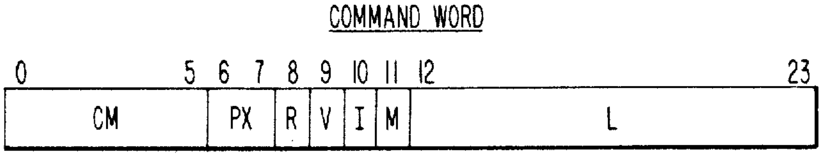
FIG. 2A is a diagrammatic representation of the format for the word organization of a command word employable with the illustrative embodiment of FIG. 1.
Figure 2B:
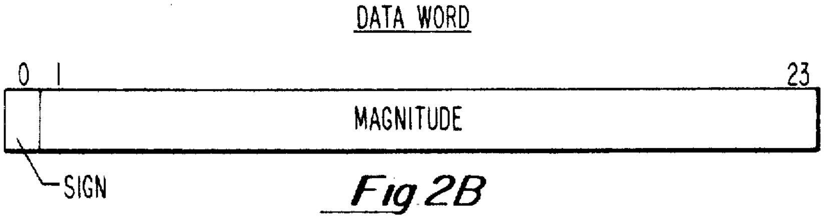
FIG. 2B is a diagrammatic representation of the format for the word organization of a data word employable with the illustrative embodiment of FIG. 1.
Figure 2C:
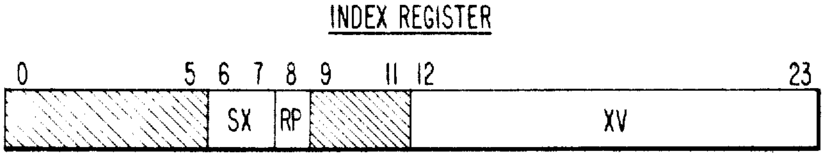
FIG. 2C is a diagrammatic representation of the format for the word organization of an index register word employable with the illustrative embodiment of FIG. 1.
Figure 2D:
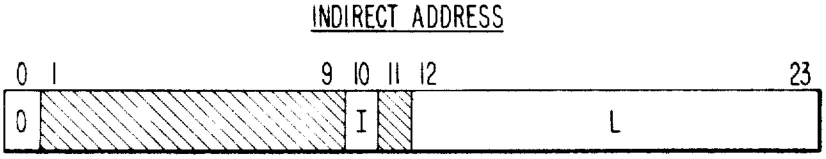
FIG. 2D is a diagrammatic representation of a format for the word organization of an indirect address word employable with the illustrative embodiment of FIG. 1.
Figure 2E:
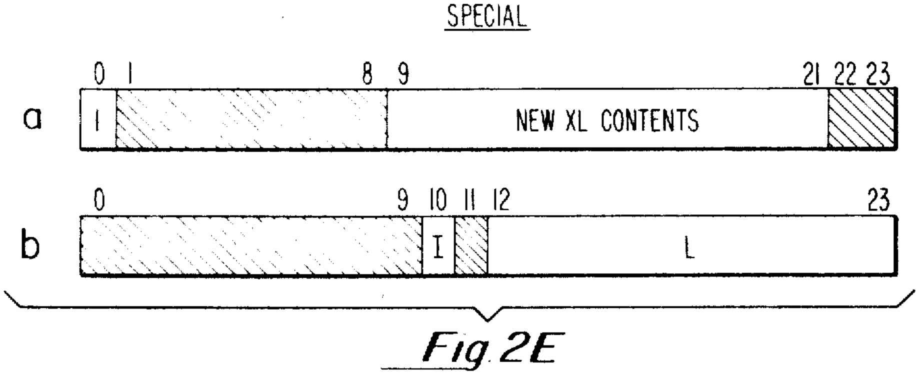
Figure 3:
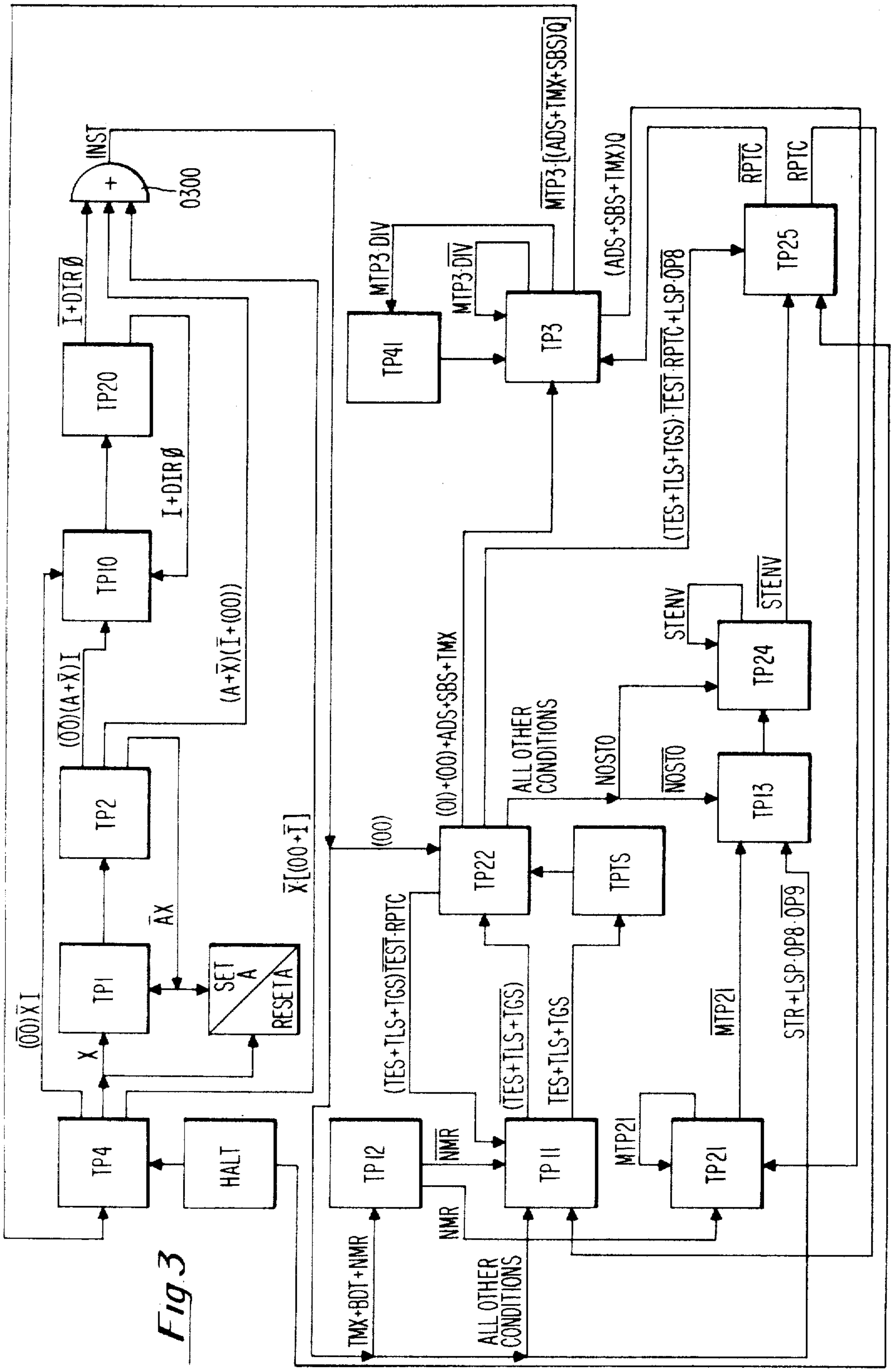

FIG. 2E*a* and FIG. 2E*b* are diagrammatic representations illustrating the format for the word organization utilized in special indirect addressing to permit reloading the index location register concurrent with execution of a command and employable with the illustrative embodiment of FIG. 1;

FIG. 3 is a block schematic diagram of the timing counter of the illustrative embodiment of FIG. 1 illustrating also timing flow in flow chart representation.

Figure 4A:
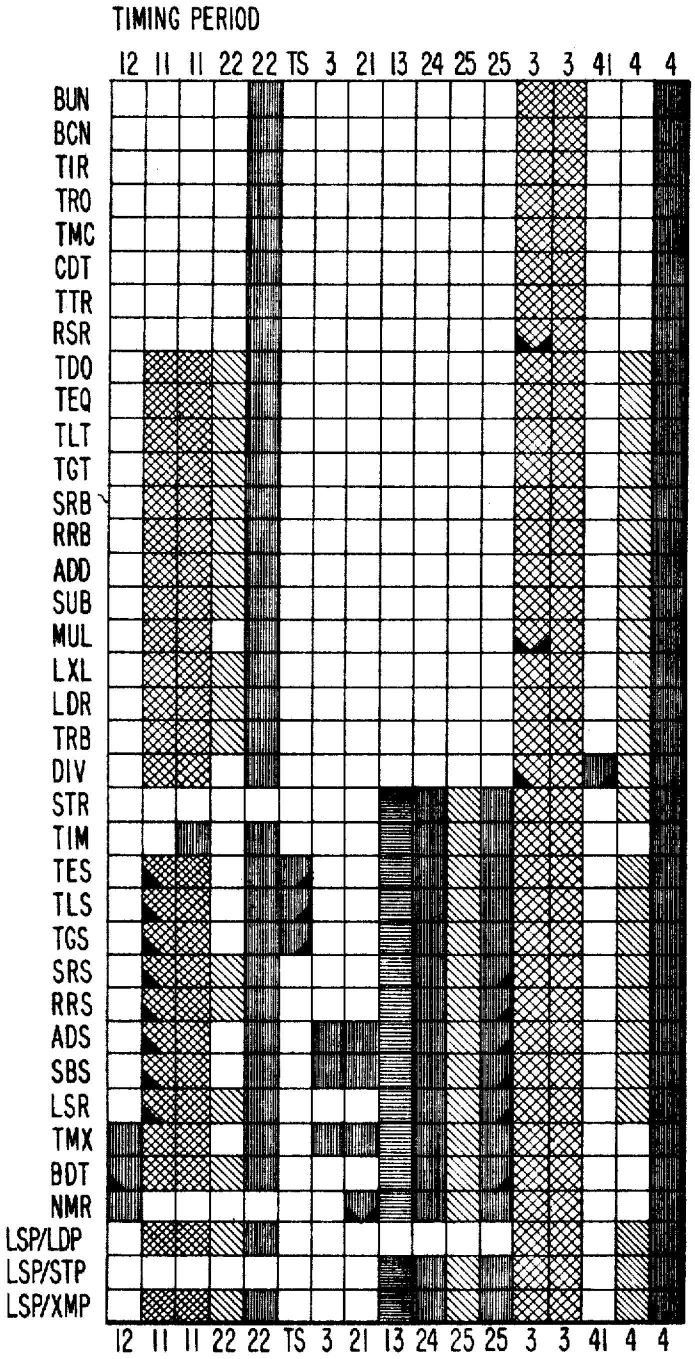
Figure 4B:
Figure 4C:
Figure 4D:
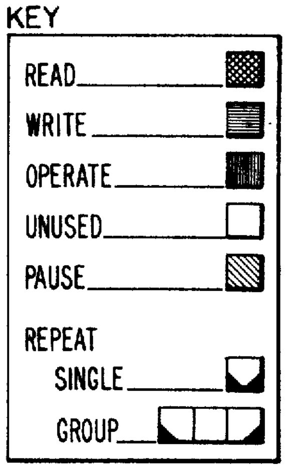
Figure 5:
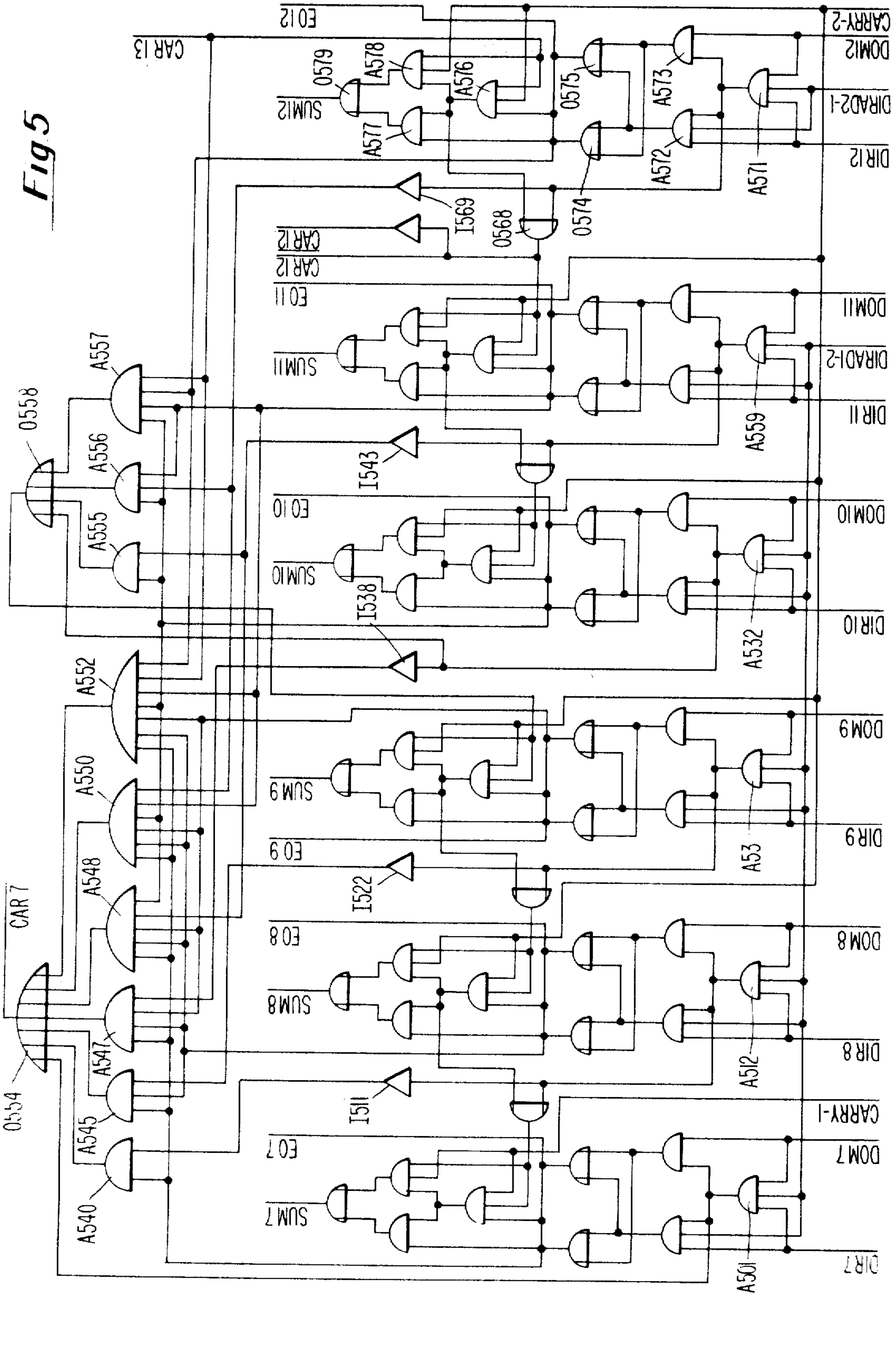
Figure 6:
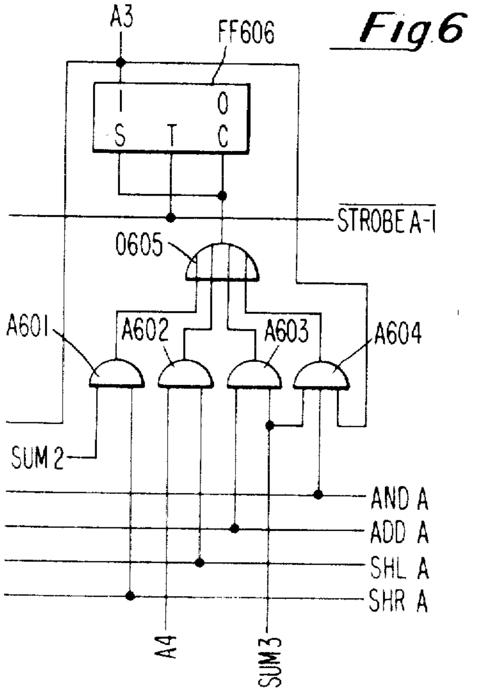
Figure 7:
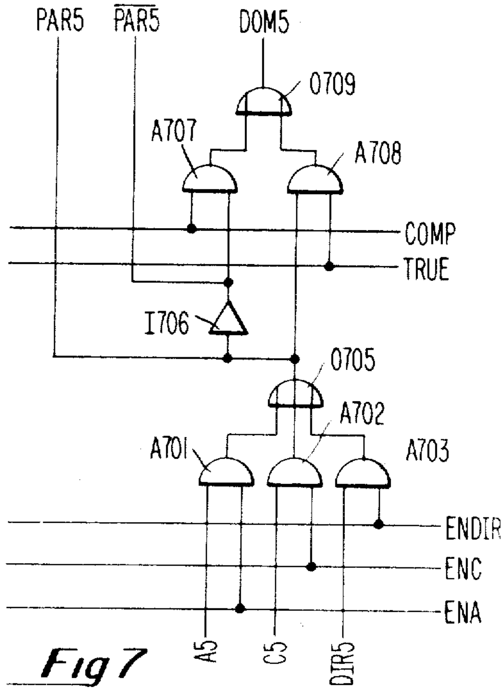
Figure 8:
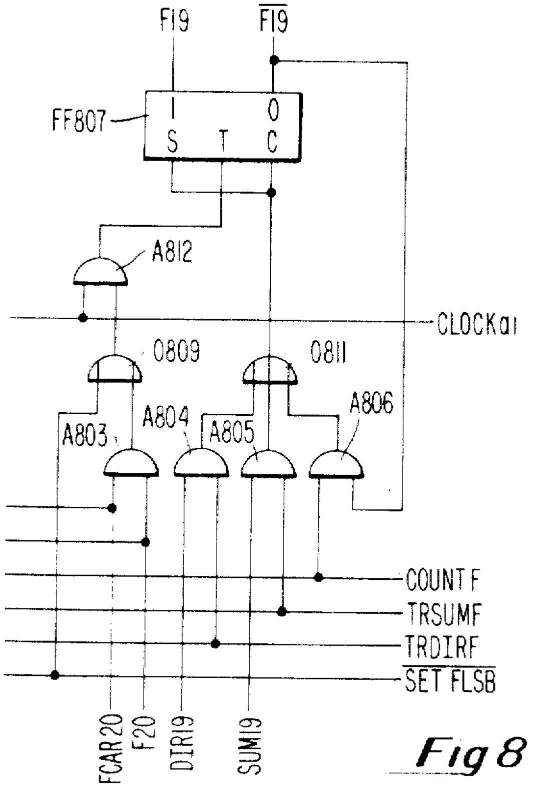
Figure 9:
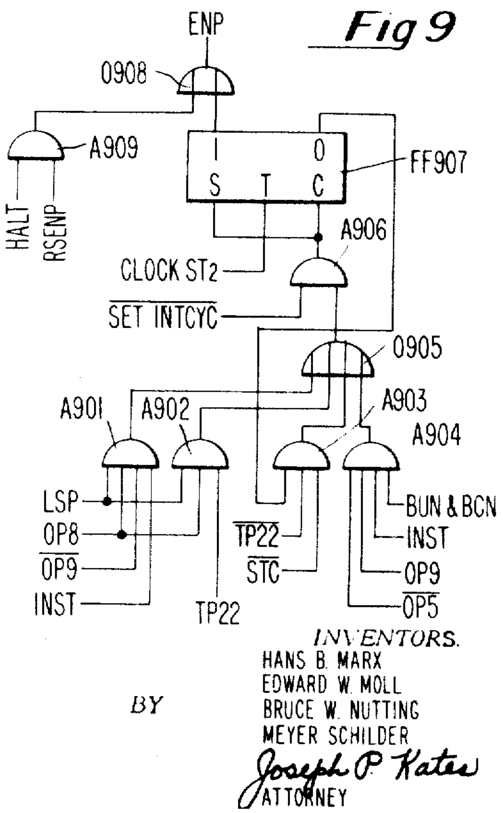
Figure 10:
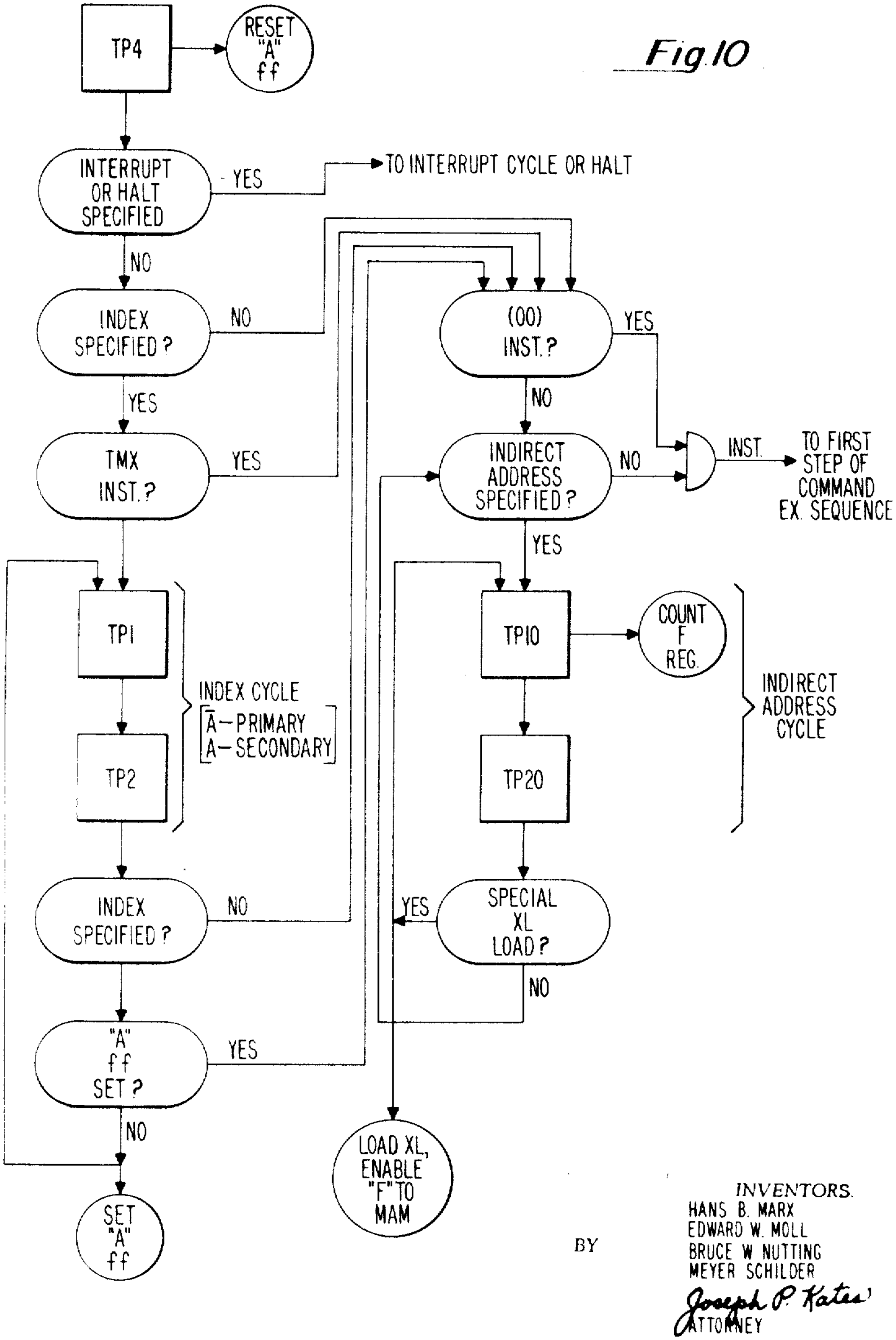
Figure 11:
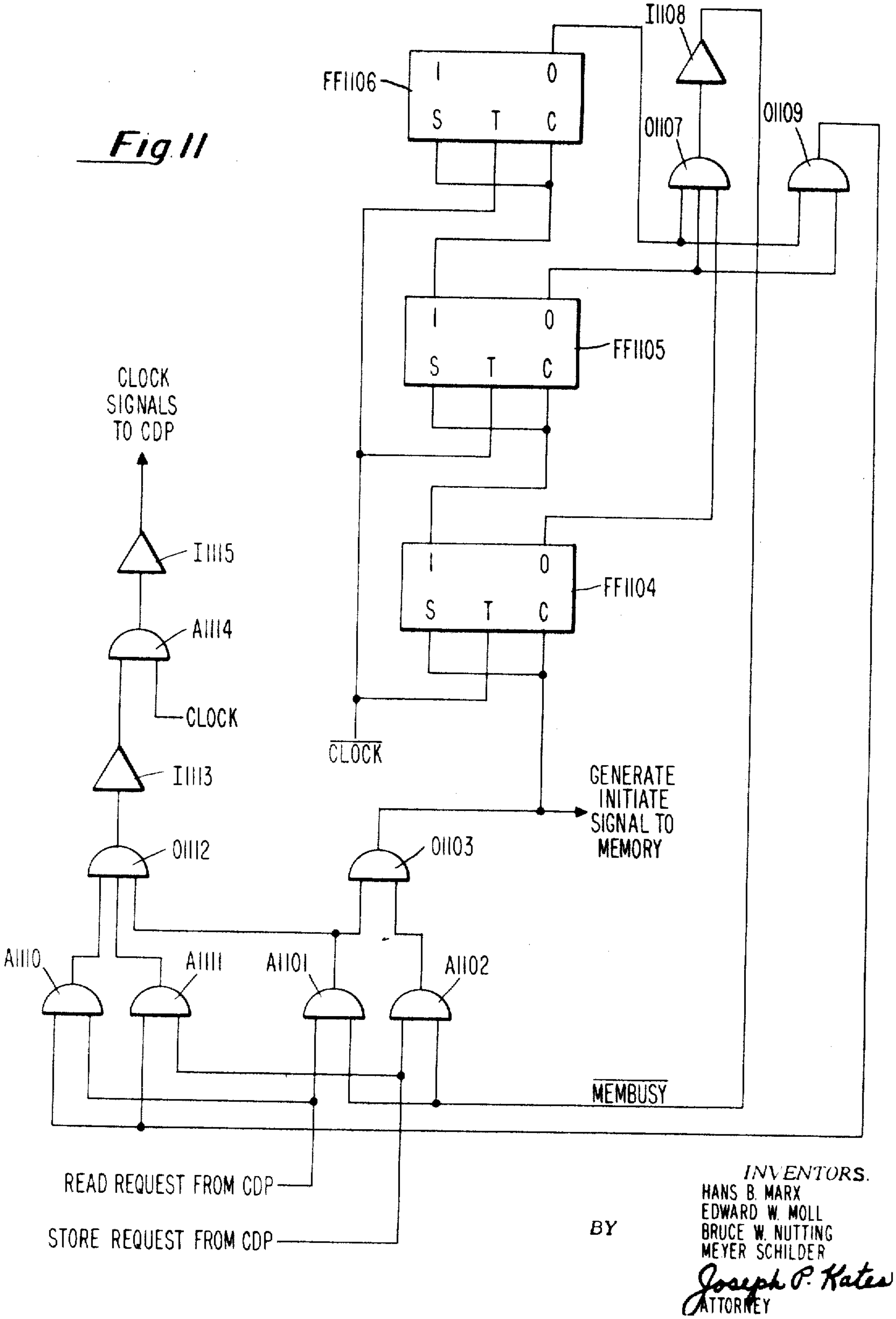

FIG. 4A is a master chart comprising a grid with subdivisions corresponding to the timing intervals employed in instruction execution and plotting the timing intervals employed for execution versus particular commands in the illustrative embodiment of FIG. 1 and showing adaptation to a memory having a four-microsecond cycle time by way of example of employment of one possible type of memory with the illustrative embodiment of FIG. 1;

FIG. 4B is a diagrammatic representation illustrating an indexing modification cycle for the system of FIG. 1 and in accordance with FIG. 4A;

FIG. 4C is a diagrammatic representation illustrating an indirect addressing cycle for the system of FIG. 1 and in accordance with FIG. 4A;

FIG. 4D is a representation of the key describing the command-timing interval subdivision component boxes of the chart of FIG. 4A;

FIG. 5 is a logic diagram of the circuits of bits 7 through 12, for example, of the adder of the illustrative embodiment of FIG. 1;

FIG. 6 is a logic diagram of the bit 3 circuit, for example, of the A register of the illustrative embodiment of FIG. 1;

FIG. 7 is a logic diagram of the bit 5 circuit, for example, of the circuits of the data output multiplex unit of the illustrative embodiment of FIG. 1;

FIG. 8 is a logic diagram of the bit 19 circuit, for example, of the address field register of the illustrative embodiment of FIG. 1;

FIG. 9 is a logic diagram illustrating a portion of the circuit for look-ahead subcommand generation of the illustrative embodiment of FIG. 1;

FIG. 10 is a flow chart illustrating the command manipulation sequence of the circuit of FIG. 3 as employed in the illustrative embodiment of FIG. 1; and FIG. 11 is a logic diagram illustrating the memory control logic and associated clock logic by means of which the central data processor of the invention is adapted to various types of memory, the example shown illustrating employment with a 4-microsecond DRO memory.

The term "I/O" is used throughout the specification and drawings as an abbreviation of "input and output." Now refer to the drawings and in particular to FIG. 1.

As shown in FIG. 1, the block diagram of the illustrative embodiment of the central processor of the invention, there are provided a data input register (DIR100, a parity check device 101, an adder logic circuit 103, a data output multiplex DOM) unit 104, a register check circuit 105, a timing and control unit 106, an A register 107, a C register 108, an operation register 109, a parity generator 110, a memory address multiplex unit 115, an address field register 116, a program counter 117, an index location register 118, a subcommand matrix 120, and a command decoder 121.

The data input register DIR100 may comprise 25 flip-flops and associated drivers. The data input register 100 holds (as 25-bit words) all data coming to the central data processor from all external sources including memory and I/O sources. The 25-bit words include 24 bits, which is the basic word length of the words in the machine plus a parity check bit. The parity check device 101 is responsive to the parity check bit in the data input register 100. The parity check device 101 checks the register 100 for odd parity and if parity does not check it provides an error signal to the timing and control logic 106 which will be described hereinafter. The adder logic circuit 103 is a 23-bit adder which is connected to and responsive to the 23-bit output from the data input register 100. Adder logic circuit 103 is also connected to and responsive to the output of data output multiplex unit 104. The 23 bits the adder logic circuit device 103 looks at are the least significant 23 bits from the data input register 100 and from the data output multiplex unit 104. By the 23 least significant bits is meant the 23 least significant bits of the actual 24-bit word (less parity); the 25-bit word includes the parity bit which really is in the least significant bit position. The most significant bit of a computer word in the illustrative embodiment machine is usually the sign bit. The adder 103 is a parallel adder incorporating both ripple carry (ripple down carry) and group carry in groups of 8, 7 and 8 (a total of 23). Within these 8-, 7- and 8-group carries, a subgroup carry of 4 bits is provided, as will be described hereinafter. The adder logic 103 comprises exclusive OR circuitry. The register check circuit 105 is connected to be responsive to the exclusive OR outputs of the adder logic 103. The register check circuit 105 detects a condition where all 23 bits of the exclusive OR output of adder logic 103 are ones ("1") and sends a signal in that event to the timing and control unit 106. The register circuit 105 checks the equality of any input to the data input register 100 with the contents of a register selected by the data output multiplex unit 104 for comparison. The check is used in many instructions, for example, wherein a condition is imposed, if equal.

The arithmetic unit of the central data processor comprises two registers: the A register 107 and the C register 108. The circuit of each of the A register 107 and C register 108 comprise 24 flip-flops and the associated gate circuitry. The input gates to each of the A register 107 and the C register 108 permit data input, shift right, shift left and an ANDing of the contents of the A or C register 107 or 108 and the data input. Although the A register 107 and the C register 108 are utilized as two separate accumulators for the adder logic 103, they can be combined for double precision operation. Not only the multiply and divide operations which conventionally are executed using double precision may be so employed, but in addition, double precision add and subtract may be effected utilizing the A register 107 and the C register 108.

The data output multiplex unit DOM104 comprises two sections: One section is a multiplex section which is capable of enabling one or more of the registers of the machine to provide outputs to it; that is, the DOM104 enables the gates to receive the contents of any of the registers of the machine into it, except an operation register OP109 and the index location register which will be described. The other section of the data output multiplex unit 104 selects either the true state or the complement state of the data provided by the first described multiplex section. When it is decided to accept inputs from one of the other registers in the central processor, the second section of the data output multiplex unit 104 either communicates the true contents of the register straight through the data input multiplex unit 104 or communicates the inverse of the contents of the register which is fed into a succeeding unit. The second section of the data output multiplex unit 104 can also be used to inhibit all inputs even though the first section of the data output multiplex unit 104 has enabled a register to provide inputs to the data output multiplex unit 104. This provides a dual control feature. The data output multiplex unit 104 also comprises drivers which provide power to send the data to the external units from the central data processor such as to the memory and I/O control units of the system. As mentioned hereinabove, the data output multiplex unit 104 also supplies one of the inputs to the adder logic unit 103. The parity generator circuit 110 generates odd parity on all words coming from the data output multiplex unit 104 and provides the 25th or parity bit required for transfers into memory and into the I/O control modules. Thus, any time data is sent from the central data processor, the word has parity.

The address and control section is shown generally in the right-hand portion of FIG. 1. The memory address multiplex unit 115 comprises a 12-bit multiplex unit with associated driver circuits. It is used for sending all addresses from the central data processor through a register in the I/O control unit from whence they are sent to the memory modules. This transfer is further described in the co-pending application Ser. No. 527,350, filed Feb. 14, 1966, for "Modular Computer System," of Hans Marx, and assigned to the assignee of the present invention. This co-pending application is incorporated by reference in the present application and supplements the disclosure herein.

Each bit of the 12 bits inserted in the memory address multiplex unit 115 can come from any one of four registers within the computer. These registers are the data input register 100, the address field register 116 to be described, the program counter 117 to be described, or the index location register 118 to be described.

The memory address multiplex unit 115 is employed also in 2-address (double address) commands. These are the ADS, BDT, LSR, RRS, SBS and SRS commands. To form the second address when required for these commands the memory address multiplex unit 115 enables a composite address to memory by enabling the six most significant bits from the index location register 118 and the six least significant bits from the address field register 116.

When the central data processor is in the Halt state control of the memory address multiplex unit 115 is furnished by the I/O Control unit.

The address field register 116 is a 12-bit flip-flop register which incorporates circuitry to give it a capability of being used as a counter. The address field register 116 contains either the address of a data word to be operated upon, or where there is no data word required it contains variation bits which modify a command word such that different options of the command may be executed. When employed as a counter the address field register 116 is used to count sequential addresses for block testing or it counts iterative steps for logic operations (in the divide operation or multiply operation, for example) and in both cases the address field register 116 counts up from zero until a preselected number is detected. Thus, in a divide operation it is known in advance by the divisor how many steps there are, e.g. 23 steps. The address field register 116 is used in this application as an adjunct to the timing counter which is a portion of timing and control unit 106. The address field register 116 is fed from (1) the output of the adder logic 103 and (2) the output of the data input register 100.

The program counter 117 contains 12 flip-flops and associated counter logic. The program counter 117 sequentially counts up the addresses contained in each of the sequential instruction words. Program counter 117 can be loaded either from the data input register 100 or from the adder logic 103. Either the input from the data input register 100 or the input from the adder logic 103 can be utilized for branching operations.

The index location register XL118, a 10-bit flip-flop register, is provided for indexing. The 10 bits of the index location register 118 provide the most significant 10 bits of a 12-bit address. The least significant two bits of the address which are added to make the 12-bit total address are selected from two bits taken from the data input register 100 when the data input register 100 contains an instruction word, an index word, or an indirect address word. Any one of these 12-bit words in the DIR100 contains two bits which specify that indexing will be effected if either bit is a "1." Further, if either of these two bits is a "1," which specifies that indexing is to occur, they form the least significant two bits of the address word which two bits when added to the 10 bits of the index location register 118 form the address word. Thus, a 12-bit word is formed from the two bits specifying that indexing should be done, that is, one of the two bits being a "1," plus the more significant 10 bits provided by the contents of the index location register. This 12-bit word specifies the location in main memory where the index word is stored. Since one of the two (least significant) bits must be "1" there are only three index registers active at one time. That is, there are only three possible index registers which can be selected from the 10-bit contents of the index location register 118 plus the two lesser significant bits taken from the word stored in the data input register 100.

When these two bits taken from the data input register 100 are both zeros, they can be used for special applications. For example, they may be used in combination with the 10 most significant bits which are the contents of the index location register 118 in iterative programs where a portion of the program is to be repeated a number of times. In this case these two zeros (referred to hereinafter as the "00 location") plus the 10-bit word of the index location register 118 defines the location of the word in memory which counts the number of times of iteration that this portion of the program is repeating. This same location (00 location), that is, the two zeros (00) which form the least significant two bits added on to the contents of the index location register 100, also may be used as an address in main memory in which is stored the address which records the results of a successful test of a block of words in memory; also, this word stores the number of shifts necessary in performing a normalizing instruction; this word also forms one of the two addresses for temporary storage when it is desired to shift the location of the word in memory from one location to another location. (To facilitate explanation it is noted at this point that the illustrative embodiment is a one-address machine.)

The last three above-enumerated uses (of the index location register 118 contents plus the additional two bits which are taken from the data input register 100 or are forced to 00 by the instruction) are so utilized only during the execution of certain instructions. These certain instructions comprise, for example, the TMS (test or modify index) instruction, the NMR (normalized register) instruction and the LSP (load and/or store program counter register) instruction. When one of these four instructions occurs the machine looks at the program counter 117 to determine the address in memory to be fetched. These three instructions, TMX, NMR and LSP, cannot be indexed because they will not respond to the presence of an "1" in the least significant two bits of the 12-bit word made up by the contents (10 bits) of the index location register 118 and the data input register 100 two bits, but rather, instead of indexing, these three instructions cause this address to be utilized in accordance with the purposes of the particular instruction. This feature enables a great amount of versatility to the programmer in utilization of the word which otherwise would be an index word. A portion of the index location register 118 is used as one of the addresses in the two-address instructions of the read-write group (ADS, BDT, LSR, RRD, SBS and SRS). When executing one of these instructions, the first address is taken from the address field register 116, and the second address is formed by combining the 6 most significant bits of the index location register 118 with the 6 least significant bits of the address field register 116 by means of the memory address multiplex 115.

In iterative operation, specified by the flip-flop RPTC (not shown) being set during an index cycle, the address field register 116 is counted at each iteration, thereby advancing both the first and second address words until the least significant 6 bits of the address field register 116 reach an octal value of 77. This is the final address for all block operations and block tests, the initial address being determined by the address placed in the address field register 116 at the start of the execution of an instruction having an iterative operation specified.

The BDT instruction is a two-address instruction which, if no iterative operation is specified, obtains addresses from the address field register 116 and from the index location register 118 with the additional two bits forced to (00). If an iterative operation is specified (RPTC set) the first address is obtained from the address field register 116 and the second address is constructed from the most significant six bits of index location register 118 and the least significant six bits of the address field register 116 as described above. Thus this composite word is used for (1) indexing, (2) to check for the limit and (3) to store the address of the word which indicates that the block test has been successfully met. These features permit sequential testing of the machine memory, block by block. Also, large groups can be taken and a number of sequential blocks can be tested sequentially within this large group for less than, for greater than, or for compare equal to a specified number. This feature enables the one-address machine of the illustrative embodiment when required to exhibit the behavior and to provide the advantages of a two-address machine.

Refer to FIGS. 2A, 2B, 2C, 2D and 2E of the drawings. FIG. 2A is the format showing the word organization for the command word. The bits 0–5 are the command field bits, CM; bits 6 and 7 are the primary index field bits, PX; bit 8 is the arithmetic register selection field bit, R; bit 9 is the variant field bit, V; bit 10 is the indirect address selection field bit, I; bit 11 is the module selector field bit, M; and bits 12–23 specify the address field, L. In the data word of FIG. 2B the 0 bit designates the sign and bits 1–23, inclusive, represent the magnitude. Bit 1 is the most significant bit of the magnitude. The index register format is illustrated in FIG. 2C. The index register format comprises bits 6 and 7 which are the secondary index field bits, SX; bit 8, which is the repeat (block) control field bit, RP, and bits 12–23, inclusive, which specify the index value, XV. The SX and RP fields are used for control whereas the SV field is the actual index modifier. FIG. 2D illustrates the format for normal indirect addressing, and FIG. 2E illustrates the format for special indirect addressing. Bit 0 of the contents of the indirect address location controls the specification of normal or special indirect addressing. For normal indirect addressing as shown in FIG. 2E*a*, bit 10 specifies the indirect address selection field, I, and bits 12–23 specify the address field, L. When bit 10, the I bit, is a "1" this indicates that further indirect addressing is required, whereas when bit 10, the I bit, is a "0" this indicates that no further indirect addressing is required. For special indirect addressing as shown in FIG. 2E*a*, bit 0 is a "1." Bits 9–21 inclusive is the field which supplies the new contents of the index location register 118. As shown in FIG. 2E*b*, bit 10 is the indirect address selection field, I. Bits 12–23, inclusive, specify the address field L.

Special indirect addressing permits reloading the index location register 118 (XL) concurrent with execution of the command. Since the contents of the index location register specify which index registers apply to address modification, it should be noted that the index location register 118 reloading occurs after indexing is applied to the command. The first pair of memory locations used in special indirect addressing provides the new contents of the index location register and the next sequential memory location contains the indirect address itself.

A partial list of commands which the illustrative embodiment computer may employ and which the first 6 bits in the operation register 109 denote is as follows:

| | MNE | Command Description |
|---|---|---|
| Octal: | | |
| 02 | BUN | Branch Unconditionally. |
| 03 | BCN | Branch on Condition. |
| 04 | TIR | Transfer Input to Register. |
| 05 | TRO | Transfer Register Out. |
| 12 | TMC | Test or Modify Controls. |
| 13 | CDT | Control Descriptor Transfer. |
| 16 | TTR | Test or Transfer Register. |
| 17 | RSR | Reset and Shift Register. |
| 22 | TDO | Transfer Data Out. |
| 23 | TEQ | Test for Equal. |
| 24 | TLT | Test for Less Than. |
| 25 | TGT | Test for Greater Than. |
| 26 | SRB | Set Register Bits. |
| 27 | RRB | Reset Register Bits. |
| 30 | ADD | Add. |
| 31 | SUB | Subtract. |
| 33 | MUL | Multiply. |
| 34 | LXL | Load Index Location Register. |
| 35 | LDR | Load Register. |
| 36 | TRB | Test Register Bits. |
| 37 | DIV | Divide. |
| 44 | STR | Store Register. |
| 45 | TIM | Transfer Input to Memory. |
| 63 | TES | Test for Equal and Store. |
| 64 | TLS | Test for Less Than and Store. |
| 65 | TGS | Test for Greater Than and Store. |
| 66 | SRS | Set Register Bits and Store. |
| 67 | RRS | Reset Register Bits and Store. |
| 70 | ADS | Add to Register and Store. |
| 71 | SBS | Subtract from Register and Store. |
| 73 | LSR | Load and Store Register. |
| 74 | TMX | Test or Modify Index Register. |
| 75 | BDT | Block Data Transfer. |
| 76 | NMR | Normalize Register. |
| 77 | LSP | Load and Store P (Load option, Store option, exchange option). |

THE OPERATION REGISTER

Refer again to FIG. 1. The operation register 109 may be a 10-bit flip-flop register 109. The operation register 109 holds the 12 most significant bits of the instruction word which is currently being performed excluding bits 6 and 7 (the index bits). These 11 bits specify the instruction which is to be decoded and the major variants of that command. The operation register 109 is the only register in the machine that is loaded directly from the 25-bit word input from a memory module or from an I/O module. The most significant eleven bits of a 25-bit command word coming from memory and from the I/O control modules form the actual command bits of the instruction word. These 11 bits are fed directly into the operation register 109. The entire 25-bit word is simultaneously fed into the data input register 100 and this 25-bit word comprises the 12 most significant bits excluding bits 6 and 7 which are the instruction portion of the word. The 25-bit word also comprises one bit which denotes memory module select and a twelve-bit address portion plus the least significant of the 25 bits which is the parity bit.

In a two-memory module configuration, for example, this memory module select bit specifies which of the two memory modules is to be accessed. In a memory module configuration of more than two, with a slight change in logic, more bits, for example bits 9, 10 and 11 could be used to set up a primary and a secondary selection register to select which one of more than two memory modules (e.g. up to eight modules) was selected for access. Where one memory module selected bit is provided this is bit 11 of the bits in the address field register 116 word. There are 12 bits in the address field register 116. These are bits 12 through 23 of the word from the data input register 100. These latter 12 bits are the address of the operand of the instruction before indexing or other modification takes place. As stated, the 11th bit, the module select bit, is the bit used to select any one of two initiate signals, one selecting memory module 1 and the other selecting memory module 0.

The first six most significant bits of the instruction word specify the particular instruction. These six bits comprise up to 64 octal words which specify 64 instructions which can be decoded by the command decoder and executed. The commands are listed in the previous section. The nonlisted commands are generally for diagnostic procedure although other uses also are contemplated.

The 10-bit instruction portion of the word in the operation register 109 is sent to the command decoder 121. The command decoder 121 decodes the most significant 6 bits of the 10-bit instruction portion of the 10-bit word received from operation register 109. The remaining five bits of the 10-bit word from operation register 109 are fed directly to the subcommand matrix 120.

In addition to decoding the six bits representing the primary command from the operation register 109, the command decoder 121 also decodes subgroups within the six command bits which, for example, denote which group of a group of instructions is involved for purposes of similar timing and similar controls.

The address field register 116 sometimes is utilized to insert variation bits into the command word. When so utilized the address field register 116 feeds the variation bits into the command decoder 121 and thence into the subcommand matrix 120. The command decoder 121 and subcommand matrix 120 acting together then decode the varied commands specified by the variation bits to thereby cause the timing and control unit 106 to control the computer mechanism such that the varied command is carried out. In the absence of a variant syllable inserted by the address field register 116, the principal command, encoded by the command decoder 121 from the output of the operation register 109, is routed via the subcommand matrix 120 to cause timing control unit 106 to set up appropriate timing and to exercise appropriate control to execute the principal command. From the subcommand matrix 120 also are sent signals which occur in some commands which inform the I/O modules and the memory modules involved that a word is to be routed from memory via the computer to the I/O modules instead of merely to the computer. Also, by means of the subcommand matrix 120 certain commands may effect the sending of the contents of data to and from the I/O control module (or one of the I/O control modules) and the A register 107 or the C register 108. The subcommand matrix 120 also specifies whether these transfers between I/O control modules and either A register 107 or C register 108 or memory are data words or are command words to the I/O module addressed. That is, transfer can be effected either from the memory or from the A register 107 or from the C register 108 to a designated I/O control module, or transfer can be effected from a designated I/O control register to either a memory module, or the A register 107, or the C register 108 by the subcommand matrix 120 decoding mechanism and the associated logic in the I/O control modules.

A unique feature of the computer of the present invention is that it can adapt to a clock external to the computer. The timing and control unit 106 is synchronized to the external clock frequency or a multiple or submultiple thereof. The synchronization with the external clock usually is governed via the I/O control module so that the I/O control module is enabled to synchronize memory and computer operations as well as transfer operations therethrough. This feature is particularly advantageous in that it eliminates the need for a master-and-slave clock procedure and periodic updating of the various clocks for insuring of synchronization or for special timing circuits. This capability of the invention enables synchronization with various types of inputs which may be operating at different frequencies; for example, different kinds of radar or television inputs may be accepted by using the basic clock of the input system as the master clock of the present system.

The timing and control unit 106 is also responsive to interrupt signals from the I/O control module. These interrupt signals can specify that the next instruction be called from an address supplied directly from an I/O control module to memory. The interrupt signals from the I/O modules inhibit the program counter 117 from counting and inhibit the output of the program counter 117 from being sent to memory during the interrupt cycle. The timing control unit 106 responds to the interrupt signals from the I/O control module by sending to the I/O control module which sent the interrupt signals a signal which states that the computer is ready to receive information from the input/output control module. As stated, the program counter 117 is not counted or updated during this period and its contents are not transferred out. The timing control unit 106 is responsive also to start and stop signals from an I/O control module and also is responsive to various limit, error and test conditions within the central data processor, to vary timing of the control flip-flops, etc.

TIMING

Now refer to FIG. 3. FIG. 3 illustrates the timing counter (not numbered) of the timing and control unit 106 of the illustrative embodiment of the invention shown in FIG. 1. The TP symbols in the blocks as TP1, TP2, TP3, etc. refer both to the respective flip-flops which are set to initiate the starting and to maintain each of these timing periods and also refer to the respective time periods involved.

The timing of sequences within the central data processor of the illustrative embodiment of the invention is accomplished by the use of the ring counter of FIG. 3. This ring counter provides many possible jumps within the ring. There are fifteen active timing pulses (TP) in the counter ring, as well as a Halt state. The contents of the operation register 109 is used to control the basic sequence of the timing pulses. Control flip-flops are also used to inhibit or allow certain counter sequences.

The timing sequence for an instruction may be divided into two parts: command manipulation and command execution. During the last two time periods of each previous command (TP3 and TP4), the instruction word is read from memory, the operation code is placed in the operation register 109, and the address or control bits are placed in the address field register 116.

If indexing or indirect addressing are specified, the timing sequence proceeds to the command manipulation phase; otherwise, the timing sequence proceeds to the command execution phase (initiated by the INST signal to be described).

Assume the computer is operating and a command is being executed at TP3 when a new instruction is to be executed.

During the timing period TP3 and TP4 of a previous instruction data manipulation in accordance with the previous command is being executed. Additionally, at this time the new command is being read from memory. At time period TP4 data manipulation for the previous instruction is completed and it is determined whether indexing and/or indirect addressing is required for the new instruction. The indexing cycle covers time period TP1 and TP2. If indexing is to be effected then X is true as indicated at the input to the flip-flop TP1.

If indexing is to be effected, during time period TP1 the index value is read from memory. All index registers are contained in memory. The presence of a "one" in either the sixth or seventh bit positions of the new instruction word in the data input register 100 causes the machine to access memory at the address specified by the index location register 118. During time period TP2 the index value is added to the address of the contents of the address field register 116 which contains the address of the new instruction. At time period TP2 it is also determined if a second index operation is to be required. If so, the A flip-flop is reset. The word denoted by the address in the address field register 116 is then read back from memory and if the sixth or seventh bit is a "one" this indicates that further indexing is to take place. In that event, the timing sequence goes again through time period TP1 during the fetch from memory operation and at time TP2 the data manipulation involved in indexing is effected as above.

If further indexing is required at this time period TP2 the A flip-flop is set. When the A flip-flop is in set condition, no further indexing is permitted to take place.

It is further determined during time period TP2 whether indirect addressing is required. The presence of an I being true (I) indicates that indirect addressing is to be effected. Indirect addressing is accomplished in time periods TP10 and TP20. Refer to the lead from TP4 to TP10, for example. The 00 legend indicates a control group instruction. The control group instructions comprise BUN, BCN, TIR, TRO, TMC, CDT, TTR and RSR. All of these commands are used to control various flip-flops and registers, and none of them require any data to be read from memory. The X symbol on the leads indicates that indexing is to take place and $\bar{X}$ indicates that indexing is not to be effected. Similarly, I indicates that indirect addressing is to be effected and $\bar{I}$ indicates that indirect addressing is not to be effected. Thus, as shown on the lead from timing period flip-flop TP4 to timing flip-flop TP10 labeled $(\overline{00})$ $\bar{X}$, I, indirect addressing is to be effected; no indexing is specified; and the command to be executed is not in the control group. In that case, a jump occurs to time period TP10. Similarly, as indicated by the lead line from the ouput of flip-flop TP2 to the input of flip-flop TP10 $(\overline{00})(A+\bar{X})(I)$, the instruction is not a control group instruction; either indexing is not to be effected or the A flip-flop is set; and indirect addressing is to be effected as denoted by the I. When the instruction word indicates these conditions, a jump is effected to time period TP10. The indirect addressing cycle comprises time periods TP10 and TP20. At time period TP10 the indirect address word is read from memory. At time period TP20 the contents of the address field register 116 are replaced with the indirect address read from memory. It is determined also whether further indirect addressing is required. If indriect address (I) bit 10 is a one (see FIG. 2D) this indicates that further indirect addressing is required whereas if the I bit, that is, bit 10, is a zero, this indicates that no further indirect addressing is required.

If further indirect addressing is required the machine recycles back to time period TP10. If the 10th bit of the contents of the address field register 116 is a zero this indicates that no further indirect addressing is required. The machine then executes the command, sending the signal to initiate execution from the output of an OR gate 0300 which is provided. The command execution initiating signal is denoted by the symbol INST at the output lead from OR gate 0300.

An output provided from the time period flip-flop TP2 connecting into OR gate 0300 is denoted by the legend $(A+\bar{X})(\bar{I}+(00))$. The symbol + in FIG. 3 is the logic symbol meaning "or." This legend describes the conditions where either two indexing cycles have been effected resulting in the A flip-flop being set, or indexing is not to be effected again and indirect addressing is not to be effected or the instruction is in the control group. Under the conditions satisfying this legend the machine proceeds via INST to execute the instruction.

An output lead of flip-flop TP4 is provided and connects into the input to OR gate 0300. This lead bears the legend $\bar{X}((00)+\bar{I})$. The symbols $\bar{X}\cdot I$ on this lead indicates the case where indexing is not to be effected and either the instruction is a control group instruction or indirect addressing is to be effected also. In this case the machine via OR gate 0300 provides the INST output to commence execution of the instruction which is in the operation register 109.

Refer to FIGS. 2E*a* and 2E*b* in conjunction with FIG. 3. Provision is made in the illustrative embodiment for special indirect addressing. Special indirect addressing permits reloading the index location register 118 concurrently with execution of the command. Since the contents of the index location register 118 specifies which index registers apply to address modification, the relating of index location register 118 must occur after indexing is applied to the command. The first of the pair of memory locations used in special indirect addressing shown in FIG. 2E*a* provides the new contents of the index location register 118. The next sequential memory location, the contents of which are shown in FIG. 2E*b*, contains the indirect address itself. In special indirect addressing during time period TP10 the indirect address is read from memory and the address field register 116 is counted up "one." At time period TP20 the indirect address which was read from memory is placed in the index location register 118. Then the contents of the address field register 116 are transferred to the memory address multiplex 115 and the timing counter jumps to TP10. At the time period TP10 the indirect address word is again read from memory. However, this time the indirect address word has been derived from the contents of the address field register 116. After this, normal indirect proceeds.

Refer to FIG. 10. The command manipulation sequence flow chart of FIG. 10 illustrates simply the command manipulation phase which has been discussed hereinabove.

Now refer to the lower portion of FIG. 3 which shows the timing control for the command execution phase.

COMMAND GROUPING

The basic commands of the illustrative embodiment machine of the invention are divided into four groups. Each group defines a particular type of action. These groups are identified by the state of the first two bits of the six-bit command word. The groups are control group (bits 00), read group (bits 01), write group (bits 10) and read/write group (bits 11).

*Control group (00)*

This group contains the commands BUN, BCN, TIR, TRO, TMC, CDT, TTR and RSR. The full titles of each of these commands mnemonically listed in this section are shown hereinabove in column 8. All of the control group commands are used to control various flip-flops and registers. None of them require any data to be read from memory. They each use the timing sequence of: Command Manipulation, if any: TP22: TP3: TP4.

The RSR command repeats TP3 when a shift option is specified. A special condition relating to these commands is that no indirect addressing is allowed during the command manipulation phase.

*Read group (01)*

This group contains the commands: TDO, TEQ, TLT, TGT, SRB, RRB, ADD, SUB, MUL, LXL, LDR, TRB, and DIV. These commands include most of the arithmetic and logical instructions, and each requires that a data word be read from memory during the execution of the instruction. They each use the timing sequence of: Command Manipulation, if any: TP11: TP22: TP3: TP4. The MUL command repeats TP3 during a multiply, and the DIV command repeats the special sequence TP3: TP41 during a division.

*Write group (10)*

This group contains the commands: STR and TIM. Both of these commands are used to place data in memory, either from a register (STR) or from the I/O (TIM). The basic Write Group timing sequence is: Command Manipulation, if any: TP13: TP24: TP25: TP3: TP4.

The timing count TP24 is repeated if additional time is required by the memory for a store cycle. The TIM command uses TP11 and TP22 after the command manipulation and before TP13 in order to obtain the data word from the I/O before entering the store cycle.

*Read-write group (11)*

This group contains the commands: TES, TLS, TGS, SRS, RRS, ADS, SBS, LSR, TMX, BDT, NMR, and LSP. Each of these commands may (with certain options) both read a data word from memory and write the data in memory during the course of the execution of the instruction, with the exception of the NMR command, which does not read a data word from memory. The NMR command is a member of this group because of the special timing required for its execution. The many variations in this group make it impossible to assign a basic timing sequence. Each command, under various options, may contain the following cycles: Command Manipulation, if any: Read cycle TP11: TP22, or TP11: TPTS: TP22; Operation cycle TP22: TPS: TP21; Write cycle TP13: TP24: TP25; and Final Cycle TP3: TP4. These cycles may overlap, repeat, or occur in varying sequences as required by the command being executed. A special feature of this command group is that the commands, TES, TLS, TGS, SRS, RRS, ADS, SPS, LSR and BDT, may be specified as iterative commands by an option of the primary index cycle of the command manipulation sequence. The iterative commands will repeat certain sequences a specified number of times in order to perform a given operation on a block of data words with a single command.

Refer again to FIG. 3. Execution of the commands commences upon the occurrence of the INST pulse indicating start execution phase. The start of the paths of execution of the commands are made by (1) entry of the control group denoted by the symbol 00 is made into timing period TP22 by setting flip-flop TP22, (2) if the signal indicated either a TMX or BDT or NMR command entry is made into timing period TP12 by setting flip-flop TP12, (3) if the signal indicates the command to be a STR or alternatively specifies a LST together with the 8th bit of the operation register 109 being a "one" and the 9th bit of the operation register being a "zero," entry is effected into timing period TP13 by setting flip-flop TP13, (4) in the case of all other conditions entry is made into timing period TP11 by setting the flip-flop TP11.

Consider a command which is in the control group as denoted by the symbol 00. Upon entry into timing period TP22, during timing period TP22 data manipulations are effected in accordance with the command being executed. Additionally, the address of the next instruction is enabled to the memory address multiplex unit 115 to specify the location of the next word written into or read out of memory. In the event that an interrupt is about to be executed, the enabling of the address is inhibited. Then for a command group instruction a jump is executed to timing period TP3 as indicated by the lead labeled with the symbols $(01)+(00)+ADS+SBS+TMX$. (The + is the logic symbol for OR.) Of the several signals handled along this line, in this instance the control group (00) is the alternative being executed. In executing a control group command after exit from timing period TP22 entry is made into timing period TP3. At timing period TP3 data manipulation according to the command beng executed is continued. If repeat operations involved in this control group command are completed then a new command is read from memory during the timing period TP3. In the case of certain I/O interrupts, the reading of the new command from memory is inhibited. Since the next command has been read during TP3 (as described hereinabove for the fetch phase) exit is made to timing period TP4 via the line $\overline{MPT3\cdot[(ADS+TMX+SBS)Q]}$. This notation indicates that timing period TP3 flip-flop is no longer being maintained set and the command being executed is not an ADS nor a TMX nor SBS command and the control flip-flop $\overline{Q}$ is reset. As indicated by the recycling lead $MTP3\cdot\overline{DIV}$ if reiterated operations are continued and the command is not a division, recycling occurs to maintain flip-flop TP3 in set condition during the reiterative operaton.

The second entry to be discussed is entry into time period TP12 upon the instruction being executed being a TMX or a BDT or an NMR. If the command is a TMX or a BDT, at the timing period TP12 the contents of the index location register 118 are enabled to the memory address multiplex unit 115. TMX is the mnemonic symbol for the test or modify index register command. BDT is the mnemonic representation for the block data transfer command. The BDT command transfers data between memory locations without disturbing either of the arithmetic registers. The source is the contents of the index location register 118 with the last two bits forced to be 00 by the instruction. During timing period TP12 in the case of an NMR (normalize register) command, the six least significant bits of the address field register 116 are reset. If the instruction is an NMR instruction then a jump is effected to timing period TP21. If it is not a normalizing NMR instruction then the jump is taken to timing period TP11. The NMR instruction (of the Write group 10) is a "read and store" instruction, and at timing period TP21 data manipulation takes place which would occur at timing period TP4 in an equivalent "read" instruction. That is, the correct address is enabled to the memory address multiplex unit 115 and the program counter 117 count is stepped unless inhibited by an interrupt. In the NMR instruction, the timing period TP21 is repeated while the specified register, the A register 107 and/or the C register 108 is shifted. The action continues until the normalized condition is met or a maximum shift count (63, for example, in the illustrated embodiment) has been reached. That is, as shown by the loop designated "MTP21," for the NMR instruction, recycling is effected to continue enabling the timing period flip-flop TP21 until normalization has taken place of until a maximum shift count is reached. The number "63" is involved because there are only 64 possible combinations for the six bits of the F register 116, which 64 bits include the start condition. As indicated by the lead designated $\overline{MTP21}$, when the normalizing operations at timing period TP21 are concluded, a jump is made to timing period TP13. At timing period TP13 the store operation is initiated. The store operation is the operation of storing the number of shifts necessary to do the normalizing commands. A jump is then effected to timing period TP24. At timing period TP24 the store operation continues and the timing period flip-flop TP24 is held activated repeatedly as long as the STENV signal is received from memory. The recycling loop STENV, or store envelope, insures that this hold is effected. The hold is required because the write operation of the particular memory employed with the computer of this invention may take more than one microsecond for a write operation. It will be later described how the computer of the present invention is adapted to be utilized with memories of varying frequencies and access times. (The bar above words, e.g. $\overline{\text{STENV}}$, means "not" in this patent application.) When the $\overline{\text{STENV}}$ signal is received from memory a jump is effected to timing period TP25. At timing period TP25 it is determined whether a repeat operation is to be performed. If a repeat operation is to be performed, which is the case in a multiword operation, for example, then as indicated by the lead RPTC a jump is effected to timing period TP11 and thence to timing period TP22, to timing period TP13. The operation is repeated for each word of the multiword group.

If no repeat operation is specified then, as indicated by the lead $\overline{\text{RPTC}}$, a jump is effected to timing period TP3 for the reading out of the new command and execution of this command is terminated.

Now refer to the case where upon the conclusion of the timing period TP12 the instruction is not an NMR. As shown by the lead from the timing period TP12 block in FIG. 3, labeled $\overline{\text{NMR}}$, a jump is effected to timing period TP11. Timing period TP11 provides for read data subcommand execution. During timing period TP11 data is read from memory (except for the TIM instruction to be discussed where data is read from the I/O control module). After reading the data a jump is effected to timing period TP22, except that where one of the three test and store commands, TES, TLS or TGS, is being executed, a jump is made to the timing period TPTS (timing period test and store). In the case of a test and store instruction, at timing period TPTS data manipulation peculiar to these commands is effected and following this a jump is made also to timing period TP22. The occurrences at steps executed at timing period TP22 have been discussed in conjunction with the control group commands. As shown by the recycling loop (TES+TLS+TGS) $\overline{\text{TEST}}$·RPTC for test instructions, if the test has not been successful, and repeat of the test is indicated by the $\overline{\text{RPTC}}$ signal, then recycling is made and a jump back is made to timing period TP11 until the test has been completed. As stated, the steps executed during timing period TP22 have been discussed in connection with the control group. In the group being discussed, from the INST occurrence of a TMX+BDT+NMR (TMX or BDT or NMR) where the signal is not for a NMR command then it is a TMX or a BDT command. In that case, following the action at timing period TP22 a jump is effected to timing period TP3 by the notation TMX of the signal (01)+(00)+ADS+SBS+TMX on the top lead between timing flip-flop TP22 and timing flip-flop TP3. The TMX instruction is completed in timing periods TP3 and TP4. If the instruction is a BDT command a jump is effected from timing period TP22 to timing period TP13 along the lead "all other conditions" and continuing "$\overline{\text{NOSTO}}$." The lead $\overline{\text{NOSTO}}$ indicates a store operation and lead NOSTO indicates no store. Sucesive jumps from timing period TP13 to timing period TP24 and to timing period TP25 and the repeat operations and the steps carried out are identical to those for the execution of the NMR command.

The description in this section of the action of the TPTS timing period possibilities does not refer to the BDT or NMR commands but refers to the "all other conditions" path discussed in the next paragraph.

Assume the instruction carried by the INST is not one of the control group commands, is not a TMX or BDT or NMR, and is not an STR or an LST command wherein accompanying the LST command the bits 8 and 9 of the operation register 109 are set to "one" and "zero" respectively. The command is then one wherein the conditions are indicated by the designation "all other conditions" on the lead line leading from OR gate 0300 into the timing period flip-flop TP11. In the case of these conditions the steps executed in timing period TP11 are those covered in the previous discussion of steps of execution during timing period TP11. As discussed, if the command is a test equal and store, test less than and store, or test greater than and store instruction, the steps and recycling occur which were discussed in conjunction with the NMR command. At the conclusion of operations in timing period TP11, a jump is made to timing period TP22. Timing period TP22 execution steps have been discussed hereinabove also. At the conclusion of the steps in timing period TP22, if the instruction is one in the Read group 01 or is an ADS or SBS, a jump is made to timing period TP3. In the case of the ADS or SBS command, a jump is made from timing period TP3 to timing period TP21. The designation TMX which appears on the lead from timing period flip-flop TP3 to timing period flip-flop TP21 refers to one minor variation of the various operations executed in the TMX command. The Q on the lead indicates a control flip-flop being set. The action of maintaining the timing period flip-flop TP21 for shifts has been discussed hereinabove, in conjunction with the discussion of the NMR command. The store commands which include "add and store" "subtract and store" require the store operation which will be affected following timing period TP21 at timing period TP13.

Refer to the conditions as designated on the second lead line from timing period flip-flop TP22. Where the operation is one of the three: test equal (TES), test less than (TLS), or test greater than store (TGS), and store operations and the test has not been successful $\overline{\text{TEST}}$, and no more repeats may be made $\overline{\text{RPTC}}$ the command is a load store and the operation register 109 bit 8 is a zero, then a jump is made from timing period TP22 to timing period TP25. At timing period TP25 it is determined if a repeat operation is to be performed. In the case of $\overline{\text{RPTC}}$ no repeat operation is performed. The appropriate address is then enabled to the memory address multiplex 115.

Referring again to the timing period TP22 block, in the case of the instructions shown on the top lead line between timing period flip-flops TP22 and TP3, if the operation is a division in the read group, after the jump from timing period TP22 to timing period TP3, a jump is made from timing period TP3 to timing period TP41.

Timing period TP41 subcommand controls are provided for the execution of the division command only. At timing period TP41 the shifting operations involved in division take place. Following the shifting operations a jump is made from timing period TP41 to timing period TP3. In timing period TP3 and timing period TP4, as in the case of the other commands, the execution of the division command is completed.

The remaining conditions of the "all other conditions" denoted on the lead from timing period flip-flop TP22 to TP24 occur in the case where there is no store operation NOSTO required for this command. Upon the jump being made to timing period TP24 the timing procedure of timing periods TP24 and TP25 discussed hereinabove are followed:

Assume the command INST is a STR or a LSP, the latter in the presence of a one bit in the eighth and not one in the ninth bit position of the operation register 109. In this case a jump is made to timing period TP13. The execution of steps in timing periods TP13, TP24 and TP25 is effected and conclusion of executing the command is made as described hereinabove.

In starting the illustrative embodiment computer a start interrupt is initated and executed. In effecting this start interrupt a sequence of time periods is effected by jumping to timing period TP25, thence jump is made to timing period TP3, thence to timing period TP4, thence back to timing period TP25 and thence recycling to timing period TP3 and then to timing period TP4. The steps in execution which are effected in the second repetition of timing periods TP3 and TP4 are the same steps which occur in timing periods TP3 and TP4 for the address manipulation steps discussed hereinabove. However, during the first occurrence of the execution in timing periods TP3 and TP4 an interrupt processing sequence of steps occurs. This timing sequence is described in the patent application of Hans Marx for "Input/Output Control System for Electronic Computers," S.N. 427,322, supra, and need not be discussed. It will be appreciated that starting the inventive processor in a manner conventional in the art is also contemplated optionally. Upon starting the interrupt is permitted to occur at timing period TP25. Then a jump is made to timing periods TP3 and TP4 at which the interrupt processing steps occur. A jump then is made back to timing period TP25 at which time the interrupt process is terminated. As stated, following this, during timing periods TP3 and TP4, the steps of execution are the same as those for address modification.

Upon a halt being effected either by pressing the stop button on the machine or by a halt command in the program, or by pressing the clear button, the current command being executed is permitted to continue being executed until execution is completed. At timing period TP4 the Halt flip-flop is set and no further jumps can be effected. After the Halt, upon pressing the start button by the operator, the starting sequence is carried out as discussed in the next previous paragraph.

Presented hereinbelow is a shorthand account of the execution which occurs during each of the timing periods to facilitate understanding in the light of the detailed description hereinabove of the timing counter and the control mechanism of the timing and control circuit 106:

*Command manipulation steps*

TP1—Read index value from memory (TP2)
TP2—Add index value to address (F–REG 116)
(1) Determine if second index operation is allowed and required (TP1)
(2) Determine if indirect addressing is required (TP10)
(3) If no further index or indirect address operations, proceed to command execution (INST)
Enable correct address to MAM based on decisions above.
If primary index, set RPTC and NOSTO if specified.
TP10—Read indirect address from memory; count F (used for special XL load) (TP20)
TP20—If special XL load
Place indirect address in XL
Enable F register to MAM–Go to TP10–
If STD indirect address
Replace F register 116 with INDIRECT ADDRESS
Determine if further indirect addressing is required (TP10); if not, proceed to command execution (INST)
Enable indirect address to MAM

*Command execution steps*

TP12—(TMX, BDT) Enable XL address to MAM
(NMR) Reset 6 LSB of F register 116
TP11—Read Data from Memory (exception TIM, READ DATA FROM I/O)
TPTS—(Used in TES, TLS, TGS Only)
Perform test and advance F count if required (TP22)
TP22—Data manipulations according to command being executed.
Enable address to MAM to specify location of next memory read or write. (This action is inhibited if interrupt is about to be executed.)
TP21—In "Read and Store" instructions, data manipulations take place which would occur at TP4 of the equivalent "Read" instruction. Enable address of next write to MAM. In NMR instruction, this TP is repeated while specified register is shifted. Action stops if normalized condition is met or maximum shift count (63) has been reached. (TP13)
TP13—Initiates Store Operation (TP24)
TP24—Holding point during store operation TP24 will be repeated as long as "STENV" signal is received from memory (TP25).
TP25—Determine is repeat operation is to be performed. Enable appropriate address to MAM 115.
TP3—Data manipulation according to command being executed. If repeat operations are completed, read new command from memory (inhibits during some interrupts).
TP41—(Div only) Data manipulation during a divide (TP3)
TP4—Complete data manipulation for previous instruction (DIV, TRB, MUL, ADD, SUB only).
For new instruction:
Determine if halt or interrupt is required (TP13, TP35, or HALT);
Determine if indexing is required (TP1);
Determine if indirect addressing is required (TP10);
If none of the above, proceed to command execution (INST);
Enable correct address to MAM 115 based on decisions above;
Step P count unless inhibited by interrupt.
A—Flip-flop which is reset at the end of TP4 and set by the end TP2. This $\bar{A}$ defines the primary index cycle, A defines the secondary index cycle. No action is taken, all other flip-flops are held in the "ZERO" state. External selection of register gated into the DOM 104 of MAM 115 is allowed (used for diagnostic purposes).
HALT—If "Wait" signal is removed and the signals Clear and BTE are absent, proceed to TP25.

Now refer to FIGS. 4A, 4B, 4C and 4D. FIG. 4A is a chart comprising boxes and represents the commands plotted against the timing periods during which execution of portions of the commands of the computer are carried out. FIG. 4B is a chart illustrating a typical indexing operation. FIG. 4C is a chart illustrating a typical indirect addressing operation. FIG. 4D is a chart illustrating the key to the different boxes in various operations. In some cases timing periods are repeated. For example, timing periods 11, 22, 25, 3 and 4 are repeated. The reason for these repetitions is that the computer of the present invention synchronizes and adjusts to any external clock arrangement, and it also adjusts itself to be utilized with various types of memory. For use with various speeds of memory operations or for different clock frequencies or durations for the external clock, the computer being synchronous, performs no functions until the ensuing clock pulse occurs. Therefore, for example, the two 11's are represented in FIG. 4 by way of illustration in operating from a one-megacycle clock. The computer would see timing period 11 as being 2 microseconds long rather than as 1 microsecond since, by way of example, this particular chart was made up for a memory which requires 4 microseconds for the memory cycle. Obviously, working with different memories these time-awaiting periods would be varied accordingly. As shown in the "Key" of FIG. 4D, the boxes in screen pattern denote Read operations. The boxes with horizontal hatching denote write operations. The vertically hatched boxes denote "operate." The blank boxes are for unused time periods in executing instructions. The cross-hatched boxes denote "pause."

As far as the Central Data Processor is concerned, it does not know that these pauses are there. However, the pauses relate the operation of the Central Data Processor through a consistently running one-megacycle clock. Therefore, for example, in the BUN command the timing period flip-flop TP22 is set at the first count of the one-megacycle external clock, the flip-flop TP3 is set at the end of one microsecond of the external clock, but the flip-flop TP4 is not set until the actual fourth clock pulse from the external clock. However, insofar as the computer is concerned, it recognizes this as the third clock beat. Jumps are made in accordance with the requirements for control functions exercised by the computer for each different command. Because of these jumps the necessary length of the pauses vary. This is because in the case of some commands the computer mechanism only requires a memory cycle once every several timing periods, for example, four timing periods, in which case a multimicrosecond such as a four microsecond memory cycle could be executed without pauses. Using the same memory with a command having only three timing periods between memory access cycles only one pause period would be required. Correspondingly, the number of pause periods varies both from command to command and in accordance with the length of time that a memory cycle takes to be completed. This chart is made up merely by way of example for a four microsecond memory cycle. For example, referring to timing period TP22, it is seen that it can be repeated two times for such a memory cycle although, for example, for the TIR instruction only one microsecond is required for execution in timing period TP22. Therefore no delay need be instituted, but during the next clock pulse after timing period TP22 is set, the entire execution of the command insofar as the TP22 timing period is concerned is completed within that one microsecond. The Read, which is represented by screen pattern boxes, is just an indication of time at which data is received from memory. Similarly, the blocks or boxes with horizontal hatching indicating the write operation show times at which data is sent to memory. The vertically hatched box representation of Operate periods represent times at which operations other than reading or writing are taking place.

The blank white blocks or boxes denote unused timing pulses, that is, timing pulses which do not occur in the particular command because of the jumps in timing which are instituted in the operation of the various commands. The white or unused block indicates that this command is not using the functions which are then created by setting the subcommand matrix 120 control gates accordingly. For this reason in performing the commands the jump is effected from the last marked box to the TP Set time in executing the commands. That is, in executing the command whenever a marked screen pattern, horizontal hatched or vertical hatched block is ended and an unused blank block starts there is an immediate setting of the next TP flip-flop corresponding to the next marked box indicating a subsequent operation. The cross hatched box pause representations may be required because it takes some time to ready the memory to send to the computer and memory may or may not be ready to send. The clock masking is done in special clock control logic to be described. When a particular timing pulse or a group of timing pulses are repeated in a given instruction, for example, for the iterative procedure in Multiply, this is denoted by the slanted blackened bottom corners of the appropriate boxes as illustrated adjacent "Repeat" in the key illustrated for interpreting the various types of boxes in FIG. 4D. Similarly, in the case of repeats where this refers to a group of timing pulses, this is indicated by a dark right triangle having a negative sloped hypotenuse in the left lower corner of the first of a series of boxes and a dark right triangle having a positive sloped hypotenuse in the lower right corner of the last of the series of boxes. This series of boxes forms the repeated timing pulses which are reiteratively effected by the command.

Due to the fact that indexing and indirect addressing are optional for any instruction and are under the control of the programmer, a typical index cycle is presented in FIG. 4B and a typical indirect address cycle is presented in FIG. 4C. Indexing and indirect addressing are optionally effected. The timing and control sequence of indexing and indirect addressing in TP1 and TP2 and in TP10 and TP20 times has been covered hereinabove. All indexing and indirect addressing is done after the last timing period TP4 of the preceding command and before the execution of the instruction at the first timing period of the command presently to be executed.

In the example given, that is, using a 1-megahertz clock and a DRO memory with a 4-microsecond cycle time, the previously mentioned STENV input which holds the computer in timing period TP25 is unused. This feature was devised to adapt the computer to a NDRO memory having a fast read cycle (under 2 microseconds with under 0.5 microsecond access time) and a slow write cycle (over 2 microseconds). The clock control scheme used in the illustrative embodiment and as shown in FIG. 4, and which is to be described in the description of FIG. 11, eliminates the necessity of having the feature provided by the STENV signal. FIG. 3 of the drawings described hereinabove illustrates the sequence of activation of the TP flip-flops for each of the commands of the illustrative embodiment machine.

From the central data processor equations given below the illustrative embodiment central data processor of the invention and its attendant logic and electric circuits are constructed readily by those skilled in this art. However, to insure convenience of duplication of the invention by others, the teaching herein is amplified by presenting a section on definitions to facilitate understanding by defining the various commands, subcommands, signals, flip-flops and other components, registers, logic operations required, etc. The central data processor equations then are given, from which may be constructed readily the algorithms, the logic and the corresponding electrical circuits and the structure of the illustrative embodiment machine. In order to illustrate the building of the structure of the machine conveniently, by way of example, the basic execution cycles of the 00 or control group, the 01 or read group, the 10 or write group, and the 11 or read-write group and the algorithm for the interrupts are illustrated in columnar presentation. Additionally, the algorithm of the BUN command of the control group is shown by way of example of how the equations are reduced to logic path circuits. Following this the unconventional new logic circuits associated with the command and subcommand algorithms are specifically illustrated in FIGS. 5, 6, 7, 8 and 9, and these figures are each described in detail. A description of the logic by which adaptation to memories of differing structure and adaptation to external clocks of differing frequencies is given also. Thus, the description insures "cook book" presentation to one skilled in the art.

CENTRAL DATA PROCESSOR DEFINITIONS

START INT.<br>
WAIT<br>
INITIATE<br>
IOIN<br>
INTCYC<br>
STORE INT.<br>
READ INT.<br>
START INT.<br>
} INTERRUPT CONTROLS

X=DIR6+DIR7→INDEX
A=Inhibits more than two (2) index cycles
DIRIO+(OP10 AT TP2) Indirect Add. Cycle
IR7(TP10+TP20) Special Indirect Add. Cycle
MTP3→Repeat TP3 or Repeat TP3, TP41
MTP21→Repeat TP21

RPTC→Repeat Block Data Cycle (11=OPØ.OP1)
STENV→Repeat TP24 (Gen. by Memory Store)
STEP→Count P, TP4 and No Interrupt
TEST→TEQ, TLT, TGT, TES, TLS, TGS (Test has been met)
T, Q, V, Q9, OPA, OPC Decoded Commands at TP4
T→MUL
V→DIV+TRB
Q→ADD, SOB, ADS, SBS, TMX

COMMANDS

| Commands | Group |
|---|---|
| BUN<br>BCN<br>TIR<br>TRO<br>TMC<br>CDT<br>TTR<br>RSR | *Control Group*; OPØ, OP1 |
| TDO<br>TDQ<br>TLT<br>TGT<br>SRB<br>RRB<br>ADD<br>SUB<br>MUL<br>LXL<br>LDR<br>TRB<br>DIV | *Read Group;* OPØ, OP1 |
| TES<br>TLS<br>TGS<br>SRS<br>RRS<br>ADS<br>SBS<br>LSR<br>TMX<br>BDT<br>NMR | *Read Write Group;* OPØ, OP1 |

LSP (OP8)
LSP (OP8.OP9)
LSP (OP8.OP9)

| Commands | Group |
|---|---|
| STR<br>TIM | *Write Group;* OPØ, OP1 |

TED=TIR+TRO
TDT=TLT+TGT
LOP=RRB+SRB
LFM=LXL+LDR
AOP=ADD+SUB
TDS=TLS+TGS
LOS=RRS+SRS
AOS=ADS+SBS
KL=LXL+LDR+DIV+TRB
ML=TMX+BDT+LSP+NMR
TR=TDO+SRB+TRB+SRS+NMR
AO=ADD+SUB=ADS+SBS
RR=RRB+RRS
LO=RRB+SRB+RRS+SRS
TS=TES+TLS+TGS
TT=TEQ+TLT+TGT
TRES=TES+TLS+TGS+TEQ+TLT+TGT+RRB +SRB+RRS+SRS
OPO=$\overline{\text{OP0}}.\overline{\text{OP1}}$
A: Flip Flop which is set at the completion of the primary index cycle
AØ→A23: Outputs of the flip flops of the A Arithmetic Register
ADD: ADD instruction
ADD A: Enables sum to A Arithmetic Register
ADD A/1 }
ADD A/2 } Conditions which generate ADD A subcommand
ADD C: Enables sum to C Arithmetic Register
ADS: ADD and STORE instruction
ALLOW INTERRUPT: Signal to I/O which enables I/O address to memory
AND A: Enables logical AND of sum and A Register to the A Arithmetic Register
AND C: Enables logical AND of sum and C Register to the C Arithmetic Register
AO: Instruction group of ADD or ADS or SBS
AOS: Instruction group of ADS or SBS
AOSCOMP: Condition for complementing the sign bit during an ADD or SUBTRACT operation
$(A+\overline{X})$: Condition signifying no further indexing cycles
(AØ≠DIRØ): Exclusive OR of the sign bit of the A Arithmetic Register and the Data Input Register
(ADS+SBS+LSR): Instruction group
(AOS+TMX): Instruction group of ADD or SUB or TMX
BCN: Conditional branch instruction
BDT: Block data transfer instruction
BTE: Basic Timing error flip flop
BUN: Unconditional branch instruction
(BUN+BCN): Instruction group
BCNITP22:
CØ→C23: Outputs of the flip flops of the C Arithmetic Register
CØa→C23a: Buffered outputs of the C Arithmetic Register
CAR 7 }
CAR 12 }
CAR 13 }
CAR 18 } Carry signals between stages of the adder
CARRYa }
CARRYb }
CARRYc } Enable carry
CDT: Command descriptor transfer instruction
CLEAR:
CLOCK:
CLOCK ST: Clock input to flip flops with no clock gating conditions
COMP: Flip flop which enables complement outputs of data output multiplex
COMP AØ: Condition of setting the sign bit of the A Arithmetic Register during a complementing operation
COMP CØ: Condition for setting the sign bit of the C Arithmetic Register during a complementing operation
COMPSET CØ: Condition for setting the sign bit of the C Arithmetic Register
COUNT F: Count signal to F Register enabled during Division, Multiplication, Shift, and Multi-word operations
CPE: Command parity error flip flop
(CØ≠DIRØ): Exclusive or of the sign bit of the C Arithmetic Register and the data input register
(CAR.OV): Condition necessary for subtraction in division algorithm
DESCRIPTOR: Level sent to I/O during CDT or LSP commands
DINØ→DIN24: Data input lines from I/O to the data input register
DIRØ→DIR23: Outputs of data input register flip flops
DIRADDa }
DIRADDb }
DIRADDc } Flip flop which enables DIR inputs to the Adders
DIV: Division instruction
DIVADD: Condition for transferring the sum to the A register during Division algorithm
DIVSETØ: Condition for setting the sign bits of the A and C Registers during Division DOM$\emptyset$→DOM24: Outputs of the data output multiplex and the parity generator
DPE: Data parity error flip flop
DVT: Flip flop used to initiate final operation of DIV or TRB algorithm
EAC: Carry output of the most significant bit of the adders
EACARRY: End around carry or add one input to least significant bit of the adders
EAS: End around shift option of RSR instruction
EJC: External jump control flip flop
ENA: Flip flop which enables A Arithmetic Register to the data output multiplex
ENC: Flip flop which enables C Arithmetic Register to the data output multiplex
ENDIR (LSH): Flip flop signal which enables the least significant 12 bits of the data input register to the data output multiplex
ENDIR (MSH): Flip flop signal which enables the most significant 12 bits of the data input register to the data output multiplex
ENF: Flip flop which enables the address field register to the data output multiplex
ENP: Flip flop which enables the P counter and the I/O P count bits to the data output multiplex
E01→E023: Exclusive OR outputs of the first stage of the adders
EQL: Signal which indicates that the F counter has reached its maximum count
F12→F23: Outputs of the address field register
FCAR 20: Carry condition between stages of the F counter contained in the address field register
F STROBE: Signal which STROBES data into the Address Field Register flip flops
GATE: Signal sent to the I/O which indicates that memory module selection logic is to be used to address the appropriate memory
HALT: Flip flop which halts the timing counter in its inactive state
ICI, IC2: Control lines from the I/O which designate the type of interrupt to be executed
ICE: The illegal command error flip flop
IEI: Inhibit error interrupt flip flop (DPE, OVE, and IPE error only)
IJC: Internal jump control flip flop
INITIATE: Signal from which requests an interrupt
INPUT STROBE: Signal to the I/O which enables I/O data to the Data Input Register of the CDP
INSERT P: Signal to the I/O indicating that the most significant bits of the P count are available from DOM lines 6 through 11
INST: Timing count which precedes actual execution of an instruction
INTCYC: Flip flop which indicates an interrupt timing cycle in process or about to be executed
INTERRUPT COMPLETE: Signal to the I/O which indicates that an interrupt cycle has been completed (and data is present at the DOM outputs if applicable)
I/O 6→I/O 11: Inputs from the I/O portion of the P counter to the data output multiplex
IOIN: Flip flop which indicates that the address substitution portion of an interrupt is being executed
IPE: I/O parity error flip flop
IPI: Inhibit program interrupt flip flop
(INST.BUN.OP9): Conditions BUN–OP9 at the timing count preceding execution of the BUN instruction
JTP 22–3: Condition for following timing period 22 with timing period 3 (generated at TP22)
JTP 22–11: Condition for following timing period 22 with timing period 11 (generated at TP22)
JTP 22–25: Condition for following timing period 22 with timing period 25 (generated at TP22)
KL: Instruction group of LXL or LDR or DIV or TRB
LDR: Load register from memory instruction
LO: Instruction group of RRB or SRB or RRS or SRS LOGS: Logical shift option of the RSR or NMR instructions
LOP: Instruction group of RRB or SRB
LOS: Instruction group of RRS or SRS
LSP: Load and/or store P counter instruction
LSR: Load and store register instruction
LXL: Load index location register instruction
(LDR.TP22):
(LOS+AOS): Instruction group of RRS or SRS or ADS or SBS
[(LOS+AOS).TP25.RPTC]: Above instruction group at the timing count which precedes a repeat during a multi-word instruction
(LSR.TP22):
(LXL.TP22):
MAM 1→MAM 12: Outputs of the memory address multiplex to the I/O
ML: Instruction group of TMX or BDT or LSP or NMR
NMS: Memory module selection bit to I/O (OP11)
MRS F: Signal from the I/O which selects the address field register input to the NAM during halt condition
MRS P: Signal from the I/O which selects the P counter input to the NAM during the halt condition
MRS SUM: Signal from the I/O which selects the 12 most significant bits of the sum input to the MAM during the halt condition
MRS LX: Signal from the I/O which selects the X Location Register input to the NAM during the halt condition
MTP3: Signal which maintains the timing counter in the TP3 state or the TP3–TP41 states (used during RSR, DIV, and MUL instructions)
MTP21: Signal which maintains the timing counter in the TP 21 state (used during the NMR instruction)
MUL: Multiply instruction
MDLL: Instruction group of MUL or DIV or LSP or LSR
(MUL+LSR): Instruction group
IDA: Signal from the I/O which indicates that there is input data available
NMR: Normalizing instruction
NTP3: Condition occurring at TP3 in an ADS, SBS, or TMX instruction which initiates a repeat cycle
NOSTO: Flip flop which denotes that no store operations are to be performed in an ADS, SBS, SRS, or RRS instruction. (Set during the primary index cycle.)
OP$\emptyset$→OP5: Outputs of the operation register flip flops
OP8→OP11:
OPA: Flip flop used to indicate operations are to be performed on the A register during the final timing period of certain instructions
OPC: (OPA=$\overline{OPC}$)
OPO: Instruction group containing all control instructions: BUN, BCN, TIR, TRO, TMC, CDT, TTR, and RSR
OUTPUT STROBE: Signal to the I/O which indicates that output data is available at the outputs of the data output multiplex
OV: Flip flop which contains overflow bit from arithmetic operations
OVE: Overflow error flip flop
P1→P12: Outputs of the P counter flip flops
P3a, P8a, P9a: Buffered outputs of the P counter
PAR$\emptyset$ PAR 23: Signals from the data output multiplex to the parity generator
PARITY: Signal which indicates that the word in the data input register has correct (odd) parity
PC$\emptyset$—PC24: Outputs from the data input register to the parity generator
PCAR1: Carry signals within the P Counter
PCAR2:
P COUNT: Signal to the I/O which indicates that the most significant bits of the P counter are to be advanced by a count of one
PRESET F: Signal which inserts a count of 41 in the 6 least significant bits (F counter) of the address field register during a divide or multiply instruction Q: Flip flop which is used to initiate the final operation of an addition or subtraction or define the repeated portions of an ADS, SBS, or TMX instruction Q9: Flip flop which indicates a "variation bit equal to one" condition during the final operation of an addition or subtraction R: Signal to I/O which is used with V to identify the I/O channel being addressed (OP8)

RCHK1: Signal which indicates that all the exclusive OR outputs of the adder are equal to one (used to test for equality, all zeros, or all ones)

RDM: Read memory signal to I/O

REAL TIME CLOCK ERROR: Signal from I/O indicating two consecutive real time clock pulses have occurred between reset descriptors RPTC: Flip flop which specifies multi-word operations (set during the primary index cycle of a read and store operation)

RR: Instruction group of RRB or RRS

RRB: Reset register bits instruction

RRS: Reset register bits and store result instruction

RSENA: Signal from the I/O which selects the A register inputs to the data output multiplex during a halt condition RSENC: Signal from the I/O which selects the C register inputs to the data output multiplex during a halt condition RSENDIR: Signal from the I/O which selects the data input register inputs to the data output multiplex during a halt condition RSENF: Signal from the I/O which selects the address field register inputs to the data output multiplex during a halt operation RSENP: Signal from the I/O which selects the P counter inputs to the data output multiplex during a halt condition RSL: Shift left option of RSR instruction RSR: Reset and/or shift register instruction RTE: Real time error flip flop RØ≠DIRØ: (Selected register sign bit is unequal to data input register sign bit)

RØ=DIRØ: Selected register sign bit is equal to data input register sign bit

REAC RESET (A+C): A condition which resets both the enable A and the enable C flip flops SCCO: Signal which generates "COMP" and sets the "COMP" flip flop during a subtraction (ADD, SUB, ADS, or SBS instruction)

SBS: Subtract and store instruction

SCCO: Sign control specifies complement

SCF: Sign control flip flop used during arithmetic operations

SCTR: Signal which generates "true" and sets the "true" flip flop during an addition (ADD, SUB, ADS, or SBS instruction)

SELECT ENA: Enable A register to DOM during halt

SELECT ENC: Enable C register to DOM during halt

SELECT ENDIR: Enable data input register to DOM during halt

SELECT ENF: Enable address field register to DOM during halt

SELECT ENP: Enable P counter to DOM during halt

SELECT F: Enable address field register to MAM during halt

SELECT P: Enable P counter to MAM during halt

SELECT SUM: Enable the 12 most significant bits of the sum to MAM during halt

SELECT XL: Enable the index location register to MAM during halt

SETØ: Condition for setting the sign bit of the A or C register

SET CPE: Condition which sets the command parity error flip flop (sent to I/O)

SET DPE: Condition which sets the data parity error flip flop (sent to I/O)

SET FMSB; SET FLSB: Signals which allow the address field register to accept input data SET ICE: Condition which sets the illegal command error flip flop (sent to I/O)

SET INTCYC: Condition which initiates an interrupt timing cycle

SET IPE: Condition which sets the input parity error flip flop (sent to I/O)

SET OVE: Condition which sets the overflow error flip flop (sent to I/O)

SET RTE: Condition which sets the real time error flip flop (sent to I/O)

SETRUE: A part of the conditions for setting the "true" flip flop which controls the DOM SET TP4: Conditions for the timing counter to advance to timing count 4

SET TP 22: Conditions for the timing counter to advance to timing count 22

SET TP 25: Conditions for the timing counter to advance to timing count 25

SHA 1: Conditions for setting bit one of the type A register during a shift operation SET EJC: Condition which sets the external jump control flip flop SHA 23: Conditions for setting bit 23 of the A register during a shift operation SHC 1: Conditions for setting bit 1 of the C register during a shift operation SHC 23: Conditions for setting bit 23 of the C register during a shift operation SHLA: Signal which allows a left shift of the A register SHLA/1: One of the components of SHLA SHLC: Signal which allows a left shift of the C register SHLC/1: SHLC/2: Components of SHLC SHMUL: Shift condition occurring in a multiply instruction SHRA: Signal which allows right shift of the A register SHRA/1: One of the components of SHRA SHRC: Signal which allows right shift of the C register SHRC/1: One of the components of SHRC SLP: One of the signals which denote left shift of the A or C register is to be performed SR: Instruction group of SRS+SRB at TP22

SRB: Set register bits instruction

SRP: One of the signals which denotes that a right shift of the A or C register is to be performed SRS: Set register bits and store instruction STENV: Signal from the memory which holds the T counter in TP24 during a write operation STEP: Signal which advances the P counter at TP4 (not present during interrupts)

STP24: Signal which causes the timing counter to advance to TP24 instead of TP13 (used to inhibit store cycle)

STORE: Signal to the I/O which initiates a memory write cycle

STR: Store register instruction

STROBE Aa; STROBE Ab: Signal which causes the A arithmetic register flip flops to accept input data STROBEØ: Signal which causes the sign bits of the A arithmetic register to a accept input data STROBE Ca; STROBE Cb: Signal which causes the C arithmetic register flip flop to accept input data STROBE DIRa; STROBE DIRb: Signal which causes the data input register to accept information from the DIN lines STROBE DIRX: Signal which causes the index flip flops (X6 and X7) to accept information from the inputs DIN6 and DIN7

STROBE P: Signal which causes the P counter to accept input data

SUB: Subtract instruction

SUM1→SUM23: Outputs of the adder

SET (A+C): One of the conditions which sets either the ENA or the ENC flip flop

T: Flip flop which is used to initiate the final operation of a multiply instruction when the round off option is specified T CLEAR: Clear line to the flip flops of the Timing counter (generated by a halt condition)

TDO: Transfer data to I/O instruction

TEST: Signal which indicates that the test conditions specified by a TEQ, TLT, TGT, TES, TLS, or TGS instruction have been met TEQ: Test the contents of the memory location and specified register for equality instruction TES: Test the contents of the memory location and specified register for equality and store the address of the memory location meeting the test instruction TGS: Test for the specified register greater than contents of the memory location and store the address of the memory location for which the test is met instruction TGT: Test for the specified register greater than the contents of the memory location instruction TIM: Transfer I/O data to memory instruction TIR: Transfer I/O data to specified register instruction TLS: Test for the specified register less than the contents of the memory location and store the address of the memory location meeting the test instruction TLT: Test for the specified register less than the contents of the memory location instruction TMC: Test and/or modify controls instruction TMX: Test and/or modify index register instruction TP1: Timing count (Read Index Register)

TP2: Timing count (Add index register to instruction address)

TP3: Timing count (Read next instruction)

TP4: Timing count (Precedes modification or execution of next instruction)

TP10: Timing count (Read indirect address)

TP11: Timing count (read data)

TP12: Timing count (Send new data address to memory)

TP13: Timing count (Start write operation)

TP20: Timing count (Substitute indirect address for instruction address)

TP21: Timing count (Perform arithmetic or shifting operations)

TP22: Timing count (Operate on data read at TP11)

TP24: Timing count (Delay to allow for memory write time as specified by STENV)

TP25: Timing count (Conclusion of write cycle)

TP41: Timing count (Used only for shift or register during a division instruction)

TPTS: Timing count (Used for test and store instruction)

TR: Instruction group of TDO or SRB or TRB or SRS or NMR

TRB: Test register bits with mask from memory instruction

TRDIRF: Signal which specifies a transfer of information from the data input register to the address field register TRDIRMAM: Signal which specifies transfer of an address from the data input register to the memory address multiplex TRES: Instruction group of TES or TLS or TGS or TEQ or TLT, or TGT or RRB or SRB or RRS or SRS TRFMAM (12–17): Signal which specifies a transfer of the most significant bits of an address from the address field register to the memory address multiplex TRFMAM (18–23): Signal which specifies the transfer of the least significant bits of an address from the address field register (F counter) to the memory address multiplex TRO: Transfer register to I/O instruction TRPM: Signal to the I/O which indicates that the address of an instruction is to be sent to the memory TRPMAM: Signal which specifies the transfer of an address from the P counter to the memory address multiplex TRSUM: One of the conditions making up the signal TRSUMMAM TRSUMF: Signal which specifies a transfer of data from the output of the address to the address field register TRSUMMAM: Signal which specifies a transfer of a modified address from the output of the ADDERS to the memory address multiplex TRSUMP: Signal which specifies a transfer of data from the output of the ADDERS to the P counter TRSUMXL: Signal which specifies a transfer of data from the output of the ADDERS to the index location register TRUE: Flip flop which enables the true outputs of the data output multiplex TRXILMAM (1–6): Signal which specifies a transfer of the most significant bits of an address from the index location register to the memory address multiplex (sent to I/O as TRXLM)

TRXLMAM (7–10): Signal which specifies a transfer of the six least significant bits of an address from the index location register to the memory address multiplex (least significant two bits are zero, see below)

TRXLMAM (11–12): Signal which specifies the transfer of the information in the index flip flops to the memory address multiplex as the two least significant bits of the index location register TS: Instruction group of TES or TLS or TGS TTR: Test or transfer register instruction T.C1.TP4: Signal which causes a one to be added to the A register during the round-off portion of a multiply instruction TMC–OP9.TP3: (Reset specified control flip flops)

TMC–OP8.$\overline{\text{OP9}}$.TP3: (Set specified control flip flops)

(TMX.$\overline{\text{OP9}}$+BDT): Instruction Group

TP2.X.$\overline{\text{X}}$: Signal which is present at the conclusion of a primary index cycle which specifies that a secondary index is to be executed TP3.$\overline{\text{MTP3}}$: Signal which is present at timing count 3 when this count is not to be repeated TP3.$\overline{\text{OP1}}$:

TP4.(READ INT+START INT): Signal which is present at TP4 of an interrupt cycle which specifies that the next timing count of the interrupt cycle will be TP25

TP4.(STORE INT): Signal which is present at TP4 of an interrupt cycle which specifies that the next timing count of the interrupt cycle will be TP13

$\overline{\text{TP4}}$.+$\overline{\text{IOIN}}$+$\overline{\text{ICI.IC2}}$: Signal which indicates that the flip flop INTCYC is not about to be set TP4.X: Signal present at timing count 4 which indicates that a primary index cycle is to be executed TP4.$\overline{\text{X}}$: Signal which is present at timing count 4 which indicates that no indexing cycles are to be executed TP4.I: Signal which is present at timing count 4 which indicates that the instruction is to be modified by an indirect address TP20.DIRØ: Signal which indicates that indirect address cycle loading of the index location register has not been specified

TP22.TTR.(F19+F16):

TR.TP12: NMR at timing count 12

TRB.OP9.TP22; TCFF: Flip flop designating that TP11 or TP22 have just been performed TS.TEST.TP22: Signal which indicates that the test conditions of a TES or TLS or TGS instruction have been met TS+TT: Instruction group of TES or TLS or TGS or TEQ or TLT or TGT V: Signal which is used with R to identify the I/O channel being addressed (OP9)

WAIT: Signal from the I/O which indicates that a halt is to be executed and/or maintained

WAIT.HALT:

X: Signal which indicates that an index cycle is to be executed

X6; X7: Index flip flops which specify the least significant bits of the address of the index register to be used in an indexing operation or a TMX operation XL1, XL10: Outputs of the index location register flip flop XL STROBE: Signal which causes the index location register flip flop to accept input data.

In the following equations the + between conditions, as SET Ø+LOGS, means "or." The dot (.) between equations, as LOGS.A1, means "and."

CENTRAL DATA PROCESSOR EQUATIONS

A:s=TP2
A:r=TP4
AØ:s=(SET Ø+LOGS·A1·SHLA+ COMP AØ)STROBE AØ
AØ:r=$\overline{\text{SET}}$·STROBE AØ
A1:s=(SHA1·SHRA+SHLA·A2+SUM1 ·ADDA)STROBE A
A1:r=SUM1·ANDA·STROBE A
A2:s=(SUM1·SHRA+A3·SHLA+SUM2 ·ADDA)STROBE A
A2:r=SUM2·ANDA·STROBE A
. . .   . . .
. . .   . . .
. . .   . . .
A22:s=(SUM21·SHRA+A23·SHLA+SUM22 ·ADDA)STROBE A
A22:r=SUM22·AND A·STROBE A
A23:s=(SUM22·SHRA+SHA23·SHLA+SUM23 ·ADDA)STROBE A
A23:r=SUM23·ANDA·STROBE A
ADDA=ADDA/1+ADDA/2
ADDA/1=$\overline{\text{OP8}}$($\overline{\text{OP5}}$·LOP·TP22+TRB·OP9 ·TP22+TP3·AO·$\overline{\text{OPØ}}$)+OP9(TTR·TP3 ·F14·F16+LDR·TP22)+RSRA+TIRA+DIV ADD
ADDA/2=$\overline{\text{OPC}}$·TP4(DVT+T·C1+Q·$\overline{\text{OV}}$·SCF)+ LAT+AOS(NTP3+TP21·$\overline{\text{OV}}$·SCF)+TP22·LOS ·TR+LSR·TP22
ADDC=OPC·TP4(T·C1+DVT+Q·$\overline{\text{OV}}$·SCF)+ TIRC+RSRC+OP8(TTR·TP3)·F14·F16+LDR ·TP22)+OP8(TP3·AO·$\overline{\text{OPØ}}$+TRB·OP9·TP22)+ TP22·LOP·$\overline{\text{OP5}}$)OP8
ADS+SBS+LSR=OPØ·OP2·$\overline{\text{OP3}}$
ALLOW INTERRUPT=IOIN(TP22·$\overline{\text{OPØ}}$+ TP25·$\overline{\text{RPTC}}$
ANDA=(OPØ+$\overline{\text{OP8}}$)TP22·RR
ANDC=TP22·RR·OPØ·OP8
AO=OP2·$\overline{\text{OP3}}$·$\overline{\text{OP4}}$
AOS=AO·OPØ
AOSCOMP=AOS·TP21·SCF·OV·$\overline{\text{OP9}}$
BCN·TP2=TP22·OP5(BUN+BCN)
BDT=OP5·$\overline{\text{OP4}}$·ML
BTE:s=(REAL TIME CLOCK ERROR+F17·TMC ·OP8·$\overline{\text{OP9}}$·TP3)RTE+($\overline{\text{TP1}}$·$\overline{\text{TP2}}$·$\overline{\text{TP10}}$·$\overline{\text{TP20}}$ ·$\overline{\text{TP11}}$·$\overline{\text{TP12}}$·$\overline{\text{TP21}}$·$\overline{\text{TP13}}$·$\overline{\text{TP24}}$·$\overline{\text{TP25}}$·TP3·$\overline{\text{TP41}}$ ·$\overline{\text{TP4}}$·$\overline{\text{TP22}}$·$\overline{\text{HALT}}$·$\overline{\text{TPTS}}$)+(TP1+TP2+TP10+ TP20+TP11+TP12+TP21+TP13+TP24+ TP25+TP3+TP41)(TP4+TP22+HALT+ TPTS)+TP4·TP22
BTE:r=CLEAR
BUN+BCN=$\overline{\text{OP1}}$·$\overline{\text{OP2}}$·$\overline{\text{OP3}}$
CØ:s=(SET Ø+LOGS·SHLC·C1+ COMPSET CØ)STROBE CØ
CØ:r=$\overline{\text{SET}}$·STROBE CØ
C1:s=(SHC1·SHRC+C2·SHLC+SUM1 ·ADDC)STROBE C
C1:r=SUM1·AND C·STROBE C
CIF:s=C1·CLOCK ST
CIF:r=$\overline{\text{SET}}$
C2:s=(C1·SHRC+C3·SHLC+SUM2 ·ADDC)STROBE C
C2:r=SUM2·AND C·STROBE C
C22:s=(C21·SHRC+C23·SHLC=SUM22 ·ADDC)STROBE C
C22:r=SUM22·AND C·STROBE C
C23:s=(C22·SHRC+SHC23·SHLC+SUM23 ·ADDC)STROBE C
C23:r=SUM23·AND C·STROBE C
CARRY a, b, c=TP22·LO+OP8(MDLL·$\overline{\text{OPØ}}$)(TP22+ TP3+TP41)
COMP:s=$\overline{\text{SET}}$ $\overline{\text{INTCYC}}$ [TP22·TTR(F19+F16)+ DIV·INST+((TS+TT)+TMX+TRB OP9)TP11+ (OP9·TRB+DIV)TP3·$\overline{\text{MTP3}}$+SCCO·$\overline{\text{RCOMP}}$]
COMP:r=(TRES+TMX·$\overline{\text{OP9}}$+BDT+T$\overline{\text{R}}$)TP22+ TP21+TP3·$\overline{\text{OP1}}$+TP4+TP11+SET INTCYC
COMP:=COMP+SCCO
COMP AØ=$\overline{\text{AØ}}$(TTR·F17·F18+Q·TP4·OV·SCF+ AOSCOMP+SR)·$\overline{\text{NZ}}$
COMP CØ=$\overline{\text{CØ}}$(TTR·F17·F18+Q·TP4·OV·SCF+ AOSCOMP+SR)
COMP SET CØ=COMP CØ+SUM23·SHRA·LOGS ·SHRC
COUNT F=TP10+$\overline{\text{EQL}}$·TP3·MTP3+TP21 ·MTP21+TP22·(MUL+RSR+$\overline{\text{TS}}$·RPTC+ TPTS·$\overline{\text{TEST}}$)
CPE:s=F20·TMC·OP8·$\overline{\text{OP9}}$·TP3+TP4 ·$\overline{\text{PARITY}}$(IOIN+IC1·IC2)
CPE:r=F20·TMC·OP9·TP3+CLEAR
DESCRIPTOR LEVEL=LSP+$\overline{\text{OP1}}$·OP2·$\overline{\text{OP3}}$·OP5
DIRØ:s=DINØ·STROBE DIR
DIRØ:r=$\overline{\text{DINØ}}$·STROBE DIR
DIR 23:s=DIN 23·STROBE DIR
DIR 23:r=$\overline{\text{DIN 23}}$·STROBE DIR
DIRADD:s=$\overline{\text{SET}}$ $\overline{\text{INTCYC}}$[(MUL·C23+LO·OP5+ OP9)+ADS+SBS+LSR+KL·OP5+TS+TT+ TMX+AO)TP11+(TP4·I)+TP4·X+$\overline{\text{OP5}}$·TP22 ·$\overline{\text{OP1}}$·$\overline{\text{OP4}}$·$\overline{\text{OPØ}}$+INST·BUN·OP9+TP22·MUL ·C22+C22·MUL·TP3·MTP3]
DIRADD:r=SET INTCYC+[KL·$\overline{\text{OP4}}$+TRES+ MUL+$\overline{\text{LSR}}$+ML·(OP8+OP9)·TP22+TP25+ INST+$\overline{\text{MTP3}}$·TP3]·MUL
DIV=OP4·OP5·KL
DIVADD=DIV·TP3·[A1·DIR1·R+OP8·OVE ($\overline{\text{OV}}$·$\overline{\text{EAC}}$)]
DIVSET Ø=DIV·$\overline{\text{OP8}}$·TP22
DOM Ø=PARØ·TRUE+$\overline{\text{PARØ}}$·COMP
DOM23=PAR 23·TRUE+$\overline{\text{PAR 23}}$·COMP
DPE:s=F19·TMC·OP8·$\overline{\text{OP9}}$·TP3+$\overline{\text{PARITY}}$(TP2+ TP20+($\overline{\text{TIM}}$+$\overline{\text{LSP}}$·$\overline{\text{OP8}}$)$\overline{\text{OP0}}$·TP22+IC1·TP4 ·(Read int.+start int.)
DPE:r=F19·TMC·OP9·TP3+CLEAR
DVT:s=TRB·OP9·TP22+DIVSET Ø (ASYNC FF)
DVT:r=TP11
EA CARRY=TTR·F20·TP3(F19=OVE)+T·C1 ·TP4+IJC·TP3·OP8·TMX+SCF·TP3·EAC
EAS=RSL·F12·F13
EJC:s=F15·TMC·OP8·$\overline{\text{OP9}}$·TP3+SET EJC
EJC:r=F15·TMC·OP9·TP3+(BCN·TP22)OP10+ CLEAR+INST(TIM+TIR)
ENA:s=$\overline{\text{SET}}$ $\overline{\text{INTCYC}}$ (STR·OP9+DIV)INST+ (MUL+LSR)TP22+SET(A+C)(LOS+AOS+ $\overline{\text{OP8}}$)TP11+(TTR·$\overline{\text{F12}}$+RSR+$\overline{\text{OP1}}$·$\overline{\text{OP4}}$ ·F12)TP22.$\overline{\text{OPØ}}$
ENA:r=REAC+SET INTCYC
ENA'=RSENA·HALT+ENA
ENC:s=$\overline{\text{SET}}$ $\overline{\text{INTCYC}}$[(LO+AOS)INST+INST ·STR·OP8+(LOS+AOS)TP25·RPTC+ SET(A+C)·OP8·($\overline{\text{LOS}}$+$\overline{\text{AOS}}$)TP11+$\overline{\text{OPØ}}$ ·TP22·(TTR·F12+F13·$\overline{\text{OP1}}$·$\overline{\text{OP4}}$)]
ENC:r=TP11+REAC+SET INTCYC

ENC'=RSENC·HALT+ENC

ENDIR:s=(ML·$\overline{OP4}$·OP5+TIM+OP2+$\overline{OP3}$ $\overline{\text{OPØ}}$·TR)·TP22+SET INTCYC+SET TP25·LSP+LO·$\overline{OP9}$·TP11·TR+LXL·OP9.TP11+TMX·$\overline{TP4}$·(TP11+ENF($\overline{STC}$+$\overline{INST}$))

ENDIR:r=(TP3+TP22+STC+TP25)

ENDIR'(LSH)=RSENDIR·HALT+($\overline{HALT}$·ENDIR·$\overline{TMX}$)

ENDIR'(MSH)=RSENDIR·HALT+($\overline{HALT}$·ENDIR)

ENF:s=$\overline{SET}$ $\overline{INTCYC}$·[TP4·X+INST(OP5+$\overline{OP9}$)·(BUN+BCN)+TS·TEST·TP22+TR·TP21+TMX·TP11+$\overline{OP1}$·OP2·OP3·OP5·TP22]

ENF:r=INST+STC+TP3·$\overline{OP1}$+SET INTCYC

ENF'=ENF+RSENF·HALT

ENP:s=$\overline{SET}$ $\overline{INTCYC}$ (INST (BUN+BCN)·OP9·$\overline{OP5}$+LSP·OP8·TP22+LSP·INST·OP8·$\overline{OP9}$)

ENP:r=TP22+STC+SET INTCYC

ENP'=ENP+RSENP·HALT

EQL=F19·F20·F18·F21·F22·F23

F12:s=(DIR12·TRDIRF+SUM12·TRSUMF) F STROBE

F12:r=$\overline{SET}$·F STROBE

. . .  . . .

. . .  . . .

. . .  . . .

F17:s=(DIR17·TRDIRF+SUM17·TRSUMF) F STROBE

F17:r=$\overline{SET}$·F STROBE

F18:s=(DIR18·TRDIRF+SUM18·TRSUMF+COUNT F+PRESET F)CLOCK(FCAR20·F19·F20+SET F(LSB))

F18:r=$\overline{SET}$·CLOCK(SET F(LSB)+FCAR20·F19·F20)

F19:s=(DIR19·TRDIRF+SUM19·TRSUMF+COUNT F)CLOCK(SET F(LSB)+F20·FCAR20)

F19:r=$\overline{SET}$·CLOCK(SET F(LSB)+F20·FCAR20)

F20:s=(DIR20·TRDIRF+SUM20·TRSUMF+COUNT F+PRESET F)·CLOCK·(SET F(LSB)+FCAR20)

F20:r=$\overline{SET}$·CLOCK(SET F(LSB)+FCAR20)

F21:s=(DIR20·TRDIRF+SUM21·TRSUMF+COUNT F)CLOCK(SET F(LSB)+COUNT F·F22·F23)

F21:r=$\overline{SET}$·CLOCK(SET F(LSB)+COUNT F·F22·F23)

F22:s=(DIR22·TRDIRF+SUM22·TRSUMF+COUNT F)CLOCK(SET F(LSP)+COUNT F·F23)

F22:r=$\overline{SET}$·CLOCK(SET F(LSP)+COUNT F·F23)

F23:s=(DIR23·TRDIRF+SUM23·TRSUMF+COUNT F+PRESET F)CLOCK(COUNT F+SET F(LSB)+DIVSETØ)

F23:r=$\overline{SET}$·CLOCK(SET F(LSB)+COUNT F+DIVSETØ)

FCAR20=F21·F22·F23·COUNT F

F STROBE=($\overline{SET}$ $\overline{F\cdot CLOCK}$)

GATE=TRSUM+TRFMAM12–17+TP4·$\overline{X}$+TP20·$\overline{\text{DIRØ}}$

HALT:s=IOIN·TP4·WAIT+CLEAR+BTE

HALT:r=$\overline{WAIT\cdot BTE}$

ICE:s=F16·TMC·OP8·$\overline{OP9}$·TP3+TP4($\overline{IOIN}$+$\overline{IC1}$·$\overline{IC2}$)(OPØ·$\overline{OP1}$.(OP2+OP4)+$\overline{OP2}$·$\overline{OP3}$($\overline{OP4}$+OPØ·$\overline{OP5}$)+OP1·OP2·$\overline{OP3}$·+OP4·OP5)

ICE:r=F16·TMC·OP9·TP3+CLEAR

IEI:s=F13·TMC·OP8·$\overline{OP9}$·TP3

IEI:r=F13·TMC·OP9·TP3+CLEAR

IJC:s=TP3·TRB[RCHIKI·$\overline{OP9}$(DIRØ+$\overline{\text{RØ=DIRØ}}$+OP9·$\overline{RCHKI}$+OP9·$\overline{\text{DIRØ}}$·(RØ≠DIRØ)+TP22·TMX·OP8(OP9·CAR12+$\overline{OP9}$·$\overline{CAR12}$·$\overline{RCHKI}$)+TP22·TEST(TS+TT)+TP3·TTR(F16·RCHKI+F15·AØ·CØ+F15·$\overline{\text{AØ}}$·CØ+TMC·TP3((F14·OP8·$\overline{OP9}$)+OP8(F16·ICE+F17·RTE+F18·OVE+F19·DPE+F20·CPE+F21·IPE)]

IJC:r=(TP22·BCN·$\overline{OP8}$·$\overline{OP9}$·$\overline{OP10}$)+OP8·F14(TMC·OP9·TP3)+INST(TS+TMX)+CLEAR INPUT STROBE=(TP22·TIR+TP11·TIM)·IDA+TP11·$\overline{OP8}$·$\overline{OP9}$·LSP INSERT P=TP25·[LSP·$\overline{INTCYC}$·($\overline{OP8}$+OP9)+IC1·IC2–INTCYC]

INST=(TP20·$\overline{\text{DIRØ}}$·$\overline{DIR10}$)+TP2·(A+$\overline{X}$)·($\overline{\text{OPØ}}$+$\overline{OP10}$)+TP4·($\overline{IOIN}$+$\overline{IC1}$·$\overline{IC2}$)·($\overline{OP10}$+OPØ)·(ALX+$\overline{DIR6}$·$\overline{DIR7}$)

INTCYC:s=(IC1+IC2·TP4·IOIN+HALT

INTCYC: r=TP4

INTERRUPT COMPLETE=INTCYC·TP25

IOIN:s=(SET TP22+SET TP25+TP11)·(WAIT+INITIATE)

IOIN:r=TP4+CLEAR

IPE:s=$\overline{PARITY}$·TP3·(TIR+TIM+LSP·$\overline{OP8}$·$\overline{OP9}$)+TMC·OP8·$\overline{OP9}$·TP3·F21+$\overline{PARITY}$·TP4·(STORE INT)

IPE:r=F21·TMC·OP9·TP3+CLEAR

IPI:s=F12·TMC·OP8·$\overline{OP9}$·TP3

IPI:r=F12·TMC·OP9·TP3+CLEAR

JTP22–3=TP22.($\overline{\text{OPØ}}$+AOS+TMX)

JTP22–11=TS·$\overline{TEST}$·RPTC·TP22

JTP22–25=(TS·$\overline{TEST}$·$\overline{RPTC}$+LSP·$\overline{OP8}$)·TP22

KL=$\overline{\text{OPØ}}$·OP1·OP2·OP3

LAT=$\overline{OP8}$·TP11·(LOS+AOS)

LO=OP4·OP3·$\overline{OP2}$·OP1

LOGS=F12·SRP+F12·SLP

LOP=$\overline{\text{OPØ}}$·OP4·OP3·$\overline{OP2}$·OP1

LOS=OPØ·OP4·OP3·$\overline{OP2}$·OP1

LSP=OP4·OP5·ML

LXL=KL·$\overline{OP5}$·$\overline{OP4}$

MAM1=SUM12·TRSUMMAM+F12·TRFMAM(12–17)+DIR12·TRDIRMAM+XL1·TRXLMAM(1–6)+P1·TRDMAM

. . .  . . .

. . .  . . .

. . .  . . .

MAM6=SUM17·TRSUMMAM+F17·TRFMAM(12–17)+DIR17·TRDIRMAM+XL6·TRXLMAM(1–6)+P6·TRPMAM

MAM7=SUM18·TRSUMMAM+F18·TRFMAM(18–23)+DIR18·TRDIRMAM+XL7·TRXLMAM(7–10)+P7·TRPMAM

. . .  . . .

. . .  . . .

. . .  . . .

MAM10=SUM21·TRSUMMAM+F21·TRFMAM(18–23)+DIR18·TRDIRMAM+XL10·TRXLMAM(7–10)+P10·TRPMAM

MAM11=SUM22·TRSUMMAM+F22·TRFMAM(18–23)+DIR22·TRDIRMAM+X6·TRXLMAM(11–12)+P11·TRPMAM

MAM12=SUM23·TRSUMMAM+F23·TRFMAM(18–23)+DIR21·TRDIRMAM+X7·TRXLMAM(11–12)+P12·TRPMAM

MDLL=OP1·OP2·OP4·OP5

ML=OPØ·OP2·OP3

MMS=OP11

MTP3=$\overline{EQL}$·$\overline{INTCYC}$·(RSR+MUL+DIV·$\overline{OVE}$)

MTP21=ML·TR·$\overline{EQL}$·[$\overline{\text{AØ}}$·F12·OP9+$\overline{A1}$·OP9·$\overline{F12}$+($\overline{\text{CØ}}$·F12+C1·$\overline{F12}$)OP8·$\overline{OP9}$]

MUL+LSR=$\overline{OP3}$·MDLL

MUL=OPØ·OP3·MDLL

NOSTO:s=DIR9·(LOS+AOS)·DIR8·TP2·$\overline{A}$ (ASYNC FF)

NOSTO:r=TP4

NTP3=TP3·(AOS+TMX)·Q

NZ:$\underline{s}$=TP3·RCHK1
NZ:$\underline{r}$=$\overline{TP3}$·$\overline{RCHK1}$
OPØ:$\underline{s}$=SET TP4·DINØ
OPØ:$\underline{r}$=$\overline{SET}$·SET TP4
. . . . . .
. . . . . .
. . . . . .
OP5:$\underline{s}$=SET TP4·DIN5
OP5:$\underline{r}$=$\overline{SET}$·SET TP4
OP8:$\underline{s}$=SET TP4·DIN8
OP8:$\underline{r}$=$\overline{SET}$·SET TP4
. . . . . .
. . . . . .
. . . . . .
OP11:$\underline{s}$=SET TP4·DIN11
OP11:$\underline{r}$=$\overline{SET}$·SET TP4
OPO=$\overline{OPØ}$·$\overline{OP1}$
OUTPUT STROBE=TP3·(TR·$\overline{OP3}$+$\overline{OPØ}$·$\overline{OP1}$·$\overline{OP4}$ ·OP5+$\overline{OP1}$·OP2·$\overline{OP3}$·OP5)
OV:$\underline{s}$=TP22·$\overline{OP8}$·DIV+AO·TP3·EAC+A1·TP41
OV:$\underline{r}$=TP41+TP21+TP4+CLEAR
OVE:$\underline{s}$=OV·$\overline{SCF}$·(TP4·Q+TP21·AO)+TP22 ·DIV·$\overline{OP8}$·EAC+TP3·F18·OP8·$\overline{OP9}$·TMC
OVE:$\underline{r}$=F18·TMC·OP9·TP3+CLEAR+DIV ·TP22+OVERT
OVERT=TTR·F20·TP3·OVE·$\overline{F19}$
P1:$\underline{s}$=SUM12·TRSUMP·CLOCK·(STROBE P+ P2·P3·PCAR1)+STEP·CLOCK·(STROBE P+ P2·P3·PCAR1)
P1:$\underline{r}$=STROBE P
. . . . . .
. . . . . .
. . . . . .
P8:$\underline{s}$=SUM19·TRSUMP·CLOCK·(STROBE P+P9 ·PCAR2)+STEP·CLOCK·(STROBE P+ P9·PCAR2)
P8:$\underline{r}$=STROBE P
P9:$\underline{s}$=SUM20·TRSUMP·CLOCK·(STROBE P+ STEP·P10·P11·P12)+STEP·CLOCK ·(STROBE P+P10·P11·P12)
P9:$\underline{r}$=STROBE P
. . . . . .
. . . . . .
. . . . . .
P12:$\underline{s}$=SUM23·TRSUMP·CLOCK ·(STROBE P+STEP)
P12:$\underline{r}$=STROBE P
PARØ=AØ·ENA+CØ·ENC+DIRØ·ENDIR (MSH)
. . . . . .
. . . . . .
. . . . . .
PAR5=A5·ENA+C5·ENC+DIR5·ENDIR (MSH)
PAR6=A6·ENA+C6·ENC+DIR6 ·ENDIR (MSH)+I/O6·ENP
. . . . . .
. . . . . .
. . . . . .
PAR11=A11·ENA+C11·ENC+DIR11 ·ENDIR (MSH)+I/O11·ENP
PAR12=A12·ENA+C12·ENC+DIR12 ·ENDOR (LSH)+P1·ENP+F12·ENF
. . . . . .
. . . . . .
. . . . . .
PAR23=A23·ENA+C23·ENC+DIR23 ·ENDIR (LSH)+P12·ENP+F23 ENF PCAR1=PCAR2·P7·P8·P9·P4·P5·P6
PCAR2=STEP·P10·P11·P12
P COUNT=P1·P2·P3·PCAR1
PRESET F=TP11·$\overline{OPØ}$·MDLL
Q:$\underline{s}$=INST·(AO+TMX)
Q:$\underline{r}$=INST+TP25·$\overline{RPTC}$+CLEAR
Q9:$\underline{s}$=TP22·OP9
Q9:$\underline{r}$=TP11
(RØ≠DIRØ)=(AØ≠DIRØ) ·$\overline{OP8}$+(CØ≠DIRØ)·OP8
RCHK1=TMX+(EO1·EO2 . . . EO10·EO11) ·(EO12·EO13 . . . EO22·EO23)
RDM=$\overline{HALT}$·[TP1+TP10+TP11 ·($\overline{\overline{OP8}·\overline{OP9}·\overline{LSP}}$)$\overline{TIM}$+SET TP4·($\overline{IC2}$·$\overline{IOIN}$)]
REAC=TP4+STC+TP22·(LOP X LXL+TS+TT)
RPTC:$\underline{s}$=DIR8·TP2·$\overline{A}$ ·(TS+LOS+BDT+ADS+SBS+LSR)
RPTC:$\underline{r}$=TP11·EQL+TP4+HALT
RR=OP5·OP4·OP3·$\overline{OP2}$·OP1
RSL=RSR·F14·TP3·MTP3
RSR=$\overline{OP1}$·OP2·OP3·OP5
RSR A:=RSR·OP10·TP22
RSR C=RSR·MMS·TP22
RTE:$\underline{s}$=REAL TIME CLOCK ERROR+F17·TMC ·OP8·$\overline{OP9}$·TP3
RTE:$\underline{r}$=F17×TMC·OP9·TP3+CLEAR
SCCO=($\overline{OP8}$+OPØ)·(AØ≠DIRØ)·(TSC·AO ·$\overline{OP9}$·$\overline{OP5}$)+OPØ·(CØ≠DIRØ)·OP8·(TSC·AO ·$\overline{OP9}$·$\overline{OP5}$)+(TSC·AO·OP5)·[OP9+$\overline{OPØ}$ ·(CØ=DIRØ·OP8]+(OP8+OPØ)·(AØ=DIRØ)
SCF:$\underline{s}$=SCCO
SCF:$\underline{r}$=TP21+TP4+CLEAR
SCTR=AO·$\overline{SCCO}$·TSC
SET Ø=TTR·$\overline{F17}$·($\overline{F12}$·AØ·$\overline{F18}$+F12·CØ)+DIRØ ·[(LDR·TP22)+(LSR·TP22)+(SR·$\overline{OP9}$)+ (TP3·TIR)]+MUL·(CØ≠DIRØ)+DIVSET Ø ·(AØ≠DIRØ)+CO·LAT
SET (A+C)=LXL·$\overline{OP9}$+TRB+AO+TRES
SET CPE=TP4·$\overline{PARITY}$·($\overline{IOIN}$+$\overline{IC1}$·$\overline{IC2}$)+F20 ·TMC·OP8·$\overline{OP9}$·TP3
SET DPE=$\overline{PARITY}$·[TP2+TP20+$\overline{OPØ}$·TP22 ·($\overline{TIR}$+$\overline{TIM}$+$\overline{LSP}$·$\overline{OP8}$·$\overline{OP9}$)+IC1·TP4 ·(READ INT+START INT)]+F19·TMC ·OP8·$\overline{OP9}$·TP3
SET EJC=$\overline{IDA}$·(TP22·TIR+TIM·TP11)
SET F (LSB)=PRESET F+TP12·TR+TP22 ·RSR+TRDIRF+TRSUMF
SET F (MSB)=TRDIRF+ML·$\overline{OP5}$·$\overline{TMX}$·TP21 ·$\overline{MTP21}$+TRSUMF
SET ICE=TP4·($\overline{IOIN}$+$\overline{IC1}$·$\overline{IC2}$)·[OPØ·$\overline{OP1}$ ·(OP2+OP4)+$\overline{OP2}$·OP3·($\overline{OP4}$+OPØ·$\overline{OP5}$)+ OP1·OP2·$\overline{OP3}$·OP4·$\overline{OP5}$+F16·TMC ·OP8·OP9·TP3]
SET INTCYC=HALT+INTCYC·$\overline{TP4}$+IOIN ·TP4·(IC1+IC2)
SET IPE=TP3·$\overline{PARITY}$·(TIR+TIM+LSP·$\overline{OP8}$ ·$\overline{OP9}$)+F21·(TMC·OP8·$\overline{OP9}$·TP3)+PARITY ·(TP4·STORE INT)
SET OVE=DIV·TP22·$\overline{OP8}$·$\overline{EAC}$+$\overline{SCF}$·OV·(TP21 ·AØ+TP4·Q)+F18·(TMC·OP8·OP9·TP3)
SET RTE=REAL TIME CLOCK ERROR+F17 ·(TMC·OP8·$\overline{OP9}$·TP3)
SETRUE=(See TRUE flip-flop "set" conditions)
SET TP4=TP3·$\overline{MTP3}$·$\overline{NTP3}$
SET TP22=OPØ·INST SET TP25=TP24·$\overline{STENV}$+HALT·$\overline{T}$ $\overline{CLEAR}$+JT22–25+TP4 (READ INT+START INT)

SHA1=EAC·MUL+LOGS·AØ

SHA23=DIV·$\overline{OP8}$·($\overline{OP9}$+$\overline{C1F}$)+(C1·$\overline{LOGS}$·SLP+CØ·LOGS)·SHLC+$\overline{SHLC/2}$·EAS·AØ

SHC1=CØ·LOGS+SUM23·SHRA·$\overline{LOGS}$

SHC23=CØ·$\overline{SHLA/1}$·EAS+DIVADD+AØ·SHLA·EAS

SHLA=TP41+SHLA/1

SHLA/1=OP9·SLP

SHLC/1=DIV·TP3·$\overline{OVE}$

SHLC/2=OP8·SLP

SHLC=SHLC/1+SHLC/2

SHMUL=(TP22+TP3)·MUL

SHRA=SHMUL+SHRA/1

SHRA/1=OP9·SRP

SHRC=SHMUL+SHRC/1

SHRC/1=OP8·SRP

SLP=RSL+TP21·MTP21

SR=TP22·TR·$\overline{OP2}$·OP3·DIRØ

$\overline{SR}$·$\overline{OP9}$=SR·($\overline{OP9}$·$\overline{DIRØ}$+$\overline{OP9}$·$\overline{DIRØ}$)

SRP=RSR·$\overline{F14}$·TP3·MTP3

STC=TP24·$\overline{STENV}$

STEP=$\overline{IOIN}$·TP4

STFF:s=HALT+IOIN·TP4
(ASYNC FF)

STFF:r=SET ICE+SET CPE

STORE=TP13·$\overline{HALT}$·STFF

STP24=(NOSTO+TIM·EJC)·[(TP4·STORE INT)+INST(OPØ·$\overline{OP1}$·$\overline{OP5}$+ML·OP4·OP5·OP8·OP9)+TP21·MTP21+TP22·JTP22–11·JTP22–3·JTP22–25]

STR=OPØ·$\overline{OP1}$·$\overline{OP5}$

STROBE A(*a,b*)=$\overline{INTCYC}$·(ANDA+ADDA/1+ADDA/2+SHMUL+SHRA/1+SHLA/1+TP41+DIVADD)

STROBE AØ=AOSCOMP+$\overline{OP8}$·[SR+LAT+(LSR·TP22)+RR·TP22·($\overline{OP9}$·DIRØ+OP9·$\overline{DIRØ}$)]+OP9·[LOGS+(LCR·TP22)+TTR·F13·TP3]+TIRA+MUL·$\overline{OP8}$·TP22+$\overline{OPC}$·($\overline{Q9}$+NZ)·Q·TP4·SCF·(OV+NZ)+RSRA+OPØ·OP1·[SR+LAT+(LSR·TP22)+RR·TP22·($\overline{OP9}$·DIRØ+OP9·$\overline{DIRØ}$)+LOGS+(LDR·TP22)+TTR·F13·TP3·$\overline{MTP21}$]

STROBE C(*a,b*)=INTCYC·(ADDC+ANDC+SHMUL+SHRC/1+SHLC/1+SHLC/2)

STROBE CØ=MUL·$\overline{OP8}$·TP22+R·$\overline{(OPØ+OP1+MTP21)}$·(LOGS+LDR·TP22+TTR·F13·TP3)+SR+RR·TP22·($\overline{OP9}$·DIRØ+OP9·$\overline{DIRØ}$)+DIV·$\overline{OP8}$·TP22+OPC·($\overline{Q9}$+NZ)·Q·TP4·(OV+NZ)·SCF+RSRC+TIRC

STROBE DIR=TP1+TP10+TP11+SET TP4+TP22·TIR

STROBE DIRX=TP1+SET TP4

STROBE P=CLEAR+TP25·(LSP·$\overline{INTCYC}$+$\overline{IC1}$·IC2·INTCYC)+$\overline{INTCYC}$·(BUN+BCN)·TP22·($\overline{OP5}$+OP10·EJC+OP8·OP9·AØ+OP8·OP9·CØ+OP8·$\overline{OP9}$·$\overline{IJC}$+$\overline{OP8}$·$\overline{OP9}$·$\overline{OP10}$·IJC)

T:s=TP22·MUL·OP8·OP9
(ASYNC FF)

T:r=TP11

T CLEAR=HALT·(WAIT+CLEAR+BTE)

TEST=$\overline{OP3}$·RCHKI+OP3·(RØ≠DIRØ)·($\overline{DIRØ}$·$\overline{OP5}$+DIRØ·OP5)+OP3·EAC·($\overline{DIRØ}$·OP5+DIRØ·OP5)·(RØ=DIRØ)+EAC·OP3·RCHKI($\overline{DIRØ}$·OP5+$\overline{DIRØ}$·OP5)·(RØ=DIRØ)

TIM=OPØ·$\overline{OP1}$·OP5

TIR=$\overline{OPØ}$·$\overline{OP1}$·$\overline{OP4}$·$\overline{OP5}$

TIR A=TIR·$\overline{EJC}$·TP3·F12

TIR C=TIR·$\overline{EJC}$·TP3·F13

TMC=OP2·$\overline{OP3}$·OP4·$\overline{OP5}$

TMX=ML·$\overline{OP4}$·$\overline{OP5}$

TMX·OP9+BDT=ML·$\overline{OP4}$($\overline{OP9}$+$\overline{OP5}$)

TP1:s=X·TP4($\overline{IOIN}$+$\overline{IC1}$·$\overline{IC2}$)+(TP2·X·$\overline{A}$)

TP1:r=$\overline{SET}$+T CLEAR

TP2:s=TP1

TP2:r=$\overline{SET}$+T CLEAR

TP3:s=JTP22–3+$\overline{RPTC}$·TP25+TP3·$\overline{DIV}$·MTP3+TP41

TP3:r=$\overline{SET}$+T CLEAR

TP4:s=$\overline{NTP3}$·$\overline{MTP3}$·TP3

TP4:r=$\overline{SET}$+T CLEAR

TP4·(READ INT+START INT)=(IC1+IC2)·($\overline{TP4}$·$\overline{STORE}$ $\overline{INT}$)·IOIN·TP4

TP4·(STORE INT)=TP4·IC1·IC2·IOIN

TP4·I=($\overline{X}$·$\overline{OPØ}$·STEP·OP10)

TP4·$\overline{X}$=TP4·($\overline{IOIN}$+$\overline{IC1}$·$\overline{IC2}$)·($\overline{ALX}$+$\overline{DIR6}$·$\overline{DIR7}$)

TP10:s=OP10·$\overline{OPØ}$·[(A+$\overline{X}$)·TP2+$\overline{X}$·TP4·($\overline{IOIN}$+$\overline{IC1}$·$\overline{IC2}$)]+TP20·(DIRØ+DIR10)

TP10:r=$\overline{SET}$+T CLEAR

TP11:s=(TP12·$\overline{TR}$)+JTP22–11+(TP25·RPTC)+($\overline{OPØ}$·INST·$\overline{SET}$ $\overline{TP13}$·$\overline{SET}$ $\overline{TP12}$)

TP11:r=$\overline{SET}$+T CLEAR

TP12:s=($\overline{OP4}$+$\overline{OP5}$)·INST·ML

TP12:r=$\overline{SET}$+T CLEAR

TP13:s=($\overline{NOSTO}$+$\overline{TIM}$·$\overline{EJC}$)·[(TP4·STORE INT)+INST·(OPØ·$\overline{OP1}$·$\overline{OP5}$+ML·OP4·OP5·OP8·$\overline{OP9}$)+TP21·$\overline{MTP21}$+TP22·$\overline{JTP22–11}$·$\overline{JTP22–3}$·$\overline{JTP22–25}$]

TP13:r=$\overline{SET}$+T CLEAR

TP20:s=TP10

TP20:r=$\overline{SET}$+T CLEAR

TP21:s=NTP3+(TR·TP12)+(MTP21·TP21)

TP21:r=$\overline{SET}$+T CLEAR

TP22:s=(OPO·INST)+TP11·$\overline{TS}$+TPTS

TP22:r=$\overline{SET}$+T CLEAR

TP24:s=(STENV·TP24)+TP13+STP24

TP24:r=$\overline{SET}$+T CLEAR

TP25:s=STC+HALT·$\overline{T}$ $\overline{CLEAR}$+JTP22–25+TP4·(READ INT+START INT)

TP25:r=$\overline{SET}$+T CLEAR

TP41:s=MTP3·DIV·TP3

TP41:r=$\overline{SET}$+T CLEAR

TPTS:s=TS·TP11

TPTS:r=$\overline{SET}$+T CLEAR

TR=OP4·OP1·$\overline{OP5}$

TRB=TR·$\overline{OPØ}$·OP2

TRDIRF=TP4+TP20·$\overline{DIRØ}$+OP8·TP22·TMX

TRES=OP1·$\overline{OP2}$·(OP5·OP4+OP3)

TRDIRMAM=TP4·$\overline{X}$+TP20·$\overline{DIRØ}$

TRFMAM(12–17)=MRSF·HALT+$\overline{INTCYC}$·[JTP22–11+BDT·TP22+TP20·DIRØ+TP25·RPTC·(LOS+ADS+SBS+LSR)]

TRFMAM(18–23)=MRSF·HALT+$\overline{INTCYC}$·[JTP22–11+BDT·TP22+TP20·DIRØ+TP25·RPTC·(LOS+ADS+SBS+LSR)]+TP22·(LOS+ADS+SBS+LSR)+BDT·RPTC·(TP12+TP25)

TRPM=TRPMAM+TRSUMP·$\overline{IOIN}$

TRPMAM=MRSP·HALT+IOIN (TP22.$\overline{OPØ}$+TP25·$\overline{RPTC}$)·$\overline{TRSUMP}$ TRSUM=MRSSUM·HALT+TP2·(A+$\overline{X}$)

TRSUMF=TP2+TMX·(NTP3+OP9·TP21)

TRSUMMAM=TRSUM+$\overline{IOIN}$·TRSUMP

TRSUMP=TP25·[LSP·$\overline{INTCYC}$·($\overline{OP8}$+OP9)+$\overline{IC1}$·IC2·INTCYC]+$\overline{INTCYC}$·(BUN+BCN)·TP22

·(OP5+OP10·EJC+AØ·$\overline{OP8}$·OP9+OP8·OP9·CØ+OP8·$\overline{OP9}$·$\overline{IJC}$+IJC·$\overline{OP8}$·$\overline{OP9}$·$\overline{OP10}$)

TRSUMXL=LXL·TP22+DIRØ·TP20

TRUE:*s*=SET INTCYC+[LOS+AOS+STR+LSP·OP8·OP9+(BUN+BCN)]·INST+(LOS+AOS)·TP25·RPTC+TP4·X+TP11·[LO·($\overline{OP5}$+$\overline{OP9}$)+DIV+LXL]+$\overline{OPØ}$·TP22·$\overline{OP1}$·(OP3·OP4·OP5+$\overline{OP4}$·Op5+OP5·OP2·OP3+$\overline{F16}$·$\overline{F19}$·TTR)+TP12·TR+TP21+SCTR·$\overline{R\ TRUE}$+TP22·(TIM+LSP+TS·TEST+MUL+L$\overline{S}$R+TMX·$\overline{OP9}$+BDT+TR+LOS)

TRUE:*r*=TP4+STC·$\overline{LSP}$+TP11+TP3·$\overline{MTP3}$·(DIV+TR)+TP25+$\overline{INST}$+TP22·(LXL+OPO)+TP10

TRUE=TRUE+SCTR

TRXLMAM(1–6)=$\overline{INTCYC}$ [TP22·(LOS+ADS+SBS+LSR)+BDT·RPTC·(TP12+TP25)]+TRXLMAM(7–10)

TRXLMAM(7–10)=BDT·TP12·$\overline{RPTC}$+TS·TEST·TP22+TRXLMAM(11–12)

TRXLMAM(11–12)=MRSXL·HALT+TP4·X+TP2

·X·$\overline{A}$+TMX·TP12+LSP·TP22+ML·$\overline{OP5}$·TP21·$\overline{MTP21}$

TS=(TS+TT)·(OPØ)

TS+TT=TRES·LO

TSC:*s*=TP11+TP22

TSC:*r*=$\overline{SET}$

TTR=$\overline{OP5}$·OP4·$\overline{OP1}$·OP3

V=OP9

WIF:*s*=WAIT·(SET TP22+TP11+SET TP25)

WIF:*r*=HALT

X=(DIR6+DIR7)·$\overline{ALX}$

X6:*s*=DIN6·STROBE DIRX

X6:*r*=$\overline{DIN6}$·STROBE DIRX

X7:*s*=DIN7·STROBE DIRX

X7:*r*=$\overline{DIN7}$·STROBE DIRX

XL1:*s*=SUM12·XL STROBE

XL1:*r*=$\overline{SET}$·XL STROBE

. . . . . .

. . . . . .

. . . . . .

XL10:*s*=SUM21·XL STROBE

XL10:*r*=$\overline{SET}$·XL STROBE

CENTRAL DATA PROCESSOR ILLUSTRATIVE ALGORITHMS

*Control Group (02 to 17)*

NOTE—In the following algorithms *X*=(*DIR*6+*DIR*7)

| Timing Period | Subcommand | Remarks |
|---|---|---|
| TP4 | TRDIRF, R A | Transfer the address portion of the instruction word (in the DIR) to the F register. Reset the secondary index cycle flip-flop (A). |
| | $(\overline{IOIN}+\overline{IC1}.\overline{IC2}).\overline{X}$→INST, S TP22, TRDIRMAN, GATE. | If no interrupt action or indexing is required, send the address portion of the instruction to memory and proceed to the command execution sequence (TP22). |
| | $(\overline{IOIN}+\overline{IC1}.\overline{IC2}).\overline{X}$→S TP1, TRXLMAM(1-12) | If indexing is specified, send the address from the index location register to memory. Go to TP1. |
| | $\overline{IOIN}$→STEP | If no interrupts have been received, advance the P counter by one. |
| | $\overline{IOIN}+\overline{IC1}.\overline{IC2}$).PARITY→SET CPE | If no interrupt action is in process and there is a parity error in the instruction word (presently in the DIR), a command parity error is declared. |
| TP1 | STROBE DIR, STROBE DIRX, S TP2 | Strobe the index word into the DIR, including secondary index bits. Go to TP2. |
| | RDM | Read the index word from memory. |
| TP2 | TRSUMF, ENF, DIRADD, TRUE | Add the index word (from the DIR) to the F register and transfer the result to the F register. |
| | S A | Set the secondary index cycle flip-flop (A). |
| | $(A+\overline{X})$→INST, S TP22, GATE, TRSUMMAM | If the secondary index cycle flip-flop (A) is set, or if there is no secondary index specified, send the modified address from the adder to memory and proceed to the command execution sequence (TP22). |
| | $(\overline{A}.X)$→S TP1, TRXLMAM(1-12) | If a secondary index is specified and the secondary index cycle flip-flop (A) is not set, send the address from the index location register to memory, go to TP1. |
| | $\overline{PARITY}$→SET CPE | If a parity error occurs in the index word (presently in the DIR) a command parity error is declared. |
| TP22 | S TP3 | Go to TP3. |
| | $\overline{TRSUMP}.\overline{IOIN}$→TRPMAM, TRPM | If there are no interrupts in process and if the P counter is not being preset, send the address from the P counter to memory. |
| TP3 | $\overline{MTP3}$→STROBE DIR, STROBE DIRX, STROBE OP, S TP4. | If TP3 is not to be repeated, strobe instruction word into DIR (including secondary index bits) and OP register, go to TP4. |
| | MTP3→S TP3 | If TP3 is to be repeated, go to TP3. |
| | $\overline{MTP3}.(\overline{IOIN}.\overline{IC2})$→RDM | If TP3 is not to be repeated, and no interrupt action is required, read the instruction word from the memory. |

*Read Group (22 to 37)*

NOTES.—1. In the following algorithms $X=(DIR6+DIR7)$. 2. An asterisk (*) in the Remarks column indicates that the referenced flip-flops are reset to clear out information temporarily stored during the previous instruction.

| Timing Period | Subcommand | Remarks |
|---|---|---|
| TP4 | TRDIRF, $\underline{\text{R}}$ A | Transfer the address portion of the instruction word (in the DIR) to the F register. Reset the secondary index cycle flip-flop (A). |
| | $\underline{\text{R}}$ OV | The OV flip-flop is reset.* |
| | $\overline{\text{X}}.(\overline{\text{IOIN}}+\overline{\text{IC1}}.\overline{\text{IC2}}).\overline{\text{OP10}}\rightarrow\underline{\text{S}}$ TP11, INST, $\underline{\text{R}}$ Q | If no interrupt action or indexing is required, and bit 10 of the instruction word is a "zero," proceed to the command execution sequence (TP11). The Q flip-flop is reset.* |
| | $\overline{\text{X}}.(\overline{\text{IOIN}}+\overline{\text{IC1}}.\overline{\text{IC2}}).\text{OP10}\rightarrow\underline{\text{S}}$ TP10 | If no interrupt action or indexing is required, and bit 10 is a "one," go to TP10 (indirect address cycle). |
| | $(\overline{\text{IOIN}}+\overline{\text{IC1}}.\overline{\text{IC2}}).\text{X}\rightarrow$TRDIRMAM.GATE | If no interrupt action or indexing is required, send the address portion of the instruction to memory. |
| | $(\overline{\text{IOIN}}+\overline{\text{IC1}}.\overline{\text{IC2}}).\text{X}\rightarrow\underline{\text{S}}$ TP1, TRXLMAM(1–12) | If indexing is specified, send the address from the index location register to memory. Go to TP1. |
| | $\overline{\text{IOIN}}\rightarrow$STEP | If no interrupts have been received, advance the P counter by one. |
| | $(\overline{\text{IOIN}}+\overline{\text{IC1}}.\overline{\text{IC2}})-\overline{\text{PARITY}}\rightarrow$SET CPE | If no interrupt action is in process and there is a parity error in the instruction word (presently in the DIR), a command parity error is declared. |
| TP1 | STROBE DIR, STROBE DIRX, $\underline{\text{S}}$ TP2 | Strobe the index word into the DIR, including secondary index bits. Go to TP2. |
| | RDM | Read the index word from memory. |
| TP2 | TRSUMF, ENF, DIRADD, TRUE | Add the index word (in the DIR) to the F register and transfer the result to the F register. |
| | $\underline{\text{S}}$ A | Set the secondary index cycle flip-flop (A). |
| | $(\text{A}+\overline{\text{X}})\rightarrow$GATE, TRSUMMAM | If the secondary index cycle flip-flop is set, or if there is no secondary index specified, send the modified address from the adder to memory. |
| | $(\overline{\text{A}}.\text{X})\rightarrow\underline{\text{S}}$ TP1, TRXLMAM(1–12) | If a secondary index is specified and the secondary index cycle flip-flop is not set, send the address from the index location register to memory, go to TP1. |
| | $(\text{A}+\overline{\text{X}}).\text{OP10}\rightarrow\underline{\text{S}}$ TP10 | If the secondary index cycle flip-flop is set, or if there is no secondary index specified, and bit 10 of the instruction word is a "one," go to TP10 (indirect address cycle). |
| | $(\text{A}+\overline{\text{X}}).\overline{\text{OP10}}\rightarrow\underline{\text{S}}$ TP11, INST, $\underline{\text{R}}$ Q | If the secondary index cycle flip-flop is set or if there is no secondary index specified, and bit 10 is a "zero," proceed to the command execution sequence (TP11). The Q flip-flop is reset.* |
| | $\overline{\text{PARITY}}\rightarrow$SET CPE | If a parity error occurs in the index word (presently in the DIR), a command parity error is declared. |
| TP10 | RDM, STROBE DIR | Read the indirect address word from memory, and strobe it into the DIR. |
| | COUNT F | Count the least significant six bits of the F register by 1. (The resulting F+1 address will be used if a special XL load cycle is specified.) |
| | $\underline{\text{S}}$ TP20 | Go to TP20. |
| TP20 | DIRADD | Enable the DIR into the adder for possible transfer to the XL register. |
| | $\overline{\text{DIR}\emptyset}\rightarrow$TRDIRMAM, GATE, TRDIRF | If the Ø bit of the indirect address word (DIRØ) is a "zero" (no special XL load), transfer the address portion of the indirect address word to the F register, and send it to memory. |
| | $\text{DIR}\emptyset\rightarrow$TRSUMXL, TRFMAM, GATE | If the Ø bit of the indirect address is a "one" (special XL load), transfer the address portion of the indirect address word to the XL register via the adder. Send the address from the F register to memory. |
| | $(\text{DIR}\emptyset+\text{DIR10})\rightarrow\underline{\text{S}}$ TP10 $(\overline{\text{DIR}\emptyset}.\overline{\text{DIR10}})\rightarrow\underline{\text{S}}$ TP11, INST, $\underline{\text{R}}$ Q. | If further indirect addressing is specified (by bit 10 of the indirect address word), or if a special XL load is being executed (specified by bit Ø), go to TP10, otherwise proceed to the command execution sequence (TP11). In the latter case, reset the Q flip-flop.* |
| | $\overline{\text{PARITY}}\rightarrow$SET CPE | If the indirect address word (in the DIR) has incorrect parity, a command parity error is declared. |
| TP11 | RDM, STROBE DIR | Read the data word from memory and strobe it into the DIR. |
| | $\underline{\text{R}}$ OPC, $\underline{\text{R}}$ T, $\underline{\text{R}}$ Q9, $\underline{\text{R}}$ DVT | Reset flip-flops OPC, DVT, T, and Q9.* |
| | $\underline{\text{S}}$ TP22 | Go to TP22. |

*Read Group (22 to 37)*—Continued

| Timing Period | Subcommand | Remarks |
|---|---|---|
| TP22 | OP8→$\underline{S}$ OPC, OP9→$\underline{S}$ Q9 | Record the state of instruction bits 8 and 9 for possible use at TP4. |
| | $\overline{PARITY}$→SET DPE | If the data word (in the DIR) has incorrect parity, a data parity error is declared. |
| | $\overline{IOIN}$→TRPMAM, TRPM | If there are no interrupts in process, send the P count to memory. |
| TP3 | $\overline{MTP3}$.($\overline{IOIN}$.$\overline{IC2}$)→RDM | If TP3 is not to be repeated, and no interrupt action is required, read the instruction word from memory. |
| | $\overline{MTP3}$→STROBE DIR, STROBE DIRX, STROBE OP, $\underline{S}$ TP4. | If TP3 is not to be repeated, strobe the instruction word into the DIR (including secondary index bits) and the OP register. Go to TP4. |

*Write Group (44 and 45)*

NOTE.—In the following algorithms, $X=(DIR6+DIR7)$

| Timing Period | Subcommand | Remarks |
|---|---|---|
| TP4 | TRDIRF, $\underline{R}$ A | Transfer the address portion of the instruction word (in the DIR) to the F register. Reset the secondary index cycle flip-flop (A). |
| | $\overline{X}$.($\overline{IOIN}$+$\overline{IC1}$.$\overline{IC2}$).$\overline{OP10}$ → INST, $\underline{R}$ Q | If no interrupt action or indexing is required, and bit 10 of the instruction word is a "zero," proceed to the command execution sequence. The Q flip-flop is reset. |
| | $\overline{X}$.($\overline{IOIN}$+$\overline{IC1}$.$\overline{IC2}$).OP10 → $\underline{S}$ TP10 | If no interrupt action or indexing is required, and bit 10 is a "one," go to TP10 (indirect address cycle). |
| | ($\overline{IOIN}$+$\overline{IC1}$.$\overline{IC2}$).$\overline{X}$ → TRDIRMAM.GATE | If no interrupt action or indexing is required, send the address portion of the instruction to memory. |
| | ($\overline{IOIN}$+$\overline{IC1}$.$\overline{IC2}$).X → $\underline{S}$ TP1, TRXLMAM(1-12) | If indexing is specified, send the address from the index location register to memory. Go to TP1. |
| | $\overline{IOIN}$ → STEP | If no interrupts have been received, advance the P counter by one. |
| | ($\overline{IOIN}$+$\overline{IC1}$.$\overline{IC2}$).$\overline{PARITY}$ → SET CPE | If no interrupt action is in process and there is a parity error in the instruction word (presently in the DIR), a command parity error is declared. |
| TP1 | STROBE DIR, STROBE DIRX, $\underline{S}$ TP2 | Strobe the index word into the DIR, including secondary index bits. Go to TP2. |
| | RDM | Read the index word from memory. |
| TP2 | TRSUMF, ENF, DIRADD, TRUE | Add the index word (in the DIR) to the F register and transfer the result to the F register. |
| | $\underline{S}$ A | Set the secondary index cycle flip-flop (A). |
| | (A+$\overline{X}$) → GATE, TRSUMMAM | If the secondary index cycle flip-flop is set, or if there is no secondary index specified, send the modified address from the adder to memory. |
| | ($\overline{A}$.X) → $\underline{S}$ TP1, TRXLMAM(1-12) | If a secondary index is specified and the secondary index cycle flip-flop (A) is not set, send the address from the index location register to memory, go to TP1. |
| | (A+$\overline{X}$).OP10 → $\underline{S}$ TP10 | If the secondary index cycle flip-flop is set, or if there is no secondary index specified, and bit 10 of the instruction word is a "one," go to TP10 (indirect address cycle). |
| | (A+$\overline{X}$).$\overline{OP10}$ → INST, $\underline{R}$ Q | If the secondary index cycle flip-flop is set or if there is no secondary index specified, and bit 10 is a "zero," proceed to the command execution sequence. The Q flip-flop is reset. |
| | $\overline{PARITY}$ → SET CPE | If a parity error occurs in the index word (presently in the DIR), a command parity error is declared. |
| TP10 | RDM, STROBE DIR | Read the indirect address word from memory, and strobe it into the DIR. |
| | COUNT F | Count the least significant six bits of the F register by 1 (the resulting F+1 address will be used if a special XL load cycle is specified). |
| | $\underline{S}$ TP20 | Go to TP20. |

*Write Group (44 and 45)*—Continued

| Timing Period | Subcommand | Remarks |
|---|---|---|
| TP20 | DIRADD | Enable the DIR into the adder for possible transfer to the XL register. |
| | $\overline{DIRØ}$ → TRDIRMAM, GATE TRDIRF | If the Ø bit of the indirect address word (DIRØ) is a "zero" (no special XL load), transfer the address portion of the indirect address word to the F register, and send it to memory. |
| | DIRØ → TRSUMXL, TRFMAM, GATE | If the Ø bit of the indirect address is a "one" (special XL load), transfer the address portion of the indirect address word to the XL register via the adder. Send the address from the F register to memory. |
| | (DIRØ+DIR10) → S TP10 ($\overline{DIRØ}$.$\overline{DIR10}$) → INST, R Q. | If further indirect addressing is specified (by bit 10 of the indirect address word), or if a special XL load is being executed (specified by bit Ø), go to TP10; otherwise proceed to the command execution sequence. In the latter case, reset the Q flip-flop. |
| | $\overline{PARITY}$ → SET CPE | If the indirect address word (in the DIR) has incorrect parity, a command parity error is declared. |
| TP11 | S TP22 | Go to TP22. |
| | STROBE DIR | Strobe input data into the DIR. |
| TP22 | | No action. |
| TP13 | STORE, S TP24 | Signal is sent to memory to initiate the write cycle. Go to TP24. |
| TP24 | STENV → S TP24 $\overline{STENV}$ → S TP25 | During the memory write cycle, the computer is held at TP24. At the completion of the write cycle, go to TP25. |
| TP25 | $\overline{IOIN}$ → TRPMAM, TRPM | If there are no interrupts in process, send the P count to memory. |
| | S TP3 | Go to TP3. |
| TP3 | ($\overline{IOIN}$.$\overline{IC2}$) → RDM | If no interrupt action is required, read the instruction word from memory. |
| | STROBE DIR, STROBE DIRX, STROBE OP, S TP4 | Strobe the instruction word into the DIR (including secondary index bits) and the OP register. Go to TP4. |

*Read-Write Group (63 to 77)*

NOTES.—1. In the following algorithms $X=(DIR6+DIR7).(TMX+NMR+LSP)$. 2. An asterisk(*) in the Remarks column indicates that the referenced flip-flops are reset to clear out information temporarily stored during the previous instruction.

| Timing Period | Subcommand | Remarks |
|---|---|---|
| TP4 | TRDIRF, R A | Transfer the address portion of the instruction word (in the DIR) to the F register, reset the secondary index cycle flip-flop (A). |
| | R OV, R RPTC, R NOSTO | The OV, RPTC, and NOSTO flip-flops are reset.* |
| | $\overline{X}$.($\overline{IOIN}$+$\overline{IC1}$.$\overline{IC2}$).OP10→INST, R Q | If no interrupt action or indexing is required, and bit 10 of the instruction word is a "zero," proceed to the command execution sequence. The Q flip-flop is reset.* |
| | $\overline{X}$.($\overline{IOIN}$+$\overline{IC1}$.$\overline{IC2}$).OP10→S TP10 | If no interrupt action or indexing is required, and bit 10 is a "one," go to TP10 (indirect address cycle). |
| | ($\overline{IOIN}$+$\overline{IC1}$.$\overline{IC2}$).$\overline{X}$→TRDIRMAM.GATE | If no interrupt action or indexing is required, send the address portion of the instruction to memory. |
| | ($\overline{IOIN}$+$\overline{IC1}$.$\overline{IC2}$).X→S TP1, TXRLMAM(1-12) | If indexing is specified, send the address from the index location register to memory. Go to TP1. |
| | $\overline{IOIN}$→STEP | If no interrupts have been received, advance the P counter by one. |
| | ($\overline{IOIN}$+$\overline{IC1}$.$\overline{IC2}$).$\overline{PARITY}$→SET CPE | If no interrupt action is in process and there is a parity error in the instruction word (presently in the DIR), a command parity error is declared. |
| TP1 | STROBE DIR, STROBE DIRX, S TP2 | Strobe the index word into the DIR, including secondary index bits. Go to TP2. |
| | RDM | Read the index word from memory. |

*Read-Write Group (63 to 77)*—Continued

| Timing Period | Subcommand | Remarks |
|---|---|---|
| TP2 | TRSUMF, ENF, DIRADD, TRUE | Add the index word (in the DIR) to the F register and transfer the result to the F register. |
| | S A | Set the secondary index cycle flip-flop (A). |
| | $(A+\overline{X})$→GATE, TRSUMMAM | If the secondary index cycle flip-flop is set or if there is no secondary index specified, send the modified address from the adder to memory. |
| | $(\overline{A}.X)$→S TP1, TRXLMAM(1-12) | If a secondary index is specified and the secondary index cycle flip-flop (A) is not set, send the address from the index location register to memory, go to TP1. |
| | $(A+\overline{X})$.OP10→S TP10 | If the secondary index cycle flipflop is set or if there is no secondary index specified, and bit 10 of the instruction word is a "one," go to TP10 (indirect address cycle). |
| | $(A+\overline{X}).\overline{OP10}$→S INST, R Q | If the secondary index cycle flip-flop is set or if there is no secondary index specified, and bit 10 is a "zero," proceed to the command execution sequence. The Q flip-flop is reset.* |
| | $\overline{PARITY}$→SET CPE | If a parity error occurs in the index word (presently in the DIR), a command parity error is declared. |
| | ®.$\overline{X}$.DIR8→S RPTC | If the command has an iterative option (denoted by ®), bit 8 of the primary index word will specify this option by setting the repeat cycle flip-flop. |
| | Ⓝ.$\overline{X}$.DIR8.DIR9→S NOSTO | If the command has a no-store option (denoted by Ⓝ) bit 9 of the primary index word will specify this option by setting the no-store flip-flop. Note that this option may only be selected if the iterative option is also specified (DIR8). |
| TP10 | RDM, STROBE DIR | Read the indirect address word from memory and strobe it into the DIR. |
| | COUNT F | Count the least significant six bits of the F register up by 1. (The resulting F+1 address will be used if a special XL load cycle is specified.) |
| | S TP20 | Go to TP20. |
| TP20 | DIRADD | Enable the DIR into the adder for possible transfer to the XL register. |
| | $\overline{DIRØ}$→TRDIRMAM, GATE, TRDIRF | If the Ø bit of the indirect address word (DIRØ) is a "zero" (no special XL load), transfer the address portion of the indirect address word to the F register, and send it to memory. |
| | DIRØ→TRSUMXL, TRFMAM, GATE | If the Ø bit of the indirect address is a "one" (special XL load), transfer the address portion of the indirect address word to the XL register via the adder. Send the address from the F register to memory. |
| | (DIRØ+DIR10)→S TP10 ($\overline{DIRØ}.\overline{DIR10}$)→INST, R Q | If further indirect addressing is specified (by bit 10 of the indirect address word) or if a special XL load is being executed (specified by bit Ø), go to TP10. Otherwise proceed to the command execution sequence. In the latter case, reset the Q flip-flop.* |
| | $\overline{PARITY}$→SET CPE | If the indirect address word (in the DIR) has incorrect parity, a command parity error is declared. |
| TP12 | | See specific instructions. |
| TP11 | $\overline{INPUT\ STROBE}$→RDM | Read the data word from memory unless data is being transferred from the I/O. |
| | STROBE DIR | Strobe the data (from memory or I/O into the DIR. |
| | R OPC, R T, R Q9, R DVT | Reset the flip-flops OPC, T, Q9, and DVT.* |
| | EQL→R RPTC | If the least significant six bits of the F register are at the maximum count of 63 (EQL), reset the repeat flip-flop. |
| TP22 | OP8→S OPC<br>OP9→S Q9<br>$\overline{(LSP.\overline{OP8}.\overline{OP9})}$<br>.$\overline{PARITY}$→SET DPE | Record the state of instruction bits 8 and 9 for possible use at TP4. If the data word (in the DIR) has incorrect parity, a data parity error is declared. The exception is the "load P from external source" option of LSP, when the DIR will contain data from the I/O rather than from the memory. |
| TP3.NTP3 | | Go to TP21. |
| TPTS | | Go to TP22. |
| TP21 | | See specific instructions. |

*Read-Write Group (63 to 77)*—Continued

| Timing Period | Subcommand | Remarks |
|---|---|---|
| TP13 | STORE, S TP24 | Signal is sent to memory (via I/O) to initiate the write cycle. Go to TP24. |
| TP24 | STENV→S TP24 STENV→S TP25 | During the memory write cylce, the computer is held at TP24. At the completion of the write cycle, go to TP25. |
| TP25 | RPTC→S TP11 | If an iterative operation is in process, go to TP11. |
| | $\overline{RPTC}$→R Q, S TP3 | If the iterative operation is complete (or if no iterative operation was specified), the Q flip-flop is reset (no further arithmetic manipulations are required) and the command proceeds to TP3. |
| | $\overline{RPTC}$.$\overline{TRSUMP}$.$\overline{IOIN}$→TRPMAM, TRPM | If there are no interrupts in process, no iterative operations in process, and the P-counter is not being preset, send the address from the P-counter to memory. |
| TP3(N$\overline{TP3}$) | ($\overline{IOIN}$.$\overline{IC2}$)→RDM | If no interrupt action is required, read the instruction word from memory. |
| | STROBE DIR, STROBE DIRX, STROBE OP, S TP4. | Strobe instruction word into DIR (including secondary index bits) and OP register, go to TP4. |

*Interrupts*

The types of interrupts are defined by the I/O logic with leads IC1 and IC2 from the I/O as follows:

$\overline{IC1}$.$\overline{IC2}$=Program Interrupt.
$\overline{IC1}$.IC2=Start Interrupt.
IC1.$\overline{IC2}$=Read Interrupt.
IC1.IC2=Store Interrupt.

| Timing Period | Subcommand | Remarks |
|---|---|---|
| TP11 or TP22-1 or TP25-1 | (WAIT+INITIATE).(SET TP22+SET TP25+TP11) →S IOIN<br>WAIT.(SET TP22+SET TP25+TP11)→S WIF. | If an interrupt is requested by the I/O, the I/O interrupt flip-flop is set previous to TP22 or TP25 of the last instruction executed before the interrupt. A wait request causes the WIF flip-flop to also be set at this time. |
| TP22 | IOIN.OPØ→ALLOW INTERRUPT | During the timing period in which the P-count is normally sent to the memory, the "allow interrupt" signal is sent to the I/O to initiate the interrupt action. Note that the signal IOIN inhibits the normal transfers to memory at this time (i.e., TRPMAM, TRPM, TRSUMMAM). |
| TP25 | IOIN.$\overline{RPTC}$→ALLOW INTERRUPT | During the timing period in which the P-count is normally sent to the memory, the "allow interrupt" signal is sent to the I/O to initiate the interrupt action. Note that the signal IOIN inhibits the normal transfers to memory at this time (i.e., TRPMAM, TRPM, TRSUMMAM). |
| TP3 | SET TP4.($\overline{IC2}$+$\overline{IOIN}$)→RDM | If there is no interrupt action or if a read or a program interrupt is in progress, a word is read from memory at the TP3 preceding TP4 (non-repeating, non-iterative). |
| TP4.IOIN | S STFF, R RPTC | If write operations have been inhibited due to a command parity error or an illegal command error, the inhibiting condition (STFF) is now removed. The RPTC FLIP-FLOP is reset. |
| | R IOIN | The I/O interrupt flip-flop is reset. |
| | $\overline{IC1}$.IC2.$\overline{PARITY}$→SET IPE | If a store interrupt is in progress and a parity error is present, an I/O parity error is declared. |
| | IC1.IC2.$\overline{PARITY}$→SET DPE | If a read interrupt is in progress and a parity error is present, a data parity error is declared. |
| | (IC1+IC2)→S INTCYC | If a program interrupt is in progress, the interrupt action is complete. If an interrupt other than a program (or wait) interrupt is in progress, the INTCYC (interrupt cycle) flip-flop is set. |
| | (IC1.$\overline{IC2}$+$\overline{IC1}$.IC2)→S TP25 | If a read interrupt or a start interrupt is in progress, go to TP25. |
| | IC1.IC2→S TP13 | If a store interrupt is in progress, to go TP13. |
| | WIF→S HALT | If a wait has been requested set the "Halt" flip-flop. |

*Interrupts*—Continued

| Timing Period | Subcommand | Remarks |
|---|---|---|
| HALT | R WIF, S INTCYC, S STFF | The WIF flip-flop is no longer needed and is therefore reset. All restarts are accomplished via an interrupt cycle, therefore the INTERCYC flip-flop is set. The STFF (store enable) flip-flop is set. |
| | (BTE+WAIT+CLEAR)→R CLEAR | The timing counter flip-flops are all reset during wait or clear operations, or if a basic timing error has occurred. |
| | S TRUE, R COMP, R ENF, R ENP, R ENA, R ENC, R DIRADD, $\overline{\text{ENDIR}}$. | All flip-flops which control the DOM and the adders are reset or inhibited to allow external selection of registers enabled to the DOM during halt. (Note that TRUE outputs of the DOM are enabled.) |
| | $\overline{\text{WAIT}}.\overline{\text{CLEAR}}.\overline{\text{BTE}}$→R HALT, S TP25 | When the "wait" and "clear" signals have been removed (and the basic timing error flip-flop has been cleared), go to TP25. |
| TP13.INTCYC | TRUE, ENDIR, STORE | The DIR is enabled through the DOM to the memory to be stored. |
| TP24.INTCYC | TRUE, ENDIR | Outputs to the memory are maintained as above during the store operation. |
| TP25 | INTERRUPT COMPLETE, TRUE, ENDIR | The "interrupt complete" signal to the I/O allows data to be strobed from the DOM (read interrupt) and informs the I/O that interrupt action is complete. |
| | $\overline{\text{IC1}}$.IC2→INSERT P, TRSUMP | If a start interrupt has been executed, the new data is transferred to the P-counter. |
| | IC1.IC2.$\overline{\text{IOIN}}$→TRPM, TRSUMMAM | If a start interrupt has been executed and no new interrupts are in progress, the new P-count is sent from the adder to the memory. |
| TP3.INTCYC | | No action. |
| TP4.INTCYC | R INTCYC | Reset the interrupt cycle flip-flop. |

*Branch unconditionally BUN (02)*

| Timing Period | Subcommand | Remarks |
|---|---|---|
| TP22 | TRUE, TRSUMP $\overline{\text{OP9}}$→ENF | If bit OP9 of the instruction word is "zero", transfer the address portion of the instruction word from the F register through the adder to the P counter. |
| | OP9→ENP, DIRADD | If bit OP9 of the instruction word is "one", add the P counter to the address portion of the instruction word (from the DIR) and place the sum in the P counter. |
| | $\overline{\text{IOIN}}$→TRPM, TRSUMMAN | If no interrupt action is required send the new P count from the adder to the memory. |
| TP3 | | No action. |
| TP4 | | No action. |

COMPUTER LOGIC

The logic diagrams of the computer of the invention are readily apparent generally from the above-listed equations. These logic diagrams may be implemented by those skilled in the art by the use, for example, of silicon monolithic integrated circuits of the configuration commonly known as RTL or Resistor Transistor Logic.

However, certain of the circuits of the illustrative embodiment of the invention involve design ingenuity. These circuits are shown in the logic diagrams of FIGS. 5, 6, 7, 8 and 9. The corresponding electrical circuits and structure of these features of the illustrative embodiment of the present invention are readily apparent from the logic diagrams and descriptions thereof presented hereinbelow of FIGS. 5, 6, 7, 8 and 9.

Refer to FIG. 5 of the drawings. FIG. 5 is a logic diagram of bits 7 to 12 of the 23 bits of the adder logic unit 103 (see FIG. 1). The operation of the remaining bits is apparent from the discussion and drawing of this portion of adder logic unit 103. In this showing the less significant bits are numbered with the higher number, that is, bit 1 is the most significant bit and bit 23 is the least significant bit, bit 7 being the seventh most significant bit and bit 12 being the twelfth most significant bit. Thus, bit 12 is of lesser significance than bit 7. Input leads DIR7, DIR8, DIR9, DIR10, DIR11 and DIR12 (the DIR input leads) and DOM7, DOM8, DOM9, DOM10, DOM11 and DOM12 (the DOM leads) are provided. The two inputs to the adder are the inputs fed into (1) the input DIR leads which receive the corresponding inputs from the corresponding bit positions of the data input register 100 and (2) the inputs fed into the DOM input leads which receive the corresponding inputs from the corresponding bit positions of the data output multiplex unit 104. This is represented in FIG. 1 by the two lines illustrated coming into adder logic 103 from the top of the adder logic unit 103. The input lead lines labeled DIRAD 1–2 and DIRAD 2–1 are provided. Leads DIRAD 1–2 and DIRAD 2–1 enable inhibiting of inputs from the data input register 100 when it is desired to take information directly from the output of the data output multiplex unit 104 and transfer it into some register of the machine without causing the addition function in the adder to take place. This is so effected because sometimes the adder is merely used as part of the data transfer input circuit wherein the information is merely routed therethrough. In FIG. 5 the numbers following a dash (–) in each case refer to signals from different drive elements but with the same logical function and properties. For example, Carry –1 and Carry –2 both represent the same input signal, but one driver alone cannot provide enough amplification to drive the adder logic. Therefore, two carry input drive circuits are employed. That is, the signals are identical and from the same source but two drivers are needed, one for each of the inputs into which they are fed. For example, Carry–1 is sufficient to provide inputs to about the first 7 bits, Carry–2 to the next 7 bits and so on. In one practical machine of the illustrative embodiment of the present invention NAND logic has been utilized. In this NAND logic all of the AND gates are physically exactly similar to the OR gates, the difference being one of function. In the NAND logic employed, the OR gates are the gates illustrated in the drawings with the input lines through the semicircle and the AND gates are the gates illustrated as merely semicircles with lead line inputs. Also, because NAND logic is utilized, every gate shown has an inverted output. In the logic diagrams of the figures inverters are represented by triangles. The outputs labeled EO, for example, EO7, EO8, EO9, EO10, EO11 and EO12, represent the exclusive OR functions of the respective DIR and DOM inputs to each of the respective bit circuits. For example, output EO12 is the exclusive OR output from the inputs which are fed into the input leads DIR12 and DOM12.

If the DIR enabling signal DIRAD–1 or DIRAD–2 is not present, then the EO output will be the same as the corresponding DOM input. The first stage between the inputs and the outputs, that is, the stage having inputs DIR12 and DOM12 and output EO12 forms a half adder circuit. That is, AND gates A571, A572 and A573 and OR gates O574 and O575, together with their inputs, comprise a half adder circuit. When the inputs DIR12 and DOM12 are to be added, the DIRAD–2 line is enabled. The output of AND gate A571 is the carry output of the half adder which is a signal representing the presence of both (ones) the input signals DIR12 and DOM12. This output is in inverted form. The output of AND gate A571 is ANDed with the input DOM12 by AND gate A573. The output of AND gate A571 also is ANDed with the input DIR12 by AND gate A572. The output of AND gate A573 is applied to one input of OR gate O575 and represents in inverted form the presence of a DOM12 bit when there are not both the DIR12 and the DOM12 one-bit input present together. That is, it represents bit DOM12 and bit DIR12′ (in this patent application the ′ means "not" as does the alternative designation of a bar over the letter or number or a * for negative or complement). Similarly, the input of bit DIR12 along the DIR12 lead is fed into AND gate A572, and if the DIRAD–2 input and also the input which is the output of AND gate A571 is present there is provided an inverted output from AND gate A572. When a high, this output of AND gate A572 denotes that bit DIR12 is present and that bit DOM12 is not present. The OR of these two outputs forms the exclusive OR function and is provided by OR gates O574 and O575 into which is fed the output of each of AND gates A572 and A573. Both OR gates O574 and O575 are used solely because they are both needed for drive purposes. Either one of these OR gates O574 or O575 would be sufficient if it provided sufficient drive. The exclusive OR outputs from OR gates O574 and O575 are taken from the output lead EO12 and are applied as inputs to the register check circuit 105 (see FIG. 1). The outputs of OR gate O574 and O575 also are used as one of the inputs to the half added circuit at the top of the twelfth bit portion in FIG. 5 which comprises AND gates A576, A577, A578, and OR gate O579. This half adder is identical to the half adder just described comprising AND gates A571, A572 and A573 and OR gates O574 and O575 except that in the half adder comprising AND gates A576, A577 and A578, and the OR gate O579, only one OR gate is used since the drive required at the output is not as high as the first half adder requires. The sum output of OR gate O579 is applied to various registers within the illustrative embodiment machine in accordance with the particular instruction, for example, to A register 107 or to C register 108 or to the address field register 116 or to the memory address multiplex unit 115 or the program counter register 117. The carry input from the carry input lead Carry–2 is used to enable the carry input from the previous stage. In the bit 12 position the previous stage carry input is applied along carry input lead CAR13 such that where a Carry 13 input is present the proper inputs are applied to AND gates A576, A577 and A578 to provide the proper carry output. This is, a Carry–2 input enables both of the half adders to be used to perform the exclusive OR function when there is no carry input along carry input line 13 from the next least significant bit 13 circuit and this Carry–2 input enables the two half adders to take account properly of the input carry where a "1" is present on input carry lead CAR13. The absence of the Carry–2 signal inhibits the propagation of carry through the adder and therefore provides an exclusive OR function at the outputs of the adders where it is not present. This is desired for certain instructions such as Set Register Bits SRB, etc. The OR gate O568 accepts inputs from the respective outputs of AND gates A571 and A576 of the corresponding first and second half adder stages of bit 13. OR gate O568 combines these inputs from AND gates A571 and A576 to form the carry output from the 12th most significant bit stage to the 11th most significant bit stage. There is a plus ouput from AND gate A571 only when there are input 1's from both of the input leads DIR12 and DOM12. For the second input to OR gate O568 to be present there must be an output from AND gate A576. This output from AND gate A576 requires that carry along input carry line CAR13 must be applied with the Carry–2 line enabled and the exclusive OR function from the first half adder having produced output from OR gates O574 and O575. The remaining bits of the adder operate in identical fashion to the operation of bit 12 and will not be explained.

The operation of all the bit circuits is the same in the adder which essentially performs a bit-by-it addition. Action in other arithmetic processes is also the same essentially. Subtraction, for example, is controlled by complementing the inputs from the data output multiplex unit 104 applied to the DOM input leads, e.g. input lead DOM12, and by performing the various corrective operations required from the result which is usual in the subtraction process by performing add to complement.

The adder logic unit 103 is provided with a group carry system which performs the carry output for a group of six bits. This is the output represented by the designation CAR7 which is the carry for bits 7 to 12 of the adder. The group carry reduces the amount of delay for a carry generation in the adder. To perform a carry in this manner the exclusive OR outputs of each bit stage are ANDed with the exclusive OR outputs of all previous stages and the carry input to the group. In this case the carry input is applied from lead CAR13 and also from the circuit which comprises AND gates A540, A545, A547, A548, A550 and A552. This function is performed by the various inputs to the AND gate A552. That is, there is ANDed together the exclusive OR outputs along the exclusive OR output leads EO7, EO8, EO9, EO10, EO11, EO12 and the carry inputs to lead CAR13 in AND gate A552. The AND gate A550 accepts the inputs from exclusive OR input leads EO7, EO8, EO9, EO10, EO11 and the output of the first half adder of bit 12 which represents the presence of ONE's both on the input leads DIR12 and DOM12. This first half adder output is applied via the inverter I569 to the AND gate A550. This input also represents one of the inputs to OR gate O568 which propagates the carry from the bit 12 circuit to the bit 11 circuit. The AND gate A548 AND's the exclusive OR inputs from exclusive input leads EO7, EO8, EO9 and EO10 and the output of the first half adder section of bit 11 which is represented by a positive output from AND gate A559 when both inputs DIR11 and DOM11 are present. This AND gate A559 output also is fed through the inverter I543. The AND gate A547 AND's the inputs from the exclusive OR outputs of the respective seventh bit exclusive OR output lead EO7, the eighth bit exclusive OR output lead EO8, the ninth bit exclusive OR output lead EO9 and the output of the first half adder of the tenth bit which is the output from AND gate A532 when signal input is present along both input leads DIR10 and DOM10. This output of AND gate A532 applied to AND gate A547 is inverted through the inverter I538.

Similarly, the AND gate A545 receives the exclusive OR inputs from exclusive OR input leads EO7 and EO8 and the inverted output of AND gate A53 which is inverted in inverter I522 and applies a negative input signal (negative logic is used throughout the machine; therefore, negative inputs to AND gates indicate signals which are present in the true state) to AND gate A545 when the input bits applied to input leads DIR9 and DOM9 are both ONE's. Similarly, the AND gate A540 receives inputs from the exclusive OR lead EO7 and the inverted output from AND gate A512 which is inverted across inverter I511. The signal CAR7 is generated by the OR gate O554 when any one of the above AND gates A540, A545, A547, A548, A550, or A552 presents a positive output or when the AND gate A501 of the most significant bit of this portion of the adder (which is significant bit 7) has a positive output caused by the presence of both DIR7 and DOM7 signals (ONE's) being present. Because there are at least two inputs, the carry is always generated when it is proper and inhibited by the other input when a carry should not be provided by the addition function.

For additional speed in the adder a subgroup carry comprising AND gates A555, A556 and A557 and the responsive OR gate O558 are provided. This provides a group carry of bits 10, 11 and 12 and the CAR13 input and is used as the carry input to bit 9. These carries are generated in a manner similar to those described in the description of the previous circuits of OR gate O554. Inasmuch as this circuit is similar, description will not be furnished since operation is apparent from the above description.

In the present description NAND circuitry is taken to be an AND circuit followed by an inverter. This is the basic building block to form AND and OR gates as shown in FIG. 5. It will be appreciated, however, that a NOR circuit could be used alternatively, and the invention contemplates this as within its scope additionally to the NAND circuits utilized in the illustrative embodiment.

Refer to FIG. 6. FIG. 6 illustrates by way of example the circuit of one of the bits of the bit circuits of the A register 107. Provided in this FIG. 6 circuit are flip-flop FF606 having "1" and zero sides and inputs S, T and C, a $\overline{\text{STROBE A-1}}$ input lead, an OR gate O605 coupled to the S and C inputs, a plurality of AND gates A601, A602, A603 and A604 each having its output connected to an input of OR gate O605. Input leads SHRA and SUM2 into AND gate A601, input leads SHL A and A4 into AND gate A602, input leads ADD A and SUM3 into AND gate A603, and input leads ANDA, a connecting lead from lead SUM3, and a connecting lead from the "1" output of the flip-flop FF606 to an input of AND gate A604 are provided. A lead from the next previous bit stage to the "1" output A3 of flip-flop FF606 is also provided. The circuits of the illustrative embodiment of the A register 107 are formed from NAND circuits. In the various registers the flip-flops used in the practical example shown of the illustrative embodiment are of the type commonly known as D-type flip-flops. In these D-type flip-flop circuits the output of previous circuit stages is applied to a single input lead which feeds the inputs labeled S and C in the flip-flop representation and this output will appear at the one output (labeled "1") of the flip-flop after the occurrence of a clock pulse at the T input. Similarly, the complement of the information presented at the inputs S and C appears in each case at the zero output (labeled "0") of the flip-flop after the occurrence of a clock pulse at the STROBE line which appears at input T. The exemplary circuit of the 24 bit circuits of the A register 107 shown in FIG. 6 is that of bit 3.

The A register 107 is a STROBE register. That is, the A register 107 will only accept input information when a STROBE pulse is applied along the STROBE pulse input line marked $\overline{\text{STROBE}}$ $\overline{\text{A-1}}$. The STROBE pulse applied to the $\overline{\text{STROBE}}$ $\overline{\text{A-1}}$ lead is generated by utilizing the clock pulses with appropriate control signals from the timing and control unit 106 when it is desired that the A register 107 accept data. This feature enables doing away with considerable gating which would otherwise be necessary to inhibit signals at certain times. There are four possible sources of input data coupled into each flip-flop of the A register 107. These four sources come from respective AND gates A601, A602, A603 and A604. AND gate A601 is responsive to the SHIFT-RIGHT A command and the SUM2 input. The SUM2 input represents the output of the second bit circuit of the adder logic 103 and is similar, for example, to the SUM12 output shown in FIG. 5 of the drawings. AND gate A601 is used when performing a shift right operation on the A register 107 at which time the A register 107 is enabled via the data output multiplex unit 104 and the adder logic 103. As stated, the output of the adder logic 103 appears on the corresponding bit of the adder logic 103 and is applied to enable corresponding bit circuit gates of the A register 107. Thus, SUM2 represents the output of A register 107 bit A2 which will be shifted right to the A register 107 position of bit A3 when the shift right command SHR A and the strobe pulse $\overline{\text{STROBE}}$ $\overline{\text{A-1}}$ are generated. The reason for the data path being directed through the adder logic 103 for this operation of shift-right A is that in executing the multiply instructions the addition and shifting of the sum may be accomplished at the same clock time. That is, all right shifts are done through the path comprising the adder logic 103 because in the particular multiply function time may be saved by multiplying and shifting at the same time. AND gate A602 is enabled upon a shift-left A command, the other input being the input from the A register 107 fourth most significant bit circuit which is placed into the third most significant bit position on a shift-left command. The AND gate A603 is enabled when the command ADD A is generated. The command ADD A means that the output of the adders in adder logic 103 is to be transferred into the corresponding bits of the A register 107. (See FIG. 1 also.) Therefore, the SUM3 input, which is the output of bit 3 position of the adder, is applied to AND gate A603 together with the ADD A command. The ADD A command is used both when performing arithmetic operations and when transferring data into the A register 107 using the adder logic as a data transfer path. Thus the A register 107 operates as an accumulator register. AND gate A604 responds to the AND A command in exactly the same fashion as the AND gate A603 responds to the ADD A command except that the AND gate A604 requires the presence of a "1" output from the flip-flop FF606 of the A3 bit position of the A register 107 and thus performs a logical AND of the data coming from the corresponding third bit position of the adder along input line SUM3 and the output of the present contents of the third bit of the A register 107. Only one of these four commands (AND A, ADD A, SHL A, SHR A) is present at one time. Therefore, a single OR gate O605 is provided into which the outputs of the AND gates A601, A602, A603 and A604 are applied. The OR gate O605 output is applied to both the S and C inputs of the flip-flop FF606 so that if $\overline{\text{STROBE A-1}}$ is present representing the clock pulse time, and where there is an output from OR gate O605 a "1" is provided in the bit 3 position of the A register 107. In the bit 3 flip-flop FF606, really only one input lead means is provided to the flip-flop, the S input being provided to the circuit in its true form and the C input being provided to the same circuit in its complementary form.

The logic circuit of C register 108 is not shown since its structure and operation is identical to that of the A register 107 except that on the shift-right command inputs are taken directly from the next most significant bit of the C register 108 instead of through the adder logic unit 103. As shown in FIG. 1 also, a shifting from the least significant bit of the A register 107 to the most significant bit position of the C register 108 occurs upon a shift-right or shift-left command with proper options specified. The logic for these bits is easily deduced from the logic equations presented here—inabove and will not be described in detail.

The data input register 100, the index location register 118 and the operation register 109 are simple, conventionally designed registers. Therefore, detailed descriptions and drawings of each of these registers are unnecessary and are not given. Each of these registers 100, 118 and 109 comprises a plurality of flip-flops in parallel which accept inputs directly into the respective flip-flop circuits when the proper strobe is generated by the timing and control logic 106 and the outputs of which are direct or buffered as required.

Refer to FIG. 7. FIG. 7 illustrates, by way of example, the circuit of the bit position 5, one of the bits of the bit circuits of the data output multiplex unit 104. The remarks referred to in describing the data output multiplex unit 104 in connection with the FIG. 1 description will be illustrated here. The data output multiplex unit 104 comprises two successive circuits. Referring to FIG. 1, it is seen that the inputs to the data output multiplex all do not represent 24-bit inputs. For example, the program counter 117 applies 12 bits to the data output multiplex unit 104. Therefore, for the example that has been chosen, only three inputs are shown: the input from the fifth bit position (flip-flop FF606) in the A register 107, reperesented by the bit input on input lead A5, the input from the fifth bit position (flip-flop not shown) of the C register 108 represented by the bit input on input lead C5, and the input from the fifth bit position (flip-flop not shown) of the data input register 100 represented by the bit input on input lead DIR5. It will be understood that the circuits of the lesser significant bit positions (digits) of the data output multiplex unit 104 will have additional inputs in accordance with the registers to which their inputs are connected. AND gates A701, A702, and A703 are provided in the illustrative embodiment DOM104 fifth bit circuit and not only perform the AND functions (as described hereinbelow) but additionally two of them are used as will be described to provide an OR function also.

AND Gate A701 AND's together the output of the fifth bit flip-flop of the A register 107 and the "enable A register to data output multiply unit" subcommand signal ENA from the subcommand matrix 120 which occurs in many of the commands of the machine. The AND gate A702 AND's together the output of the fifth bid flip-flop of the C register 108 applied along input lead C5 and the "enable C register to data output multiplex unit" subcommand signal ENC from the subcommand matrix 120. The ENC subcommand also is generated for the execution of many commands in the machine. The AND gate A703 AND's together the output of the fifth bit flip-flop of the data input register 100 applied along input lead DIR5 and the subcommand signal "enable the data input register to the data output multiplex" ENDIR which is generated in the subcommand matrix 120. This subcommand signal ENDIR is used to enable the data input register 100 to apply its output to the data output multiplex unit 104. The OR gate O705 is provided. OR gate O705 provides the output PAR5 which represents the information from the register selected by the subcommands, ENDIR, ENC or ENA. OR gate O705 may also be used to perform a logical OR function from any two of the input registers and a corresponding two of the subcommands together at the same clock time. An inverter 706 is provided. The signals PAR5 and its complement $\overline{\text{PAR5}}$, the latter of which is generated by passing PAR5 signals through inverter 1706, are used as inputs to the parity generator 110 (see FIG. 1) and also provide inputs to the second stage of the data output multiplex unit 104. This second stage comprises AND gates A707 and A708, and OR gate O709. The second stage of the data output multiplex unit 104 is used to provide either the information from the first stage or the complement of the information from the first stage as desired. This is controlled by the subcommands complement COMP or by the subcommand TRUE. If both of these subcommands are in the positive state (both zeros) the outputs of the corresponding bit positions of the data output multiplex unit 104 will be zeros, enabling the adder logic 103 to be used for data transfers from the data input register 100 to various registers within the machine such as the A register 107 and the C register 108, for example (see FIG. 1). If the signal TRUE is in the ground state, that is, equal to one, then the true output in the first stage of the data output multiplex unit 104 will be enabled. Enabling the data output multiplex unit 104 permits outputs to be sent to the memory, to the I/O control unit and to the adder logic 103 (see FIG. 1 also). If the COMP signal is in the ground state, that is, is a one, then the complement of the output of the first stage will appear at the output of the data output multiplex unit 104 for use in the adder logic 103. The complement is never sent out to the memory and I/O control modules. The subcommand matrix 120 is designed such that it is not possible for both the COMP and the TRUE to be in the ground state at one time.

The data output multiplex unit 104 is used during arithmetic operations and therefore is involved in the critical timing involved in such arithmetic operations. In order to conserve time the subcommands required, such as COMP, TRUE, ENDIR, ENC and ENA are generated in the subcommand matrix 120 a clock time before their use is required. This is performed by means of the look-ahead feature to be described in the description of FIG. 9. The subcommand generated in this look-ahead feature is used to set a flip-flop such as FF907 shown in FIG. 9 which at the appropriate time as determined by the timing and control unit 106, is enabled to provide the appropriate subcommand signal COMP, TRUE, ENDIR, ENC or ENA when required. This is true of all subcommands used by the data output multiplex unit 104 and it is effected in the unique timing arrangement of the machine of the invention as described in FIGS. 3 and 4. The DIRAD signals required by the adder logic unit 103 are also generated in this manner, using look-ahead for the same reason.

Now refer to FIG. 8. FIG. 8 illustrates the circuit of one bit position of the address field register 116. The bit 19 flip-flop circuit of the address field register (F) 116 is illustrated. The structure of the remaining bit logic is similar to and readily understood and constructed from the drawing and description of bit 19. The twelve bits of the address field register 116 are bits 12 through 23. Bit 19 is the 19th numbered bit from 12 through 23. The address field register 116 is capable of accepting input data from two sources, the data input register 100 and the output of the adder logic 193 (see FIG. 1). The address field register 116 contains counting logic. In these respects the address field register 116 is identical to the program counter 117. Therefore, the program counter 117 is not described nor illustrated in circuit details as its structure is readily apparent.

Now refer to FIG. 8 in detail. A flip-flop FF807 having a STROBE T and data inputs S and C is provided and has outputs F19 on the "one" side and $\overline{\text{F19}}$ on the "zero" side. OR gates O809 and O811 are provided. OR gate O811 is connected to feed inputs into the S and C inputs of flip-flop FF807. An AND gate A812 is provided, and is connected to be responsive to OR gate O809 and to provide input into the T or strobe input to the flip-flop FF807. Although shown as three inputs into the flip-flop FF807, actually there are only two wires, the T input wire for the strobe input and the S and C input wire for the data input. AND gates A803, A804, A805 and A806 are provided, each having a pair of inputs. Two input leads into AND gate A803 are provided, one input lead transmitting the signal FCAR20 and one input lead transmitting the signal F20. Two input leads into AND gate A804 are provided, transmitting the respective DIR19 signal and TRDIRF subcommand. Into AND gate A805 are provided an input lead carrying the SUM19 signal and an input lead carrying the TRSUMF subcommand. Into AND gate A806 are provided an input lead carrying the COUNT F subcommand and a second input lead which is fed back from the $\overline{\text{F19}}$ output at the ezro side of flip-flop FF807. The OR gate O809 has an input lead fed from a source carrying the subcommand $\overline{\text{SET}}$ $\overline{\text{FLSB}}$ and a second input lead from the output of AND gate A803. Connected into OR gate O811 are leads from the outputs of each of AND gates A804, A805 and A806. AND gate A812, in addition to having the output of OR gate O809 fed in, also has a second input lead clock connected therein from the central data processor clock.

In the address field register 116 circuit of FIG. 8 the flip-flop FF807 is not responsive to inputs in the absence of a clock signal being gated into the strobe input T via the AND gate A812 in the presence of a signal from OR gate O809. Therefore, the flip-flop FF807 may accept data only when the subcommand $\overline{\text{SET}}$ $\overline{\text{FLSB}}$ is positive or when the signals FCAR20 and F20 are present. The signal FCAR20 is generated by a count F subcommand and the presence of "ones" in all the following stages of the address field register 116, that is, in the 20th, 21st, 22nd and 23rd stages there must be "ones." This is the condition for counting. The address field register 116 acts also as a counter as well as providing its function as a register and the next count-up to be made would be the 19th bit when each of the 20, 21, 22 and 23 bits are "ones." When counting, the count F subcommand enables the complement output $\overline{\text{F19}}$ of the flip-flop FF807 to be presented as a data input to the flip-flop at inputs S and C thereby causing flip-flop FF807 to change state and therefore count-up. That is, the count F signal plus the $\overline{\text{F19}}$ signal recircled back from the "zero" output side of the flip-flop FF807 to the input of AND gate A806 causes signal output to be transmitted from AND gate A806 into OR gate O811. The resulting output from OR gate O811 causes the S and C inputs for data inputs of flip-flop FF807 to be activated and a change of state results, if the previous named conditions for counting are met, that is, that FCAR20 and F20 signals are present. In this figure the term "signals are present" means that they are in the ground state.

In order to provide a STROBE input into the flip-flop FF807 at STROBE input T so that it will accept data inputs from the DIR19 and the SUM19 signals, the subcommands $\overline{\text{SET}}$ $\overline{\text{FLSB}}$ must be present whenever either of the subcommands TRSUMF or TRDIRF are present. Since $\overline{\text{SET}}$ $\overline{\text{FLSB}}$ is a complement signal, it is in the positive state when present rather than grounded. The positive state of $\overline{\text{SET}}$ $\overline{\text{FLSB}}$ enables OR gate O809 and, upon the occurrence of a clock signal, causes a STROBE to be present at the T input of flip-flop FF807. The data input register 100 bit circuit 19 state is the DIR19 signal applied to AND gate A804. The SUM19 signal applied to the input lead of AND gate A805 is obtained from the 19th bit circuit output of the adder logic 103. When the subcommand TRSUMF is present the SUM19 input enables AND gate A805 which causes enabling of OR gate O811, which then provides the data contained in SUM19 to the data input S and C of the flip-flop FF807. Similarly, in the presence of a TRDIRF subcommand and the signal output from the contents of the DIR19 bit circuit of the data input register 100, AND gate A804 is enabled which in turn enables OR gate O811 and causes the data of data input register 100 bit DIR19 to be fed into the flip-flop FF807 via the input data leads S and C.

Refer to FIG. 9. FIG. 9 illustrates a circuit of the subcommand generation logic of subcommand matrix 120 including the "look-ahead" feature or means provided for executing subcommands wherein critical timing change is involved. That is, FIG. 9 presents an example of the logic circuit for a subcommand which is involved in the critical timing path of the machine, as may be used in the ADD operation, for instance. The FIG. 9 circuit is exemplary of each of the logic circuits for the subcommands in which such critical timing appears and incorporates the special circuit interconnection required for the look-ahead feature. The remaining logic of the subcommand matrix unit 120 is apparent from the logic equations of the subcommands given hereinabove and particulars and details of its logic circuits will not be described.

To eliminate the time normally consumed by the gating required for subcommand generation, the look-ahead subcommands are generated by flip-flops such as flip-flop FF907 which is provided and will be described in conjunction with the flip-flop FF907 circuit of FIG. 9. These flip-flops receive data in turn from gates which decode the subcommand at a time period preceding the time period in which the subcommand is to be employed. Flip-flop FF907 is provided with "one" and "zero" outputs, S and C data inputs, and a T STROBE input as described also, for example in the description of FIG. 8, and as exemplary of the other flip-flops mentioned hereinabove. An OR gate O908 is provided and is connected to the "one" output of flip-flop FF907. OR gate O908 provides an "enable P-counter into DOM" signal ENP. Responsive to the ENP signal at its one output, the contents of the P-counter are transferred to the data output multiplex 104. An AND gate A909 is provided. Another input of OR gate O908 leads from the output of the AND gate A909. A pair of input leads are provided for HALT and RSENP input signals and feed into AND gate A909. The T STROBE input of flip-flop FF907 is connected directly, that is, without gating, to the clock. This input denoted CLOCK ST2 is a signal derived from the central data processor clock. An AND gate A906 is provided and from its output connects the data input into the S and C data input terminals of flip-flop FF907. An input from a source of the set interrupt cycle $\overline{\text{SET}}$ $\overline{\text{INTCYC}}$ signal is provided into AND gate A906. An OR gate O905 is provided and its output is connected into another input lead provided into AND gate A906. AND gate A906 AND's together its inputs from the set interrupt cycle $\overline{\text{SET}}$ $\overline{\text{INTCYC}}$ signal and from OR gate O905. AND gates A901, A902, A903 and A904 are provided and each has an output lead which is connected into OR gate O905. Each of AND gates A901, A902, A903 and A904 has a plurality of input leads. AND gate A901 is provided with four input leads from the sources of the signals for the load and store subcommand LSP, the operation register 109, eighth bit OP8, the operation register 109 ninth bit complement OP9 and the INST output from the timing counter of the timing and control unit 106 (see FIG. 3). AND gate A902 is fed via leads provided therein from the same inputs LSP and OP8 as are fed into AND gate A901. Additionally AND gate A902 is provided with an input lead from the flip-flop TP22 of the timing counter of timing and control unit 106. AND gate A903 is provided with a first input from the timing counter flip-flop complement $\overline{TP22}$. AND gate A903 is provided with a second input for receiving signals for "store cycle complete" $\overline{STC}$. A third input is inserted into AND gate A903 from the "zero" side output of the flip-flop FF907. AND gate A904 is provided with four inputs. The first input is the input lead carrying in the BUN and BCN commands. The second input is the input lead transmitting in the INST timing counter signal which signal is provided also into the input of AND gate A901. The third input is that from the ninth bit flip-flop circuit of the operation register 109. The fourth input is that from the circuit providing the signal for the operation register 109 fifth bit complement $\overline{OP5}$.

The flip-flop circuit of flip-flop FF907 is typical of many flip-flops in the machine which are triggered directly by clock signals such as CLOCK ST2 which are inverted clock signals utilized to obtain correct polarity inputs to the standard flip-flops utilized in the illustrative embodiment of the invention. Because the clock signals are not gated in any way, a circuit is provided to hold the flip-flop (flip-flop FF907 in the FIG. 9 circuit) in the SET state once conditions for setting the flip-flop have been obtained and when a RESET is not desired. This is accomplished by use of the AND gate A903 which accepts feedback output from the "zero" side of the flip-flop FF907. Since the input to flip-flop FF907 is obtained from an AND gate, AND gate A906, it is in the complement form due to the inversion caused by the NAND logic. Therefore, the "zero" output of the flip-flop FF907 actually represents the true signal output necessary to provide the proper output from AND gate A903 providing that the $\overline{TP22}$ and $\overline{STC}$ signals are concurrently present, such as to maintain the flip-flop FF907 in its present state. This is accomplished by utilizing the flip-flop circuit in reverse from normal use in which output is taken from the "zero" rather than the "one" state for this purpose. That is, the reversal comprises merely taking output from the "zero" side of the flip-flop FF907 instead of the "one" side for this feedback purpose while also taking the output from the "one" side for the generation of the ENP subcommand.

The ENP subcommand output of OR gate O908 is required at timing period TP13 of a "load and store program counter" LSP command with an option being specified by the operation register 109 eighth bit OP8 being a "one." Therefore, it is necessary to set the flip-flop FF907 which generates the ENP subcommand at the timing period previous to timing period TP13.

Refer to the timing chart of FIG. 4A. The LSP option in the preceding paragraph is the XNP option shown on the last row at the left of FIG. 4A. From this row it is seen that the timing period next preceding timing period TP13 is timing period TP22 (for this instruction). In determining this from FIG. 4A, the blank boxes are ignored since they represent jumps in the timing counter of timing and control unit 106 (see also FIGS. 1 and 3). In this modified command a jump is made from timing period TP22 to timing period TP13.

Since the subcommand ENP is required at timing period TP13 and since the look-ahead feature is being used in this subcommand, the flip-flop FF907 must be set at the next previous time which in this subcommand option is timing period TP22 from which the jump from timing period TP13 is made. This is effected by means of the circuit comprising the AND gate A902 when the three inputs LSP, OP8 and timing period TP22 are present.

The reason for this look-ahead feature is that at timing period TP13 it is necessary to enable the contents of the program counter 117 into the data output multiplex 104, for storage in memory at that time. The timing is critical in this path and therefore the look-ahead feature is required whereby the conditions for the transfer at timing period TP13 must be set up at timing period TP22. Timing period TP22 is the next previous timing period before the jump, at which time flip-flop FF907 must be set for this command ENP to be sent to the data output multiplex 104 at timing period TP13. This look-ahead feature not only eliminates the timing delay which would otherwise be present because of the finite time which is required for enabling and providing outputs of AND gates A906, OR gate O905 and AND gate A902, but additionally, the time is saved for the gating necessary otherwise to generate the LSP, the OP8 and the TP22 signals. This is especially significant in cases like the LSP subcommand because in such cases there is involved considerable subcommand matrix 120 circuitry and therefore considerable delay. Similar action occurs via AND gate A901 when the LSP subcommand with options OP8, $\overline{OP9}$ (the STP option shown in the next to last row of FIG. 4A) is required. In this option once again the subcommand ENP is required at timing period TP13. However, referring to the next to the last row on the chart of FIG. 4A it is seen that there are no previous timing periods involved in the command execution phase. Therefore, the timing period at which INST is generated will be the timing period which directly precedes timing period TP13. For this reason, the inputs into AND gate A901, of the LSP subcommand signal, operation bit 8 being in the "one" state, OP8, operation register 109 bit 9 being in the "zero" state, $\overline{OP9}$, and the input at the time at which the INST command is generated, causes AND gate A901 to be activated and provides the setting of flip-flop FF907 at the time of generation of the INST command. Thus the flip-flop FF907 is in the proper state such that at the following timing period flip-flop setting of timing period flip-flop TP13, the ENP command may be carried out causing a transfer from the program counter 117 to the data output multiplex 104. In a similar manner, the AND gate A904 accepts either the BUN or BCN subcommands with the operation register 109 bit 5 in the "zero" state, $\overline{OP5}$, and the operation register 109 bit 9 set in the "one" state, OP9, and the presence of the time at which the INST command is generated, in order to generate the command ENP at timing period TP22 for use in these two BUN and BCN commands.

Once flip-flop FF907 is set (actually this flip-flop FF907 is being used in a reverse way so that by set is meant a "one" bit on the "zero" side of the output of flip-flop FF907) the flip-flop FF907 will remain set until one of the reset conditions occurs. As shown at the input circuit to AND gate A903, one of two input conditions must occur to reset flip-flop FF907. The first condition is the removal of timing period signal $\overline{TP22}$, that is at the setting of timing counter flip-flop TP22. Similarly, the flip-flop FF907 is reset by the removal of the $\overline{STC}$ signal which $\overline{STC}$ signal removal is caused when the STC signal is generated at the end of a store cycle.

At timing period TP22 if the proper conditions for setting the flip-flop FF907, that is, if LSP and OP8 conditions are present, then the flip-flop FF907 is set since the set conditions generated by AND gate A902 will present a data input to the flip-flop FF907 via the OR gate O905 and the AND gate A906 even through the AND gate A903 is disabled by the flip-flop TP22 being set. Thereby there is provided an arrangement whereby set conditions override reset conditions.

When the conditions SET INTCYC are present (see input to AND gate A905) indicating that an interrupt cycle is to be performed, it is necessary to reset flip-flop FF907 and remove the ENP command even though the proper conditions for setting the flip-flop may be present.

AND gate A906 provides means whereby the data input into input terminal S and C of the flip-flop FF907 will be disabled in the presence of a signal $\overline{\text{SET}}$ $\overline{\text{INTCYC}}$ in the positive state. This permits a reset condition by the generation of the $\overline{\text{SET}}$ $\overline{\text{INTCYC}}$ signal even when ordinarily AND gates A901, A902 or A904 would cause overriding of the AND gate A903 when the latter would otherwise inhibit the SET conditions. That is the overriding of inhibiting set of flip-flop FF907 is itself overpowered by the $\overline{\text{SET}}$ $\overline{\text{INTCYC}}$ signal means and the gate circuitry provided.

When the central data processor of the illustrative embodiment of the invention is inactive, it may be desired to enable data from the program counter 117 to the data output multiplex 104. This is useful for various test and loading operations performed by the I/O control module of the invention described in the aforementioned patent application, Ser. No. 427,322, of H. B. Marx, for "Input/Output Control System for Electronic Computers," and assigned to the assignee of the present invention. For this purpose, the AND gate A909 is provided. AND gate A909 is enabled by a HALT subcommand plus the presence of the signal RSENP from the I/O control module. Upon the command HALT and the presence of the signal RSEMP at AND gate A909, an output is provided to the OR gate O908 which causes the subcommand ENP to be generated. Responsive to this subcommand ENP the program counter 117 empties its contents into the data output multiplex 104, for transmission to the I/O module.

MEMORY CONTROL AND ASSOCIATED CLOCK LOGIC

Refer to FIG. 11. FIG. 11 illustrates the memory control and associated clock logic used with the preferred illustrative embodiment of FIG. 1. FIG. 11 is a simplified diagram omitting elements which are unessential to understand the concept of the invention. Obviously, considerations such as driving require amplification in an actual circuit. The specific memory control and associated clock logic of the illustrative embodiment shows adaptation for employment with a four microsecond DRO memory, for example.

In the FIG. 11 embodiment it is assumed, for example, that operation is occurring with a one megacycle (or megahertz) clock. However, the circuit is constructed such as to be adapted for employment with various types of memories of differing fetch and store cycle times. As described hereinabove, the central data processor of the invention employs circuitry which does not require adaptation to any particular clock frequencies. For example, no single-shot multivibrators or other circuits requiring particular RC (resistance-capacitance) time constant delays are employed. Thereby by means of the feature of adapting to external clocks of varying frequencies and the features shown in FIG. 11, the central data processor of the invention not only can be synchronized with systems having various types of memories or be synchronized with various types of memories themselves, but additionally the central data processor of the invention can be synchronized with systems operating at differing clock frequencies.

Provided in the memory control and clock logic circuit of FIG. 11 are a plurality of flip-flops FF1104, FF1105, and FF1106, each flip-flop having "one" and "zero" side outputs and each having S and C data inputs and a T STROBE input. Provided also are a pair of OR gates O1107 and O1109. The "zero" side of flip-flop FF1105 and FF1106 is connected to the input of each of OR gates O1107 and O1109. The "zero" side output of flip-flop FF1104 is connected to the third input of OR gate O1107. Inverter I1108 is provided and its input is connected to the output of OR gate O1107 and its output side is connected to the input of a pair of AND gates, AND gates A1101 and A1102, which are provided. A second pair of AND gates A1111 and A1110 are provided. An OR gate O1112 is provided and has three input leads, two of which are connected respectively from the outputs of AND gates A1110 and A1111. Input leads to carry read and store signals are provided to respectively take care of read requests and of store requests from the central data processor. The read request input is connected to the inputs of AND gates A1101 and A1110 and the store input is connected to the input of AND gates A1102 and A1111. An AND gate 1114 is provided and is connected to be responsive to a clock input lead and to the output of an inverter I1113 which is provided. Inverter I1113 is connected between the output of OR gate O1112 and the input of AND gate A1114. An inverter I1115 is provided and is connected to be responsive to the input from AND gate A1114 to present an output of clock signals to the central data processor. An OR gate O1103 is connected to be responsive to the output of AND gates A1101 and A1102 to provide generate-initiate signals to memory. The output from OR gate O1103 is fed also to the data input terminals S and C of flip-flop FF1104. The lead between the output of AND gate A1101 and the input to OR gate O1103 is connected to the input of OR gate O1112. A clock source is connected to apply signals to the T STROBE inputs of the flip-flops FF1104, FF1105 and FF1106. The output of OR gate O1109 is connected to input leads which are provided into AND gates A1110 and A1111.

The FIG. 11 circuit provides two primary functions. First, the circuit provides delay of one microsecond by the central data processor during "read from memory operations." This permits sufficient delay of the central data processor in strobing out the information from memory so that the memory may transfer the data from wherever it is internally located to the data input register 100 of the central data processor. The second function of the circuit is to delay the central data processor when the central data processor has requested a memory fetch or store before the conclusion of the current execution of fetch and store which the memory is effecting. In that way the memory is not disrupted in its carrying out of a fetch or store cycle.

When the central data processor requests memory for either a read or a store, in the presence of a memory not busy $\overline{\text{MEMBUSY}}$ signal from inverter I1108, the OR gate O1103 is enabled via the AND gate A1101 or the AND gate A1102. OR gate O1103 then sends a generate-initiate signal to the memory. This signal is also used in conjunction with other logic (not shown) to control such operations as transfer of the address to the memory control logic and to control gating of data to or from memory. The generate-initiate signal to memory command is also transmitted to flip-flop FF1104. Flip-flop FF1104 is the first of the group of flip-flops FF1104, FF1105 and FF1106 which are sequentially set and which are used to establish a memory busy condition once access to memory has been obtained by the control data processor. The reason for providing three sequential flip-flops is to establish a three timing count delay (three microseconds in the illustrative embodiment). This three microsecond delay (three timing count delay) permits three microseconds (three timing counts) to elapse before another access to memory by the central data process or by any other unit may be made. This circuitry ensures that the memory may not be accessed at a rate greater than four timing periods (in this case, four microseconds). OR gate 01107 is continuously enabled during this three timing count interval by flip-flop FF1104 or flip-flop 1105 or flip-flop FF1106 and transmits a memory busy signal to inverter I1108. Inverter I1108 converts the memory busy signal to the $\overline{\text{MEMBUSY}}$ signal shown in the lead from the output of inverter I1108 to the inputs to AND gates A1101 and A1102. The $\overline{\text{MEMBUSY}}$ signal inhibits further access to the memory.

In order to insure the one timing period delay (one microsecond in this case) required to synchronize the central data processor logic for a total memory access time (in this case of greater than one microsecond), a proper delay time must be afforded. This delay is effected by inhibiting one or more clock pulses to the central data processor.

Assume that the illustrative embodiment shown requires a one microsecond delay to operate with a memory having an access time of greater than one microsecond and which in this case is less than two microseconds:

When a read request is received from the central data processor and the condition $\overline{\text{MEMBUSY}}$ is present, concurrently with the generating of the initiate signal to memory by OR gate O1103, the input to OR gate O1103 is also fed to an input of OR gate O1112. The output of OR gate O1112 is inverted in inverter I1113 and is used to inhibit an AND gate A1114, thereby inhibiting the clock signal to the control data processor via inverter I1115. Inhibiting clock signals to the central data processor do not inhibit the clock signal to any other portion of the system except the central data processor logic. Thus the remainder of the system may operate in real time without interference from the central data processor. Flip-flops FF1104, FF1105 and FF1106, for example, do receive clock input regardless of whether the signal to the central data processor is or is not inhibited by the output from inverter I1115.

If the central data processor requests a memory cycle which is temporarily inhibited by the absence of a $\overline{\text{MEMBUSY}}$ signal input from inverter I1108 into the AND gates A1101 and A1102, the central data processor clock must be inhibited to prevent further central data processor action until the memory request is honored. This is effected from the input leads to AND gates A1101 and A1102 applied respective to AND gates A1110 and A1111. These AND gates A1110 and A1111 in the absence of the $\overline{\text{MEMBUSY}}$ signal are enabled by signal output of OR gate O1109. The output of flip-flop FF1104 is not used as input to OR gate O1109 since the central data processor is incapable of generating memory requests more often than once every two timing periods. Therefore, no inhibiting need take place after one timing period and hence flip-flop FF1104 does not have to inhibit OR gate O1109 one period after the central data processor has gained access to memory. Of course, the other two times while awaiting the completion of the memory cycle, flip-flops FF1105 and FF1106 provide inputs to OR gate O1109 which enables the AND gate A1110 or the AND gate A1111 which in turn enables OR gate O1112 which is used to inhibit the clock signals to the central data processor. During inhibiting of clock signals to the central data processor, the central data processor being dependent upon these clock signals to operate it merely ceases operation temporarily. In this manner, adaptation to the particular memory and its timing cycles is provided for the central data processor.

From the foregoing it is obvious that by employing less flip-flops than the flip-flops FF104, FF1105 and FF1106 or alternatively by adding additional flip-flops with corresponding inputs into the OR gate O1109, and the OR gate O1107, adaptation to various other memories can readily be effected. For example, if a memory having an additional timing count were required, an additional flip-flop (not shown) would be inserted into the circuit following flip-flop FF1106 in sequence and being provided with a lead from its "zero" side going to the inputs of both OR gates O1107 and O1109.

There thereby has been described the details of the logic which afford the inventive computer with capability for operation with various memory systems. It should also be understood that the computer itself has capability of operating with various memory systems even without the logic circuitry by means of its own circuitry as has been described. For example, the illustrative embodiment computer circuit without the timing circuit of FIG. 11 and without any inhibiting of the clock will operate with any memory which has a memory cycle of 2 microseconds or less and which has a memory access time of .5 microsecond or less. By utilizing the above-described FIG. 11 circuit showing the memory control and timing, the computer can be used with memories with greater memory cycle time than 2 microseconds and with greater memory access time than .5 microsecond.

A memory with which the computer of the invention can so operate and having an access time of 750 nanoseconds and a memory cycle time of 4 microseconds is that disclosed in co-pending patent application Ser. No. 527,360, of Ronald W. Hatton and Russel R. Romberger, for "Memory System," filed concurrently with this application and assigned to the assignee of the present invention. The disclosure of that application is incorporated by reference into the present application.

The memory control logic described in conjunction with the detailed description of FIG. 11 not only establishes a circuit which is adaptable to timing for the particular memory described, but the circuit provides capability, first, for making the computer adaptable so that it will operate with a plurality of memory units of different memory types working together and wherein there may be separate memory cycle and separate memory access times for each memory unit. In effecting adaptation to the separate times in concurrently operating with memories of different types, a separate FIG. 11 circuit will be provided for each of the types of memory with which the computer is to be utilized in the system. Second, in using two or more different circuits, of which one is shown in FIG. 11 and described in detail, improved speed is effected for the alternate accesses to differing memory units in using the system since each memory timing is independent and there is no necessity to wait for one cycle to be completed before accessing a second memory. Third, by providing two counters of the type illustrated by flip-flops FF1104, FF1105 and FF1106, one of these two counters or sequences of flip-flops may be employed for the read cycle and the other sequence of flip-flops may be employed for the write cycle. By this means the computer can be made adaptable to operate faster and without delay with memories where the read time is not the same as the store time, which is often the case with memories empolying nondestructive readout.

While a specific embodiment to the invention has been shown and described, it should be recognized that the invention should not be limited thereto. It is accordingly intended in the appended claims to claim all such variations as fall within the true spirit of the invention.

What is claimed is:

1. In a computer system comprising at least one data processor unit, at least one memory unit and at least one input/output control unit interconnecting the data processor unit and the memory unit; said data processor unit comprising (a) input means for receiving commands and data, (b) an adder logic means to perform arithmetic operations, (c) a data output multiplex means responsive to data held within said data processor for transmitting said data selectively to said memory unit through said input/output control unit and for providing input to said adder logic means in accordance with commands being executed, (d) a plurality of registers connected to the output of said adder logic means and to said data output multiplex means, (e) said adder logic being responsive to input from said input means and from said data output multiplex means, and (f) means responsive to said command words (1) to temporarily store said command words, (2) to decode said command words, (3) to provide addresses to or from which data words are to be transferred, and (4) to provide controls and timing to execute said command words.

2. The data processor of claim 1 further comprising (a) means responsive to commands to select the contens of one of said plurality of registers for transfer by the data output multiplex means, (b) said data output multiplex means further comprising means to send the true or complemented contents of the selected register to said adder logic means, as directed by the commands.

3. The apparatus of claim 1 wherein (a) said plurality of registers comprises a pair of identical accumulator registers connected between said adder logic means and said data output multiplex means, and further comprising (b) means to enable said identical accumulator registers selectively, to store and forward information received thereby, separately and from one to the other in accordance with said commands.

4. The apparatus of claim 3 wherein (a) each of said accumulator registers is separately capable of participating in logical arithmetic, addition, subtraction and shifting accumulator register operations, (b) said accumulator registers are capable of operating concurrently in shifting operations, (c) one of said accumulator registers stores the multiplier for multiplication and the other said accumulator register acts as a receiver for the product, and (d) both said accumulator registers are utilized in division, the most significant half of the dividend residing in one of said accumulator registers prior to the division operation and the least significant half of the dividend residing in the other of said accumulator registers when a double-length dividend option is selected, and the quotient being inserted into said one accumulator register and the remainder into said other accumulator register, (e) one of said accumulator registers providing one of the operands in two-address operations, and said other register acting as a receiver for the result of the operation.

5. The data processor of claim 1 wherein said buffer register comprises a data input register and wherein said data processor further comprising (a) means to couple the output of said data output multiplex means and said data input means to the input of said adder logic means, and (b) means to inhibit individualy said adder inputs at predetermined times, (c) said adder logic means being effective on command to provide a direct register-free information transfer path and at least one of said plurality of registers being an accumulator register.

6. In the apparatus of claim 5, (a) said accumulator register comprising shifting logic whereby data from the adder logic means may be shifted one position before entry into the register, (b) said apparatus thereby effecting addition and attendant shifting for the multiplying operation simultaneously.

7. The data processor of claim 5, wherein (a) means is provided to control said adder logic means to effect a multiply operation upon a partial product contained in said accumulator register, (b) said control means causing the output of said adder logic means to be transferred to said accumulator register at bit positions one bit removed from the corresponding bit positions of the adder logic means to thereby enable shifting and adding operations without delay, for increasing the speed of complete multiplication.

8. The apparatus of claim 1 wherein said system comprises a plurality of memory units and said input/output units includes means responsive to a transfer command to designate a pair of the memory units as primary and secondary units, said data processor further comprising (a) memory addressing means whereby a single bit of said command words determines which of the two predetermined memory units is to be addressed, (b) said means responsive to said command words comprises an address field register for providing addresses to said addressing means, and (c) means responsive to said memory unit selection bit to gate memory unit selection information from said input/output unit to said memory addressing means, (d) said address field register comprising means to temporarily store said transfer command while it is being executed.

9. The apparatus of claim 8 wherein said address field register provides means to store variant and index modifications of said address field responsive to commands controlling data transfer within said processor.

10. In the apparatus of claim 1

(a) said data processor being capable of accessing a plurality of index words in a selectable area of said memory unit, and (b) said data processor further comprising an index location register to specify an area of said memory unit which contains said plurality of stored index words, (c) said index location register being responsive to said command words to designate a different area of said memory unit to be accessed as index locations such that the total areas in which index words are stored in memory is variable from zero index words to the depth of words in memory required by a particular program.

11. A computer comprising:

(a) means to receive sequentially presented instructions defining a program to be executed, (b) subcommand decoding means to generate commands responsive to each of said instructions, (c) timing and control means to present said subcommands at appropriate times for utilization in the computer, (d) arithmetic means for executing said instructions, and (e) a look-ahead means comprising (f) a subcommand flip-flop and associated logic means, (g) said last-named logic means comprising circuitry responsive to signals prior to the times for presentation of said subcommands to enable said flip-flop to generate a subcommand without causing delay in the presentation which would delay said arithmetic means in commencing operation.

12. The apparatus of claim 11 in which said look-ahead logic further comprises feedback means to maintain the state of said subcommand flip-flop when said subcommand is required during more than one clock period thereby eliminating the possiblity of generating noise spikes in the subcommand signal during the transition between adjacent clock periods which might induce erroneous operation of said arithmetic unit.

13. The apparatus of claim 11 wherein said timing and control means presents said subcommands to portions of the arithmetic unit of said computer, and said look-ahead means comprises, a logic tree responsive to signals occurring prior to one clock pulse before said subcommand is to operate upon said arithmetic unit to decode each subcommand and enable the inputs of said flip-flop one clock time before the subcommand is to be presented.

14. In a system comprising at least one data processor, at least one memory unit, and intercommunication means coupled between said memory unit and data processor, said data processor being capable of parallel arithmetic operations and parallel transfers and comprising,
(a) arithmetic operations means,
(b) a program execution means,
(c) a dual circuit data output multiplex unit for providing parallel data transfer within the arthmetic means,
(d) said data output multiplex unit comprising means to send data out of the data processor, and
(e) said data output multiplex unit further comprising means to select the area of the data processor to be operated upon in all operations except memory addressing.

15. The apparatus of claim 14 wherein said data processor further comprises,
(a) memory address multiplex unit responsive to the output of selected ones of a plurality of address source registers for accessing said memory unit, and
(b) means to inhibit the output of said memory address multiplex unit when access to memory is not required by said data processor for allowing said intercommunication means to obtain access to memory during halt and interrupt conditions,
(c) said memory address multiplex unit further comprising a plurality of input gates and being connected to said address source registers comprising a data input register, an address field register, a program counter and an index location register providing the input into the gates of said memory address multiple unit.

16. The apparatus of claim 14, said data processor further comprising,
(a) means to provide automatic indexing responsive to specification in the program that indexing should be accomplished,
(b) means to designate a portion of said memory unit for index registers, and
(c) means to relocate said index registers in memory under program control,
(d) said automatic indexing means comprising means to set up without limit other than the capacity of the memory a number of index registers in accordance with the requirements of a program.

17. The apparatus of claim 14, said data processor further comprising,
(a) a data input register to hold information comprising command data words received by the data processor from said intercommunication means,
(b) an index location register, and
(c) memory addressing means responsive to both a predetermined number of bits of the word in said data input register which specify the address of an index word in a predetermined area of memory and the bits of the index location register, the composite word forming an address specifying the location in the memory where an index word is stored.

18. The apparatus of claim 17, further comprising
(a) means to execute special instructions responsive to the composite word specifying an address to be utilized in data manipulation and to appropriate commands, said last-named means comprising,
(b) means to provide iteration counting in repeat operations,
(c) means to provide tests and to record the results of a successful test of a block of words in said memory unit,
(d) means for storing the number of shifts that have been performed in a normalizing instruction,
(e) means to form an address to denote the source memory location when shifting a word in memory from one location to another location, and
(f) means for testing each word of a string of words within predetermined limits wherein one boundary limit is the location specified by the contents of said index location register plus the contents of said data input register portion.

19. The apparatus of claim 14
(a) said data processor further comprising memory block search means comprising
(b) an index location register holding a portion of an address word identifying a block of memory,
(c) a data input register holding words which comprises predetermined bits which when at predetermined setting indicate special search instructions,
(d) means responsive to block search instructions to combine the contents of said index location register with said predetermined bits of said data input register to provide a memory address,
(e) said address to be used for storing the address of the word at which the block test has been successfully met or and indicating an upper limit value to signify the location of the end of the block, and
(f) means for testing a number of sequential blocks to enable said data processor to search a larger number of addresses than otherwise in response to one of its command words.

20. The apparatus of claim 14, said central data processor further comprising
(a) a data input register to hold all information coming to the data processor from external sources, said information comprising command and data words,
(b) an index location register,
(c) said index location register comprising means to hold a plurality of the most significant bits of an address, the last significant bits of said address being selected from a predetermined plurality of bits held in said data input register when said data input register contains an indexable instruction word, an index word, or an indirect address word,
(d) said data input register holding a plurality of bits of predetermined instructions which specify that indexing will be effected and which bits are appended to the index location register bits to form the address of an index word, and
(e) means responsive to said predetermined plurality of bits in said data input register which selectively (1) defines the location of the word in memory which counts the number of times of iteration in repeat operations, (2) defines an address in memory in which is stored the address of a successful test of a block of words in memory, (3) gives the number of shifts used in performing a normalizing instruction, (4) forms one of the two addresses used when it is desired to shift the location of a word in memory from one location to another, or (5) specifies the address in memory which contains a boundary limit utilized for testing whether each word of a string of words is within boundary limits,
(f) said apparatus thereby comprising means for indexing, for checking for limit, and for storing the address of a word which indicates that a block test is successfully met to thereby permit sequential testing of memory block by block to enable a one-address central processor to exhibit the behavior and provide the capability of a two-address central processor.

21. The apparatus of claim 14, said data processor further comprising
(a) a data input register to hold all information coming to the data processor from external sources, said information comprising command and data words,
(b) an operation register and an index location register,
(c) a plurality of address source registers additional to said operation register and index location register,
(d) said data output multiplex unit comprising a first multiplex section capable of enabling one of said additional plurality of registers to provide outputs to said multiplex section.

(e) said data output multiplex unit further comprising a second section to select either the true or the complement state of the data provided by said first multiplex section, and (f) said second section of said data output multiplex unit further comprising means to inhibit all inputs despite enabling by said first section of a register to provide said inputs.

22. The apparatus of claim 21 wherein said data processor further comprises (a) an adder logic unit responsive to said data input register and to said data output multiplex unit, (b) an address and control section, (c) said address and control section comprising a memory address multiplex unit to send all addre ses from said data processor to said memory unit via said intercommunication means, (d) an address field register, (e) a program counter, and (f) an index location register providing input to said address multiplex unit, (g) said address field register comprising both register and counter means to contain selectively the address of a data word to be operated upon or and where there is no data word required to contain variation bits to modify a command, (h) said address field register comprising means responsive to commands to count sequential addresses for block operations, or to count iterative steps for logic operations until a preselected number is detected, (i) a timing and control unit comprising a timing counter, (j) said address field register being coupled to receive output from said adder logic unit and to receive output from said data input register, and (k) said program counter comprising means to sequentially count up the addresses of sequential instruction words and being responsive to inputs from said adder logic unit, to provide branching operations.

23. The apparatus of claim 22, (a) said operation register comprising means to hold a predetermined number of significant bits of the command to be decoded and the major variants of that command, (b) means to load said predetermined significant bits into said operation register independently of said data input register, (c) a command decoder responsive to a predetermined number of the bits from said operation register, (d) a subcommand matrix responsive to said command decoder and the remaining bits in said operation register, (e) the commands of the data processor being divided into groups, (f) said command decoder comprising means to decode subgroups within said predetermined command bits to denote which group of commands is involved to provide similar timing and similar controls for the commands of each group, (g) an address field register to provide variation bits for said command decoder and said subcommand matrix, (h) said command decoder and subcommand matrix together comprising means to decode the varied commands specified by said variation bits, (i) a timing and control unit responsive to said command decoder and said subcommand matrix to control said data processor to carry out principal and varied commands, (j) said subcommand matrix providing signals for some commands to inform external units that a word is to be routed indirectly via said data processor between external units, and (k) said subcommand matrix being responsive to commands to send information to and from external units and said pair of accumulators responsive to said adder logic.

24. The apparatus of claim 21, further comprising, (a) an adder logic unit having a pair of inputs, (b) said data output multiplex unit providing one of the inputs to said adder logic unit, (c) said adder logic unit comprising a plurality of bit stages to provide selectively arithmetic operations including exclusive OR operations and a data transfer path, (d) each bit stage comprising a first and a second half adder stage, (e) said first half adder stage being responsive to said pair of adder inputs to provide said arithmetic operations and being responsive to one of said inputs to provide said data transfer path, (f) said first half adder stage comprising means to inhibit one of said pair of inputs thereby selectively performing arithmetic operation or providing a direct data transfer path, (g) each of said second half adder stages having a carry input connected to said first stage output, (h) each of said second half adders comprising means to perform arithmetic operations on said last-named inputs and comprising a data transfer path in the absence of said carry input, and (i) each of said second stage half adders further comprising means to inhibit said carry input to provide said exclusive OR function such that (1) the first half-adder stage performs the half-adder exclusive OR function and (2) the carry input to the second half-adder stage is inhibited to provide a data transfer path.

25. In the apparatus of claim 14, said arithmetic operations means comprising (a) a plurality of cascaded bit stages, each of which performs a full add operation of two data inputs and a carry input, said bit stages comprising groups of stages, (b) a group carry system to provide carry output for a group of stages to reduce delay for carry generation in said adder logic unit, (c) means to provie group carry input from a previous group, (d) means to provide an output from each bit stage representing the exclusive OR function of its two data inputs, (e) said group carry means comprising OR gate means to provide an output responsive to (1) the presence of a one in both data inputs to the most significant bit stage of the group, (2) the presence of a one in both data inputs to any bit stage of the group in conjunction with a one in said exclusive OR outputs of all more significant stages within the group, (3) the presence of a one in said carry input means from the previous group in conjunction with a one in said exclusive OR outputs of all stages within the group.

26. The apparatus of claim 25 wherein (a) each of said groups of bit stages further comprises at least one subgroup, (b) said subgroup having its own group carry means to reduce the delay in carry generation for the more significant stages within the group of which the subgroup forms a part.

27. The data processor of claim 14, further comprising (a) an address field register to provide counting and register operations, (b) said address field register comprising means to count sequential addresses for block operations and to count iterative steps for logic operations, (c) a timing and control unit comprising a timing counter, (d) said address field register being responsive to said timing counter, (e) a data input register, (f) an adder logic unit, and (g) means to connect said address field register to the outputs of said adder logic unit and said data input register.

28. In the apparatus of claim 27, said data processor further comprising (a) an operation register, (b) said operation register comprising means to hold a plurality of the bits which specify the command to be decoded and the major variants of that command, (c) input means into said data processor which bypasses said data input register, (d) said operation register being connected to said means bypassing said data input regiser, (e) said command word comprising a command portion and an address portion, (f) means responsive to a predetermined memory select bit of said command portion to select a memory module to be accessed, (g) said last-named means comprising means to select one of two initiate signals, one to effect selecting a first memory unit for access and the other to effect selecting a second memory unit for access.

29. In the apparatus of claim 27, said data processor further comprising (a) an operation register and a command decoder, (b) a subcommand matrix, (c) said address field register comprising means to provide variation bits to said command decoder and said subcommand matrix, said command word comprising a principal command word before modification by said variation bits, (d) a timing and control unit, (e) said command decoder and subcommand matrix acting together to decode the principal commands and those specified by said variation bits to thereby cause said timing and control unit to control the data processor in carrying out said principal and varied commands, and (f) said command decoder further comprisng means to decode subgroups comprising predetermined bits within the principal command to determine which group of instructions is involved for purposes of governing timing and control of similar commands.

30. The apparatus of claim 29, (a) said arithmetic operations means comprising a first and a second arithmetic register, (b) said timing and control unit responsive to said subcommand matrix comprising means to provide signals to control different courses of routing from said intercommunication means to said data processor and to effect the sending of data to and from units external of said data processor and said first and second arithmetic registers, (c) said subcommand matrix further comprising means to specify whether words transferred between said first and second arithmetic registers and units external of said data processor are data words or control words.

31. The apparatus of claim 30, (a) said registers each comprising a strobe register having a strobe input lead, (b) said strobe register being responsive to input information only when a strobe pulse is applied to said strobe pulse input lead, and (c) means to generate said strobe pulse utilizing clock pulses and appropriate control signals from said timing and control unit when it is desired that said register accept data to thereby eliminate oherwise necessary gating and inhibit signals, (d) said register comprising a plurality of flip-flops one for each bit position, said strobe means being connected to strobe each bit flip-flop of said register.

32. The apparatus of claim 14, said data processor further comprising (a) means for receiving clock pulses at any frequency within a wide range of frequencies, (b) a timing and control unit synchronizable to the clock frequency and to submultiples of the clock frequency, (c) said clock pulses being provided by a clock source external to said data processor, to thereby eliminate need for master and slave clock procedure and to eliminate necessity for periodic updating of clocks for insuring of synchronization.

33. The apparatus of claim 14, said central data processor further comprising (a) a timing and control unit responsive to interrupt signals from an external control unit, (b) said data processor and its timing and control unit being responsive to selected signals from an external clock of selectable frequency and to submultiples of such frequencies, and (c) said data processor further comprising means operable with memories having memory cycle times and memory access times which correspond to multiples of the clock period.

34. In the data processor of claim 14, (a) said data output multiplex unit constituting a portion of a critical timing path in arithmetic operations, (b) adder logic means, (c) a timing and control unit, (d) matrix means to provide subcommands, (e) said subcommand matrix comprising subcommand look-ahead means to generate certain subcommand signals including control signals for said adder logic means before use of said subcommand signals is required, critical timing changes and critical timing paths in the data processor, (f) said subcommand look-ahead means comprising at least one flip-flop for each subcommand which requires a look-ahead means, (g) an operation register, (h) means to hold said flip-flop in the set state once conditions for setting the flip-flop have been obtained and a reset is not desired, (i) said holding means comprising an AND gate and feedback means from the output of said flip-flop to the input of said AND gate, (j) said AND gate having additional inputs concurrently present to maintain said flip-flop in set state, (k) a command decoder, (l) means to set said flip-flop generating said look-ahead subcommand at a timing period next previous to the timing period at which the subcommand is required, comprising an AND gate responsive to at least one predetermined input from selectively said operation register, said command decoder and said subcommand matrix means and to a predetermined timing period flip-flop.

35. The flip-flop circuit means of claim 34 further including (a) means to reset said flip-flop, said means to set said flip-flop overriding said reset, and means to overpower said setting means comprising a logic gate providing input into said flip-flop and means to generate and apply to said logic gate a complement signal to inhibit output from said logic gate.

36. The data processor of claim 14, said data processor further comprising (a) an adder logic unit, (b) subcommand logic circuitry to provide subcommand lookahead such that when it is necessary to enable the transfer of the contents of a register into said data output multiplex unit and when timing is critical in the path, the conditions for the transfer at this timing period are set up at a given previous timing period to eliminate delay, saving time for gating.

37. In a system comprising at least one synchronous data processor unit, at least one memory unit, and at least one input-output control unit, (a) said data processor unit comprising a timing and control means, (b) said timing and control means being responsive to external clock pulses of different frequencies, and (c) said timing and control means comprising means responsive to all input clock pulses received by it independently of masking of some of said clock pulses, (d) said timing and control means thereby being responsive to less than all clock pulses as well as to a continuous string of pulses such that said data processor is automatically synchronized, by the selective masking of clock signals, to memory units of various speeds to which it is interconnected in the system.

38. The apparatus of claim 37 further comprising devices other than said memory units with which said data processor is automatically synchronized regardless of the speed of said devices by said timing and control means responsive to a clock input derived directly from such devices.

39. The apparatus of claim 37 further comprising (a) a clock pulse source, (b) clock control means to inhibit selected pulses from said clock pulse source, (c) said clock source and said clock control means comprising means to synchronize memory and data processor operations, (d) said data processor being responsive to memories having memory cycle times exceeding that of the clock period, (e) said clock control means further comprising circuit means to provide predetermined delay in strobing the transfer of information from said memory unit to the data processor input, and (f) said clock control means further comprising means to delay the commencement of data processor requested memory operations until the conclusion of any memory operation which the memory unit is effecting to prevent disruption of said memory unit in carrying out a fetch or store cycle, (g) said clock control means thereby enabling said data processor to operate with memories of greater memory cycle time and greater memory access time than said clock period in the system.

40. The apparatus of claim 39

(a) wherein said data processor system comprises means for synchronization of memory units which operate at different cycle, store and access times, (b) said means for synchronization further comprising memory and clock control logic circuit means to adapt to said memories of different cycle and access times, (c) said memory and clock control logic circuit means comprising a plurality of flip-flops in counting arrangement, (d) logic circuit means responsive to read and to store requests from said data processor and to a memory available signal from said flip-flops to provide initiate signals to memory, and (e) said memory and clock control logic circuit comprising logic circuitry responsive to clock input and to said read and store requests to inhibit clock signals to said data processor, (f) said data processor timing and control unit being responsive to the clock signals provided to it such that said predetermined delay is afforded during read and store operations and data processor requested memory operations are delayed before the conclusion of the current operation which the memory is effecting.

41. The apparatus of claim 37, (a) said timing and control means comprising a timing period ring counter, control means selectively to inhibit and to allow counter sequences, command manipulation means and command execution means, (b) said command manipulation means comprising timing period flip-flops and associated controls to govern indexing and indirect addressing, (c) said data processor further comprising an index location register and associated means whereby the presence of predetermined bits of command words causes said data processor to access memory at the address specified by appending said command bits to the contents of said index location register, (d) said memory unit being capable of comprising a plurality of index registers as determined by a program, (e) means responsive to one of said timing period flip-flops to add the index value to the address of a new instruction of the program when indexing is required, (f) means to govern the occurrences of indexing manipulations, and (g) said timing and control unit further comprising halt flip-flop means and special timing period flip-flops to provide timing to halt and start said timing period ring counter in the event of start conditions.

42. The apparatus of claim 41 further comprising means for effecting timing and control for groups of similar instructions comprising a control group, a read group, a write group and a read-write group.

43. A data processor for a system including a memory comprising (a) means to provide arithmetic execution, (b) means to provide program execution, (c) said data processor being adaptable to different clock frequencies and to memories of different access times, cycle times and characteristics, (d) a data output multiplex unit to select which contents of the processor is to be operated upon or transferred out of said data processor except in memory addressing operations, (e) said data processor further comprising means to effect automatic indexing upon specifying in program steps that indexing should be accomplished including means for relocating index registers in memory under program control, (f) means to provide a memory block search, and (g) a subcommand look-ahead means to set up the conditions to provide a subcommand at a timing period previous to a timing period when it is necessary to enable the transfer of the contents of a register into said data output multiplex unit for transfer out of said data output multiplex unit to eliminate timing delay and allow time for gating otherwise necessary to generate subcommands and timing signals which normally take relatively long periods to generate.

References Cited

UNITED STATES PATENTS

| | | | |
|---|---|---|---|
| Re. 26,087 | 9/1966 | Dunwell et al. | 340—172.5 |
| 3,319,226 | 5/1967 | Mott et al. | 340—172.5 |
| 3,312,954 | 4/1967 | Bible et al. | 340—172.5 |
| 3,308,439 | 3/1967 | Tink et al. | 340—172.5 |
| 3,247,488 | 4/1966 | Welsh et al. | 340—172.5 |
| 3,229,260 | 1/1966 | Falkoff | 340—172.5 |
| 3,200,380 | 8/1965 | MacDonald et al. | 340—172.5 |

PAUL J. HENON, *Primary Examiner.*

G. D. SHAW, *Assistant Examiner.*

UNITED STATES PATENT OFFICE
CERTIFICATE OF CORRECTION

Patent No. 3,426,330 February 4, 1969

Hans B. Marx et al.

It is certified that error appears in the above identified patent and that said Letters Patent are hereby corrected as shown below:

Column 5, line 19, "input" should read -- output --. Column 18, line 14, "is", first occurrence, should read -- if --. Column 21, line 45, "LSP(OP8)" should read -- LSP($\overline{OP8}$) --; line 47, "LSP(OP8.OP9)" should read -- LSP(OP8.$\overline{OP9}$) --; line 63, "AO=ADD+SUB=ADS+SBS" should read -- AO=ADD+SUB+ADS+SBS --. Column 23, line 46, after "from" insert -- I/O --. Column 24, lines 21 and 28, "NAM", each occurrence, should read -- MAM --. Column 26, line 23, cancel "type". Column 28, line 53, "TP20.DIRϕ" should read -- TP20.$\overline{DIR}$ϕ --. Columns 39 and 40, second column, fourth line from the bottom thereof, "PARITY→SET CPE" should read -- $\overline{PARITY}$→SET CPE --. Columns 43 and 44, in the second table, line 1 of the notes thereof, "(TMX+NMR+LSP)." should read -- ($\overline{TMX}$+NMR+LSP). --. Columns 47 and 48, in the first table, second column, line 2 thereof, "STENV→$\underline{S}$ TP25" should read -- $\overline{STENV}$→$\underline{S}$ TP25 --; same columns 47 and 48, in the second table, second column, line 10 thereof, "IC1.IC2.$\overline{PARITY}$→SET DPE" should read -- IC1.$\overline{IC2}$.$\overline{PARITY}$→SET DPE --. Column 57, line 2, "193" should read -- 103 --. Column 59, line 1, "OP9" should read -- $\overline{OP9}$ --. Column 72, line 37, after "required," insert -- for executing subcommands involving --. Column 73, line 2, after "eliminate" insert -- timing --; line 54, cancel "further".

Signed and sealed this 3rd day of March 1970.

(SEAL)
Attest:

EDWARD M.FLETCHER,JR.
Attesting Officer

WILLIAM E. SCHUYLER, JR.
Commissioner of Patents